United States Patent
Woodgate et al.

(12) 
(10) Patent No.: US 9,225,971 B2
(45) Date of Patent: Dec. 29, 2015

(54) TEMPORALLY MULTIPLEXED DISPLAY WITH LANDSCAPE AND PORTRAIT OPERATION MODES

(71) Applicant: RealD Inc., Beverly Hills, CA (US)

(72) Inventors: Graham J. Woodgate, Henley-on-Thames (GB); Michael G. Robinson, Boulder, CO (US); Jonathan Harrold, Leamington Spa (GB)

(73) Assignee: RealD Inc., Beverly Hills, CA (US)

( * ) Notice: Subject to any disclaimer, the term of this patent is extended or adjusted under 35 U.S.C. 154(b) by 0 days.

(21) Appl. No.: 14/262,148

(22) Filed: Apr. 25, 2014

(65) Prior Publication Data

US 2014/0232836 A1 Aug. 21, 2014

Related U.S. Application Data

(63) Continuation of application No. 14/044,767, filed on Oct. 2, 2013, now Pat. No. 9,001,423.

(60) Provisional application No. 61/709,038, filed on Oct. 2, 2012, provisional application No. 61/745,160, filed on Dec. 21, 2012, provisional application No. 61/709,068, filed on Oct. 2, 2012.

(51) Int. Cl.
*G02B 27/22* (2006.01)
*H04N 13/04* (2006.01)
*F21V 8/00* (2006.01)

(52) U.S. Cl.
CPC .......... *H04N 13/0402* (2013.01); *G02B 6/0045* (2013.01); *G02B 6/0048* (2013.01); *G02B 27/22* (2013.01); *G02B 27/225* (2013.01); *G02B 27/2264* (2013.01); *H04N 13/0468* (2013.01)

(58) Field of Classification Search
CPC ............. G02B 27/225; G02B 27/2228; G02B 27/2235; G02B 27/2242; G02B 27/2264; G02B 27/22; H04N 13/0402; H04N 13/0468
USPC .......... 359/462–477; 362/607–610, 615, 511; 348/54
See application file for complete search history.

(56) References Cited

U.S. PATENT DOCUMENTS

| 6,712,471 | B1 | 3/2004 | Travis et al. | |
|---|---|---|---|---|
| 2002/0008854 | A1 | 1/2002 | Travis et al. | |
| 2003/0137821 | A1* | 7/2003 | Gotoh et al. | 362/31 |

(Continued)

FOREIGN PATENT DOCUMENTS

| JP | 08-237691 A | 9/1996 |
|---|---|---|
| WO | 01-61241 A1 | 8/2001 |

OTHER PUBLICATIONS

International search report and written opinion of international searching authority in co-pending PCT/US2013/063125, mailed Jan. 24, 2014.

(Continued)

*Primary Examiner* — Zachary Wilkes
*Assistant Examiner* — William R Alexander
(74) *Attorney, Agent, or Firm* — Neil G. J. Mothew

(57) ABSTRACT

An autostereoscopic display comprising a temporally multiplexed display arranged to provide viewing windows in a range around 45 degrees to achieve landscape and portrait viewing in cooperation with an observer tracking system. The temporally multiplexed display may comprise a stepped waveguide imaging directional backlight.

16 Claims, 54 Drawing Sheets

(56) References Cited

U.S. PATENT DOCUMENTS

| | | |
|---|---|---|
| 2005/0135116 A1 | 6/2005 | Epstein et al. |
| 2005/0180167 A1 | 8/2005 | Hoelen et al. |
| 2006/0262376 A1 | 11/2006 | Mather et al. |
| 2006/0269213 A1 | 11/2006 | Hwang et al. |
| 2007/0188667 A1 | 8/2007 | Schwerdtner |
| 2008/0278640 A1 | 11/2008 | Ijzerman et al. |
| 2009/0067156 A1 | 3/2009 | Bonnett et al. |
| 2009/0278936 A1 | 11/2009 | Pastoor et al. |
| 2010/0110340 A1 | 5/2010 | Mather et al. |
| 2011/0242298 A1* | 10/2011 | Bathiche et al. ............... 348/54 |
| 2011/0310232 A1 | 12/2011 | Wilson et al. |
| 2012/0127573 A1 | 5/2012 | Robinson et al. |

OTHER PUBLICATIONS

International search report and written opinion of international searching authority in co-pending PCT/US2013/063133, mailed Jan. 20, 2014.

* cited by examiner

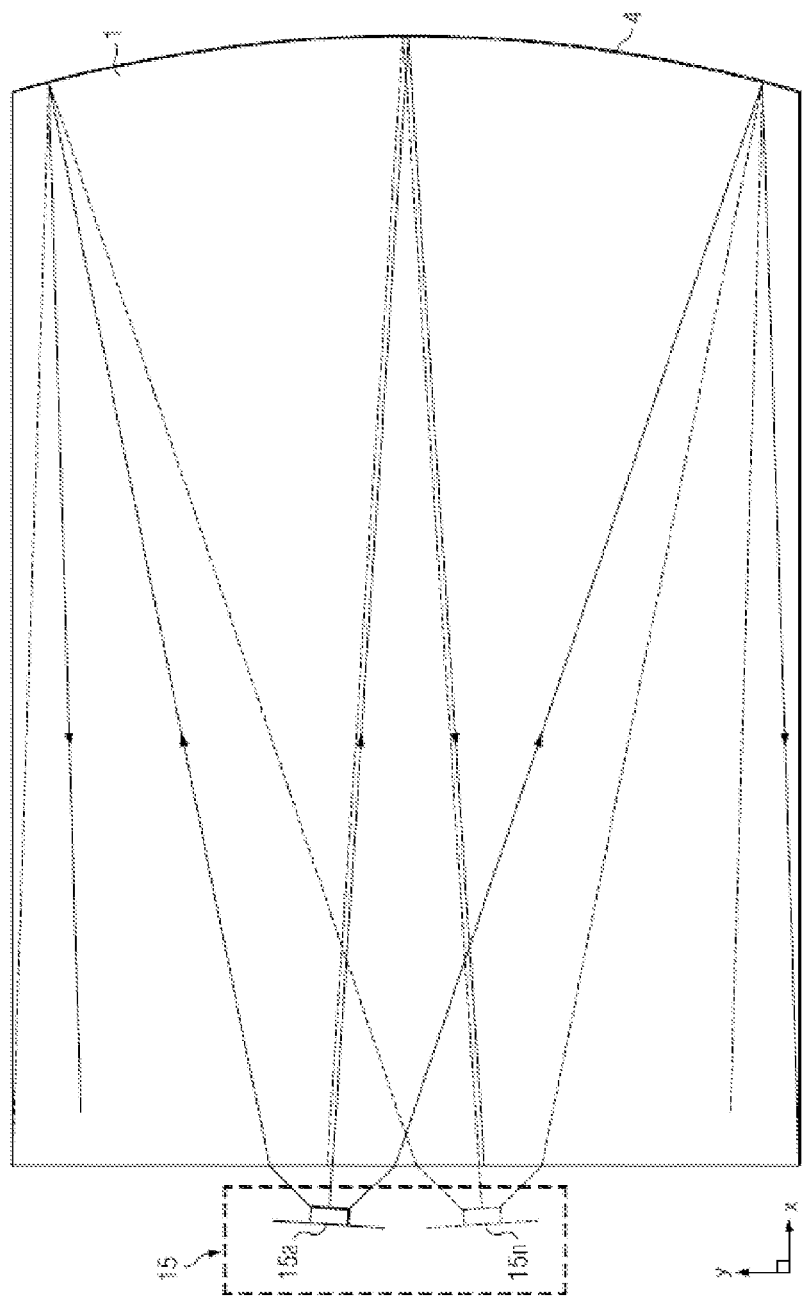

TEMPORALLY MULTIPLEXED DISPLAY WITH LANDSCAPE AND PORTRAIT OPERATION MODES

CROSS-REFERENCE TO RELATED APPLICATIONS

This application is a continuation of and claims priority to U.S. patent application Ser. No. 14/044,767, filed Oct. 2, 2013, entitled "Temporally multiplexed display with landscape and portrait operation modes",which is a non-provisional application of the following U.S. Provisional Patent Applications: No. 61/709,038, filed Oct. 2, 2012, entitled "Temporally multiplexed display with landscape and portrait operation modes", No. 61/709,068, filed Oct. 2, 2012, entitled "Stepped waveguide autostereoscopic display apparatus comprising a reflective directional element", and No. 61/745,160, filed Dec. 21, 2012, entitled "Temporally multiplexed display with landscape and portrait operation modes", all of which are commonly assigned and incorporated herein by reference for all purposes.

TECHNICAL FIELD

This disclosure generally relates to a time multiplexed autostereoscopic display apparatus with inclined viewing windows arranged to achieve landscape and portrait modes of operation.

BACKGROUND

Spatially multiplexed autostereoscopic displays typically align a parallax component such as a lenticular screen or parallax barrier with an array of images arranged as at least first and second sets of pixels on a spatial light modulator, for example an LCD. The parallax component directs light from each of the sets of pixels into different respective directions to provide first and second viewing windows in front of the display. An observer with an eye placed in the first viewing window can see a first image with light from the first set of pixels; and with an eye placed in the second viewing window can see a second image, with light from the second set of pixels.

Such displays have reduced spatial resolution compared to the native resolution of the spatial light modulator and further, the structure of the viewing windows is determined by the pixel aperture shape and parallax component imaging function. Gaps between the pixels, for example for electrodes, typically produce non-uniform viewing windows. Undesirably such displays exhibit image flicker as an observer moves laterally with respect to the display and so limit the viewing freedom of the display. Such flicker can be reduced by defocusing the optical elements; however such defocusing results in increased levels of image cross talk and increases visual strain for an observer. Such flicker can be reduced by adjusting the shape of the pixel aperture, however such changes can reduce display brightness and can comprise additional addressing electronics in the spatial light modulator.

BRIEF SUMMARY

Display backlights in general employ waveguides and edge emitting sources. Certain imaging directional backlights have the additional capability of directing the illumination through a display panel into viewing windows. An imaging system may be formed between multiple sources and the respective window images. One example of an imaging directional backlight is an optical valve that may employ a folded optical system and hence may also be an example of a folded imaging directional backlight. Light may propagate substantially without loss in one direction through the optical valve while counter-propagating light may be extracted by reflection off tilted facets as described in commonly-owned patent application Ser. No. 13/300,293, which is herein incorporated by reference, in its entirety.

According to a first aspect of the present disclosure, there is provided an autostereoscopic display apparatus, comprising a display device comprising an array of pixels arranged in an aperture with a shape having two perpendicular axes of mirror symmetry, the display device being controllable to direct an image displayed on all of the pixels into a selectable one of a plurality of viewing windows having different positions and extending at an angle in a range from 25 to 65 degrees relative to one of the axes of the shape of the aperture; a sensor system arranged to detect the position of an observer in two dimensions across the display device and the orientation of the view of the observer; and a control system arranged to control the display device to display temporally multiplexed left and right images and synchronously to direct the displayed images into viewing windows in positions corresponding to the left and right eyes of the observer, in dependence on the detected position of the observer and on the detected orientation of the view.

The present disclosure benefits from selection of the angle at which the viewing windows extend relative the axes of the shape of the aperture in which the pixels are arranged. A display device is most normally viewed with one of the axes of symmetry close to horizontal that is in a landscape or portrait orientation in the case of rectangular aperture. Where the viewing windows extend along or close to an axis of symmetry, autostereoscopic display of images can only be provided when the display device is viewed with that axis of symmetry vertical, and not when the display device is rotated by 90 degrees so that the other axis of symmetry is vertical because then a single viewing window extends across both eyes of the viewer.

In contrast, in the present disclosure, the windows extend at an angle in a range around 45 degrees, for example from 25 to 65 degrees, more preferably 30 to 60 degrees, 35 to 55 degrees, or 40 to 50 degrees. Such angled viewing windows may be used to provide autostereoscopic display of images in varied orientations of the display device, when controlled in dependence on a detected position of the observer and on a detected orientation of the view. In particular, since the angled windows are separated along both axes, left and right images can be directed to be displayed images in viewing windows in positions corresponding to the left and right eyes of the observer, when the display apparatus is viewed in orientations in which either axis is at or around vertical.

In some embodiments, the present disclosure may be applied to a display device comprises a waveguide extending between an input end for receiving input light and a reflective end for reflecting the input light back through the waveguide, the waveguide having first and second, opposed guide surfaces for guiding light forwards and back along the waveguide, wherein the second guide surface has a plurality of light extraction features facing the reflective surface and inclined to reflect the light guided back through the waveguide from the reflective end in directions allowing exit through the first guide surface; and an array of light sources at different positions across the input end of the waveguide, the light extraction features of the waveguide being arranged to direct input light from different input positions across the input end in directions that are dependent on the input position.

Autostereoscopic viewing windows may be arranged so that an observer can be provided with autostereoscopic images in landscape and portrait modes of operation. Viewing windows may be provided that are inclined at an angle to both landscape and portrait orientation axes, for example, the major axes of the display. An observer tracking system may be arranged to direct light to left and right eyes of an observer for horizontal and vertical movement in both orientations. The tracking system may be arranged to direct the appropriate window to, and to provide it with view data for the respective eye of at least one observer. Multiple observers may be presented with separate viewing windows.

According to a second aspect of the present disclosure, there is provided a display device, comprising a transmissive spatial light modulator comprising an array of pixels arranged to modulate light passing therethrough; a waveguide having an input end and first and second, opposed guide surfaces for guiding light along the waveguide, extending from the input end across the spatial light modulator, wherein the first guide surface is arranged to guide light by total internal reflection and the second guide surface has a plurality of light extraction features inclined to reflect light guided through the waveguide in directions allowing exit through the first guide surface as output light for supply through the spatial light modulator, the waveguide being arranged to direct input light from different input positions across the input end in output directions relative to the normal to the first guide surface that are dependent on the input position; and, arranged between the waveguide and the spatial light modulator, an array of focussing elements aligned with respective light extraction features, which focussing elements each have a positive optical power in respective first meridians extending across the light extraction features and no optical power in respective second meridians perpendicular to the first meridians, the focussing elements being arranged with a focus on the respective light extraction features.

The array of focussing element provides the advantage of allowing control of the height of the windows created by the display device.

Embodiments of the present disclosure may be used in a variety of optical systems. The embodiment may include or work with a variety of projectors, projection systems, optical components, displays, microdisplays, computer systems, processors, self-contained projector systems, visual and/or audio-visual systems and electrical and/or optical devices. Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on and in a number of computing environments.

Before proceeding to the disclosed embodiments in detail, it should be understood that the disclosure is not limited in its application or creation to the details of the particular arrangements shown, because the disclosure is capable of other embodiments. Moreover, aspects of the disclosure may be set forth in different combinations and arrangements to define embodiments unique in their own right. Also, the terminology used herein is for the purpose of description and not of limitation.

Directional backlights offer control over the illumination emanating from substantially their entire output surface, such control is achieved typically through modulation of independent LED light sources arranged at the input aperture side of an optical waveguide. Controlling the emitted light directional distribution can achieve single person viewing for a security (privacy) function, where the display can only be seen by a single viewer from a limited range of angles; high electrical efficiency, where illumination is only provided over a small angular directional distribution; alternating left and right eye viewing for time sequential stereoscopic and autostereoscopic display; and low cost.

These and other advantages and features of the present disclosure will become apparent to those of ordinary skill in the art upon reading this disclosure in its entirety.

BRIEF DESCRIPTION OF THE DRAWINGS

Embodiments are illustrated by way of example in the accompanying FIGURES, in which like reference numbers indicate similar parts, and in which:

FIG. 1A is a schematic diagram illustrating a front view of light propagation in one embodiment of an optical valve apparatus, in accordance with the present disclosure;

DETAILED DESCRIPTION

Figure 1B:
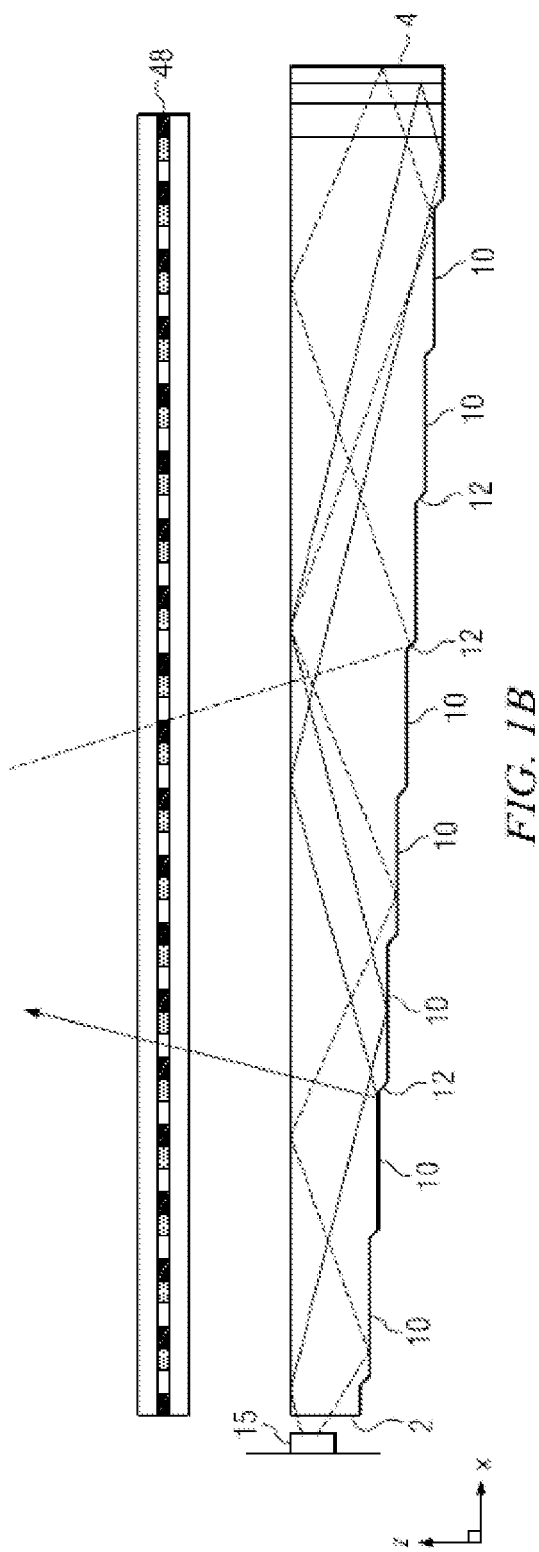
FIG. 1B is a schematic diagram illustrating a side view of light propagation in one embodiment of the optical valve apparatus of FIG. 1A, in accordance with the present disclosure.

Various display apparatuses and components thereof will now be described. In these alternative apparatuses in general have the same construction and operate in the same manner. Accordingly, the various features of the apparatuses and components may be combined together. For brevity, in the following description, the same reference numerals are used for common elements and a description thereof is not repeated.

Time multiplexed autostereoscopic displays can advantageously improve the spatial resolution of autostereoscopic display by displaying temporally multiplexed left and right images and synchronously directing the displayed images into viewing windows in positions corresponding to the left and right eyes of the observer. That is light is directed from all of the pixels of a spatial light modulator to a first viewing window in a first time slot, and all of the pixels to a second viewing window in a second time slot. Thus an observer with eyes arranged to receive light in first and second viewing windows will see a full resolution image across the whole of the display over multiple time slots. Time multiplexed displays can advantageously achieve directional illumination by directing an illuminator array through a substantially transparent time multiplexed spatial light modulator using directional optical elements, wherein the directional optical elements substantially form an image of the illuminator array in the window plane.

The uniformity of the viewing windows may be advantageously independent of the arrangement of pixels in the spatial light modulator. Advantageously, such displays can provide observer tracking displays which have low flicker, with low levels of cross talk for a moving observer.

To achieve high uniformity in the window plane, it is desirable to provide an array of illumination elements that have a high spatial uniformity. The illuminator elements of the time sequential illumination system may be provided, for example, by pixels of a spatial light modulator with size approximately 100 micrometers in combination with a lens array. However, such pixels suffer from similar difficulties as for spatially multiplexed displays. Further, such devices may have low efficiency and higher cost, requiring additional display components.

High window plane uniformity can be conveniently achieved with macroscopic illuminators, for example, an array of LEDs in combination with homogenizing and diffusing optical elements that are typically of size 1 mm or greater. However, the increased size of the illuminator elements means that the size of the directional optical elements increases proportionately. For example a 16 mm wide illuminator imaged to a 65 mm wide viewing window may employ a 200 mm back working distance. Thus, the increased thickness of the optical elements can prevent useful application, for example, to mobile displays, or large area displays.

Addressing the aforementioned shortcomings, optical valves as described in commonly-owned U.S. patent application Ser. No. 13/300,293 advantageously can be arranged in combination with fast switching transmissive spatial light modulators to achieve time multiplexed autostereoscopic illumination in a thin package while providing high resolution images with flicker free observer tracking and low levels of cross talk. Described is a one dimensional array of viewing positions, or windows, that can display different images in a first, typically horizontal, direction, but contain the same images when moving in a second, typically vertical, direction.

As used herein, an optical valve is an optical structure that may be a type of waveguide or device referred to as, for example, a light valve, an optical valve directional backlight, and a valve directional backlight ("v-DBL"). As used herein for discussion purposes only, and not of limitation, examples of an imaging directional backlight include a stepped imaging directional backlight, a folded imaging directional backlight, a wedge type directional backlight, an optical valve, or an optical inline directional backlight. Additionally, as used herein for discussion purposes only and not of limitation, a stepped imaging directional backlight may be at least one of an optical valve or an optical inline directional backlight. Moreover, as used herein for discussion purposes only and not of limitation, a folded imaging directional backlight may be at least one of a wedge type directional backlight, or an optical valve.

In operation, light may propagate within an exemplary optical valve in a first direction from an input end for receiving input light to a reflective end and may be transmitted substantially without loss. Light may be reflected at the reflective end and propagates in a second direction substantially opposite the first direction. As the light propagates in the second direction, the light may be incident on light extraction features, which are operable to redirect the light outside the optical valve. Stated differently, the optical valve generally allows light to propagate in the first direction and may allow light to be extracted while propagating in the second direction. The light extraction features are arranged to direct input light from different input positions across the input end in directions that are dependent on that input position.

The optical valve may achieve time sequential directional illumination of large display areas. Additionally, optical elements may be employed that are thinner than the back working distance of the optical elements to direct light from macroscopic illuminators to a window plane. Such displays may use an array of light extraction features arranged to extract light counter propagating in a substantially parallel waveguide.

Thin directional backlight implementations for use with LCDs have been proposed and demonstrated by 3M, for example U.S. Pat. No. 7,528,893; by Microsoft, for example U.S. Pat. No. 7,970,246 which may be referred to herein as a "wedge type directional backlight;" by RealD, for example U.S. patent application Ser. No. 13/300,293 which may be referred to herein as an "optical valve" or "optical valve directional backlight," and by RealD, for example U.S. Patent Application No. US20120127573, concurrently filed herewith, which may be referred to herein as an "optical inline directional backlight," all of which are herein incorporated by reference in their entirety. Edge lit waveguide backlight illumination structures may be used in liquid crystal display systems such as those seen in 2D Laptops, Monitors and TVs. Light propagates from the edge of a lossy waveguide which may include sparse features; typically local indentations in the surface of the guide which cause light to be lost regardless of the propagation direction of the light.

The present disclosure provides stepped imaging directional backlights in which light may reflect back and forth between the internal faces of, for example, a stepped waveguide which may first and second, opposed guide surfaces for guiding light forwards and back along the waveguide, the second guide surface having a plurality of light extraction features. As the light travels along the length of the stepped waveguide, the light may not substantially change angle of incidence with respect to the guide surfaces and so may not reach the critical angle of the medium at these internal faces. Light extraction may be advantageously achieved by the light extraction features that may be surfaces (the step "risers") that are inclined to the second guide surface (the step "treads"). Note that the light extraction features may not be part of the light guiding operation of the stepped waveguide, but may be arranged to provide light extraction from the structure. By contrast, a wedge type directional backlight may allow light to guide within a wedge profiled waveguide having continuous internal surfaces. The optical valve is thus not a wedge type directional backlight.

FIG. 1A is a schematic diagram illustrating a front view of light propagation in one embodiment of an optical valve structure, and FIG. 1B is a schematic diagram illustrating a side view of light propagation in the optical valve structure of FIG. 1A.

FIG. 1A illustrates a front view in the xy plane of an optical valve, and includes an illuminator array 15 which may be used to illuminate a stepped waveguide 1. Illuminator array 15 includes illuminator elements 15a through illuminator element 15n (where n is an integer greater than or equal to two) that operate as light sources. In one example, the stepped waveguide 1 of FIG. 1A may be a stepped, display sized waveguide 1. Illuminator elements 15a through 15n may be light emitting diodes (LEDs). Although LEDs are discussed herein as illuminator elements 15a-15n, other light sources may be used such as, but not limited to, diode sources, semiconductor sources, laser sources, local field emission sources, organic emitter arrays, and so forth.

Additionally, FIG. 1B illustrates a side view of the waveguide 1 and a spatial light modulator (SLM) 48 in the xz plane. The side view provided in FIG. 1B is an alternative view of the front view shown in FIG. 1A. Accordingly, the illuminator array 15 of FIGS. 1A and 1B corresponds to one another and the stepped waveguide 1 of FIGS. 1A and 1B may correspond to one another.

Further, in FIG. 1B, the stepped waveguide 1 may have an input end 2 that is the thin end and a reflective end 4 that is the thick end. The illuminator elements 15a-15n are arranged in an array of light sources at different positions across the thin end 2 of the waveguide 1.

The waveguide 1 has first and second, opposed guide surfaces for guiding light forwards and back along the waveguide by total internal reflection. The first guide surface (uppermost in FIG. 1) is substantially planar. The second guide surface is formed by alternately arranged guiding surfaces 10 and extraction surfaces 12. The guiding surfaces 10 are the regions of the second guide surface between the extraction features 12 and are substantially planar.

The extraction features 12 are surfaces facing the reflective end 4 and inclined to reflect the light guided back through the waveguide 1 from the reflective end 4 in directions that break the total internal reflection at the first guide surface and allow exit through the first guide surface, for example upwards in FIG. 1B.

The SLM 48 operates as a transmissive spatial light modulator and extends across the first guide surface of the waveguide 1 for modulating the light exiting therethrough. Although the SLM 48 may be a liquid crystal display (LCD) but this is merely by way of example, and other spatial light modulators or displays may be used including LCOS, DLP devices, and so forth, as this illuminator may work in reflection.

The extraction features 12 are arranged to direct input light from the different input positions across the input end 2 in different directions that are dependent on those input positions. As the illumination elements 15a-15n are arranged at different input positions, the light from respective illumination elements 15a-15n is reflected in those different directions. Under the control of a control system, the illuminator elements 15a-15n may be selectively operated to direct light into a selectable one of the optical windows that may be used individually or in groups as viewing windows.

Consequently, the operation of the optical valve that may direct light into one of a plurality of optical windows having different positions, providing a one dimensional array of viewing windows is illustrated in front view in FIG. 1A, with its side profile shown in FIG. 1B. In operation, in FIGS. 1A and 1B, light may be emitted from an illuminator array 15, such as an array of illuminator elements 15a through 15n, located at different positions, y, along the surface of input end 2, x=0, of the stepped waveguide 1. The light may propagate along +x in a first direction, within the stepped waveguide 1, while at the same time, the light may fan out in the xy plane and upon reaching the far curved reflective end 4, may substantially or entirely fill the curved reflective end 4. While propagating, the light may spread out to a set of angles in the xz plane up to, but not exceeding the critical angle of the guide material. The extraction features 12 that link the guiding surfaces 10 of the second guide surface of the stepped waveguide 1 may have a tilt angle greater than the critical angle and hence may be missed by substantially all light propagating along +x in the first direction, ensuring the substantially lossless forward propagation.

Continuing the discussion of FIGS. 1A and 1B, the curved reflective end 4 of the stepped waveguide 1 may be made reflective, typically by being coated with a reflective material such as, for example, silver, although other reflective techniques may be employed. Light may therefore be redirected in a second direction, back down the waveguide 1 in the direction of −x and may be substantially collimated in the xy or display plane. The angular spread may be substantially preserved in the xz plane about the principal propagation direction, which may allow light to hit the riser edges and reflect out of the guide. In an embodiment with approximately 45° tilted extraction features 12, light may be effectively directed approximately normal to the xy display plane with the xz angular spread substantially maintained relative to the propagation direction. This angular spread may be increased when light exits the stepped waveguide 1 through refraction, but may be decreased somewhat dependent on the reflective properties of the extraction features 12.

In some embodiments with uncoated extraction features 12, reflection may be reduced when total internal reflection (TIR) fails, squeezing the xy angular profile and shifting off normal. However, in other embodiments having silver coated or metallized extraction features, the increased angular spread and central normal direction may be preserved. Continuing the description of the embodiment with silver coated extraction features, in the xz plane, light may exit the stepped waveguide 1 approximately collimated and may be directed off normal in proportion to the y-position of the respective illuminator element 15a-15n in illuminator array 15 from the input edge center. Having independent illuminator elements 15a-15n along the input end 2 then enables light to exit from the entire first guide surface 6 and propagate at different external angles, as illustrated in FIG. 1A.

Figure 2A:
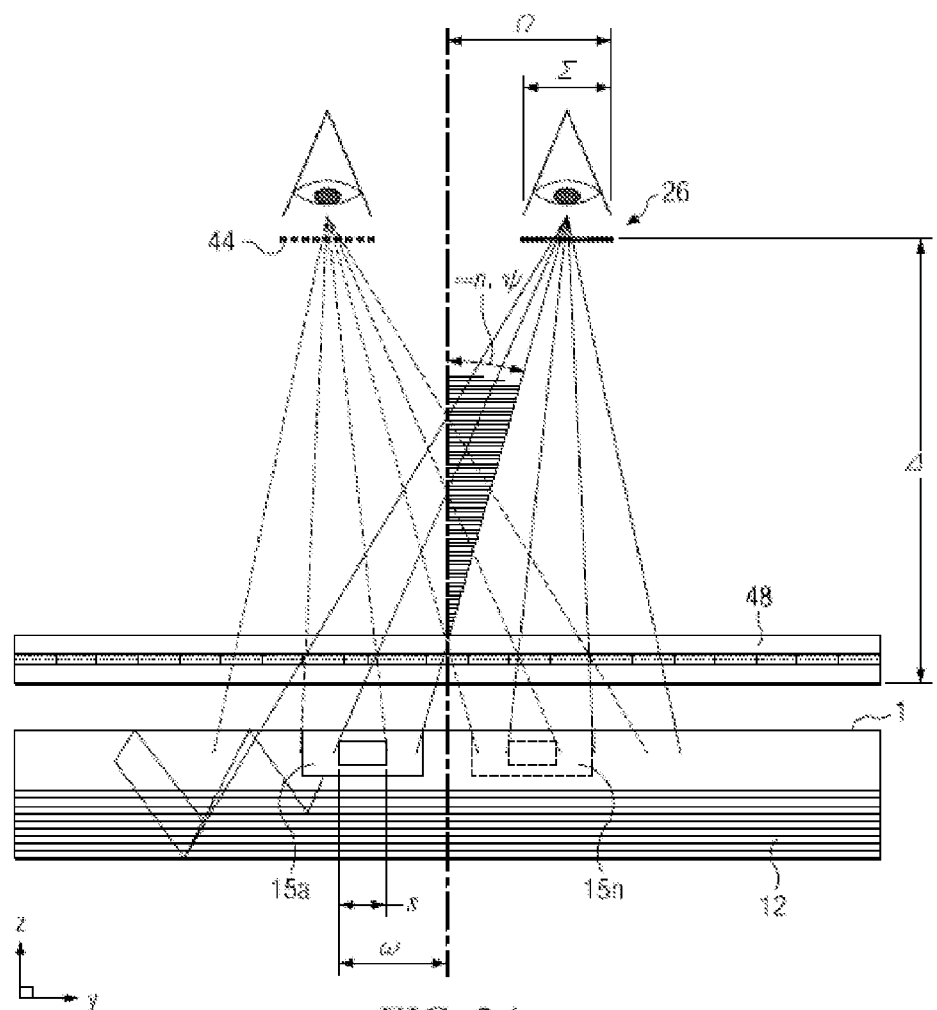
FIG. 2A is a schematic diagram illustrating in a top view of light propagation in another embodiment of an optical valve apparatus, in accordance with the present disclosure.
Figure 2B:
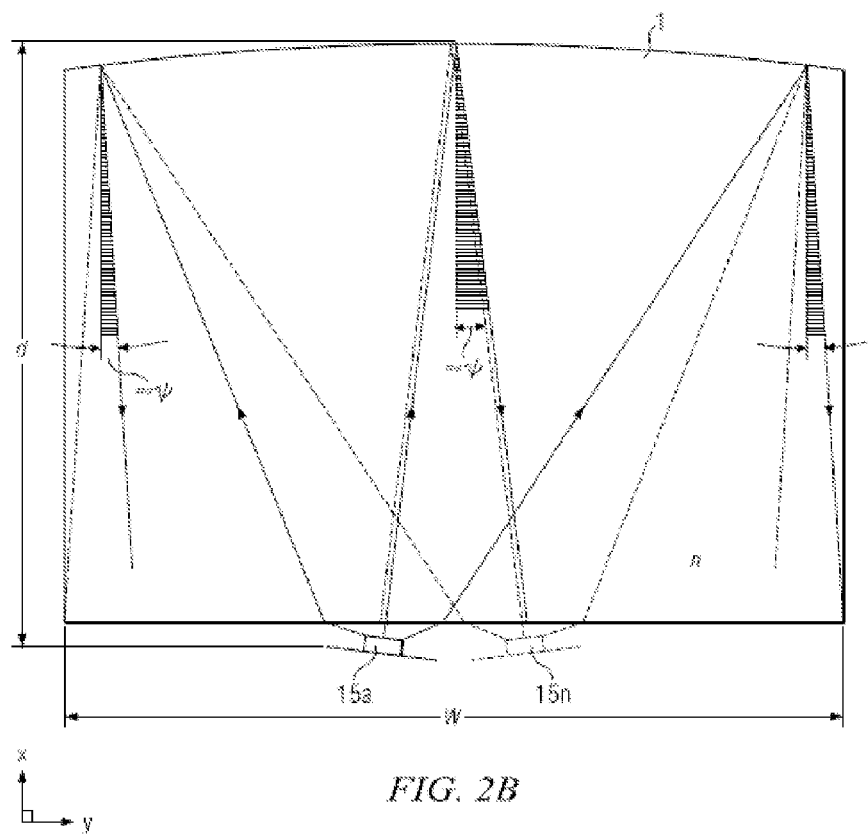
FIG. 2B is a schematic diagram illustrating light propagation in a front view of the optical valve apparatus of FIG. 2A, in accordance with the present disclosure.
Figure 2C:
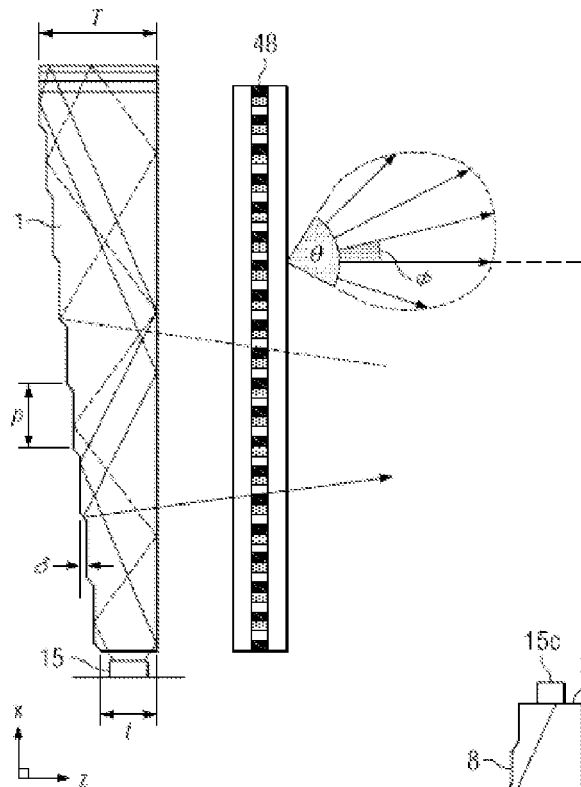
FIG. 2C is a schematic diagram illustrating light propagation in a side view of the optical valve apparatus of FIG. 2A, in accordance with the present disclosure.

Illuminating an SLM 48 such as a fast LCD panel with such a device may achieve autostereoscopic 3D as shown in top view or yz-plane viewed from the illuminator array 15 end in FIG. 2A, front view in FIG. 2B and side view in FIG. 2C. FIG. 2A is a schematic diagram illustrating in a top view, propagation of light in an optical valve system, FIG. 2B is a schematic diagram illustrating in a front view, propagation of light in an optical valve system, and FIG. 2C is a schematic diagram illustrating in side view propagation of light in an optical valve system. As follows, under the control of a control system, the SLM 48 is caused to display temporally multiplexed left and right eye images and the illuminator element 15a-15n are synchronously operated to direct light into viewing windows, that include one or more optical windows, in positions corresponding to the left and right eyes of an observer. As illustrated in FIGS. 2A, 2B, and 2C, a stepped waveguide 1 may be located behind a fast (e.g., greater than 100 Hz) LCD panel SLM 48 that displays sequential right and left eye images. In synchronization, specific illuminator elements 15a through 15n of illuminator array 15 may be selectively turned on and off, providing illuminating light that enters right and left eyes substantially independently by virtue of the system's directionality. In the simplest case, sets of illuminator elements of illuminator array 15 are turned on together, providing a one dimensional viewing window 26 or an optical pupil with limited width in the horizontal direction, but extended in the vertical direction, in which both eyes horizontally separated may view a left eye image, and another viewing window 44 in which a right eye image may primarily be viewed by both eyes, and a central position in which both the eyes may view different images. In this way, 3D may be viewed when the head of a viewer is approximately centrally aligned. Movement to the side away from the central position may result in the scene collapsing onto a 2D image.

Figure 3:
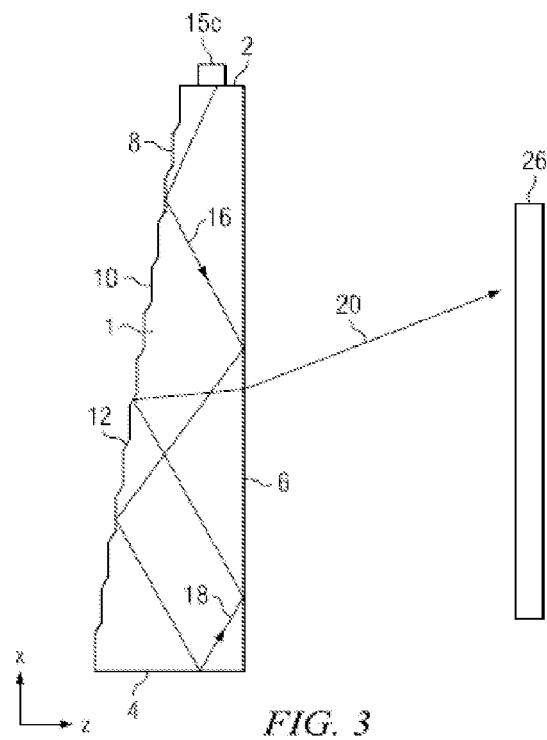
FIG. 3 is a schematic diagram illustrating in a side view of an optical valve apparatus, in accordance with the present disclosure.

FIG. 3 is a schematic diagram illustrating in side view an optical valve. Further, FIG. 3 illustrates additional detail of a side view of the operation of a stepped waveguide 1, which may be a transparent material. The stepped waveguide 1 may include an illuminator input end 2, a reflective end 4, a first light directing side 6 which may be substantially planar, and a second light directing side 8 which includes guiding surfaces 10 and light extraction features 12. In operation, light rays 16 from an illuminator element 15c of an illuminator array 15 (not shown in FIG. 3), that may be an addressable array of LEDs for example, may be guided in the stepped waveguide 1 by means of total internal reflection by the first light directing side 6 and total internal reflection by the guiding feature 10, to the reflective end 4, which may be a mirrored surface. Although reflective end 4 may be a mirrored surface and may reflect light, it may in some embodiments also be possible for light to pass through reflective end 4.

Continuing the discussion of FIG. 3, light ray 18 reflected by the reflective end 4 may be further guided in the stepped waveguide 1 by total internal reflection at the reflective end 4 and may be reflected by extraction features 12. Light rays 18 that are incident on extraction features 12 may be substantially deflected away from guiding modes of the stepped waveguide 1 and may be directed, as shown by ray 20, through the side 6 to an optical pupil that may form a viewing window 26 of an autostereoscopic display. The width of the viewing window 26 may be determined by at least the size of the illuminator, output design distance and optical power in the end 4 and extraction features 12. The height of the viewing window may be primarily determined by the reflection cone angle of the extraction features 12 and the illumination cone angle input at the input end 2.

Figure 4A:
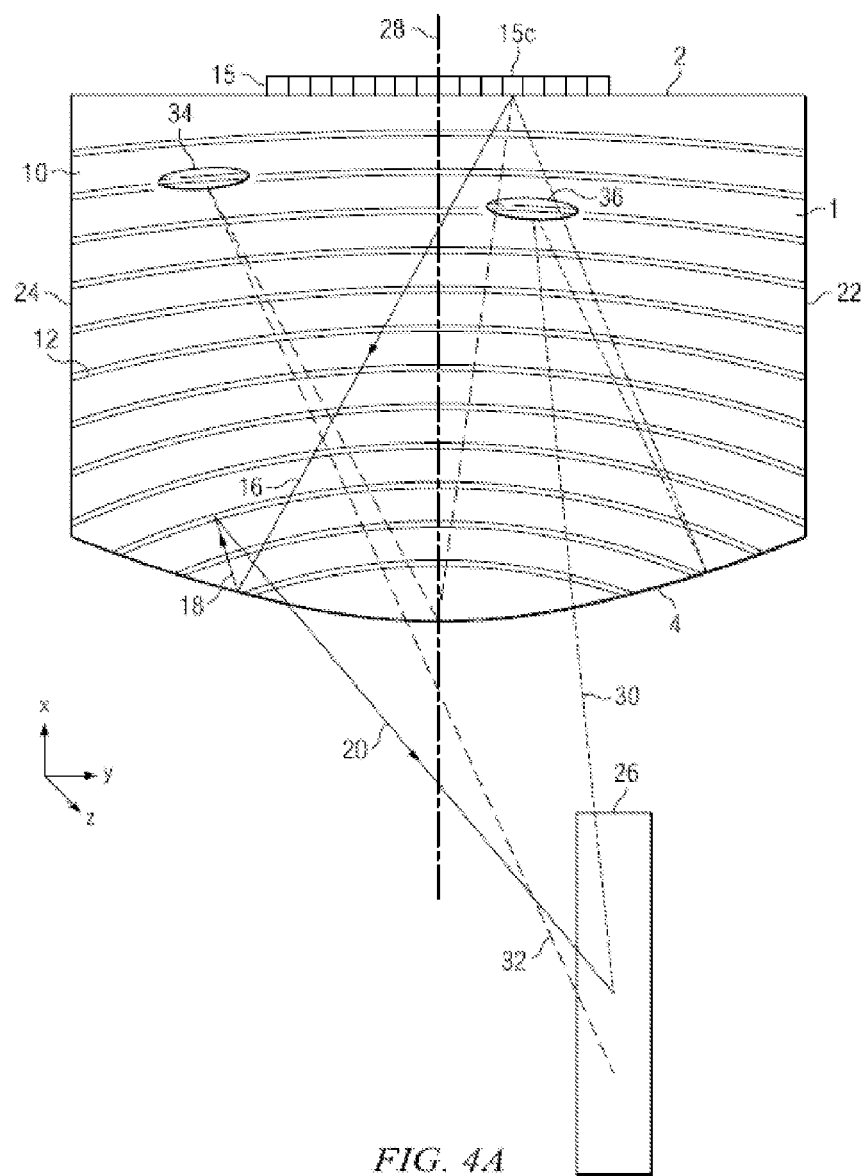
FIG. 4A is schematic diagram illustrating in a front view, generation of a viewing window in an optical valve apparatus and including curved light extraction features, in accordance with the present disclosure.

FIG. 4A is a schematic diagram illustrating in front view an optical valve which may be illuminated by a first illuminator element and including curved light extraction features. Further, FIG. 4A shows in front view further guiding of light rays from illuminator element 15c of illuminator array 15, in the stepped waveguide 1. Each of the output rays are directed towards the same viewing window 26 from the respective illuminator 14. Thus light ray 30 may intersect the ray 20 in the window 26, or may have a different height in the window as shown by ray 32. Additionally, in various embodiments, sides 22, 24 of the optical valve may be transparent, mirrored, or blackened surfaces. Continuing the discussion of FIG. 4A, light extraction features 12 may be elongate, and the orientation of light extraction features 12 in a first region 34 of the light directing side 8 (light directing side 8 shown in FIG. 3, but not shown in FIG. 4A) may be different to the orientation of light extraction features 12 in a second region 36 of the light directing side 8.

Figure 4B:
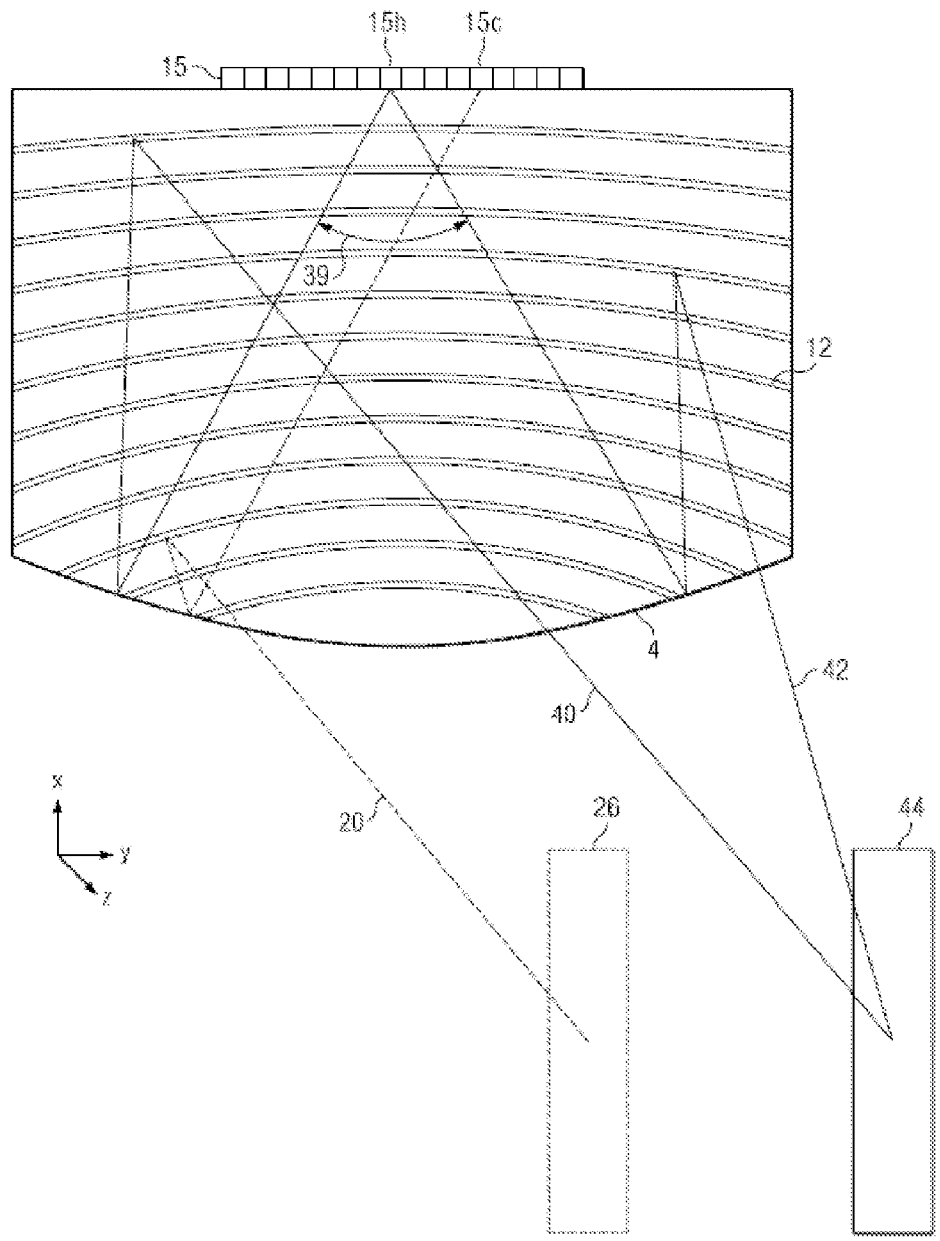
FIG. 4B is a schematic diagram illustrating in a front view, generation of a first and a second viewing window in an optical valve apparatus and including curved light extraction features, in accordance with the present disclosure.

FIG. 4B is a schematic diagram illustrating in front view an optical valve which may illuminated by a second illuminator element. Further, FIG. 4B shows the light rays 40, 42 from a second illuminator element 15h of the illuminator array 15. The curvature of the reflective surface on the end 4 and the light extraction features 12 cooperatively produce a second viewing window 44 laterally separated from the viewing window 26 with light rays from the illuminator element 15h.

Advantageously, the arrangement illustrated in FIG. 4B may provide a real image of the illuminator element 15c at a viewing window 26 in which the real image may be formed by cooperation of optical power in reflective end 4 and optical power which may arise from different orientations of elongate light extraction features 12 between regions 34 and 36, as shown in FIG. 4A. The arrangement of FIG. 4B may achieve improved aberrations of the imaging of illuminator element 15c to lateral positions in viewing window 26. Improved aberrations may achieve an extended viewing freedom for an autostereoscopic display while achieving low cross talk levels.

Figure 5:
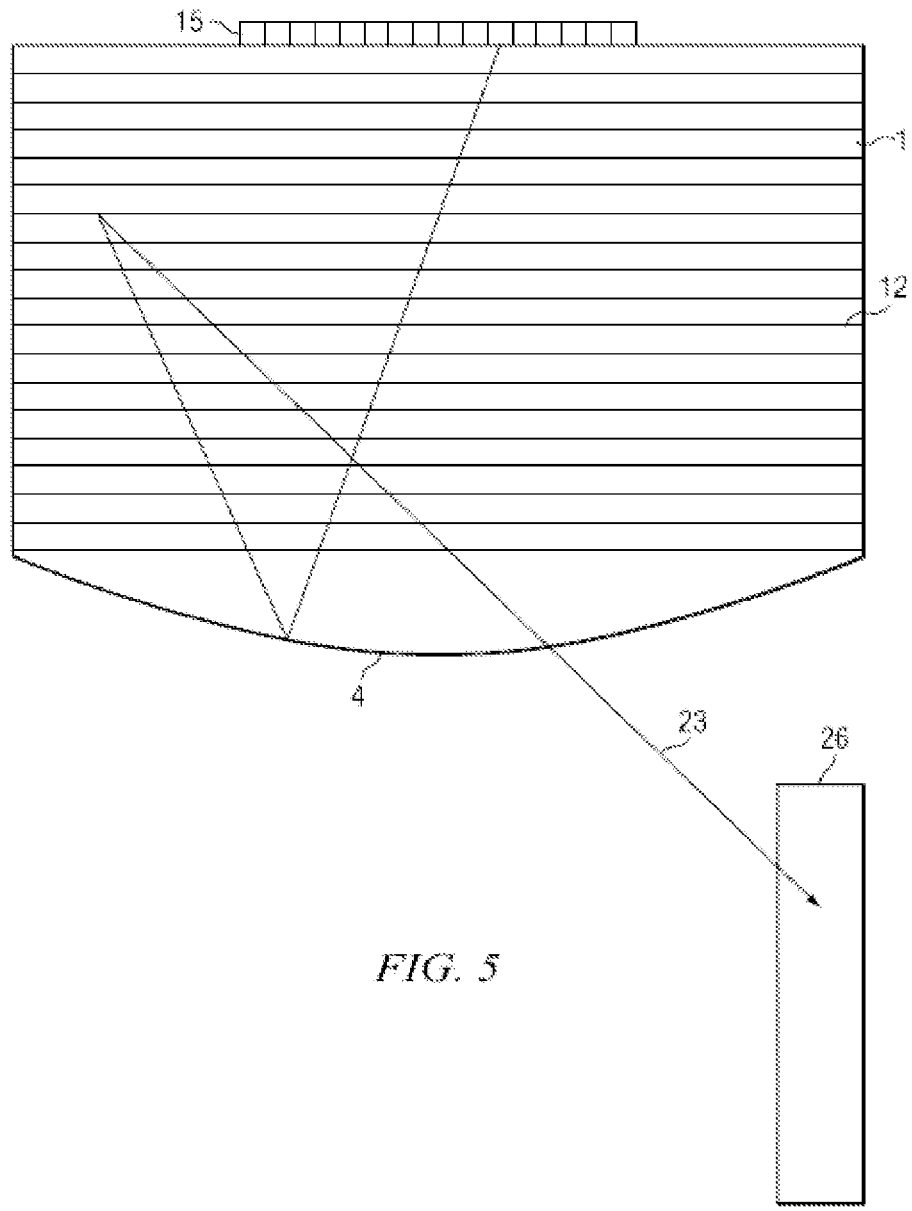
FIG. 5 is a schematic diagram illustrating generation of a first viewing window in an optical valve apparatus including linear light extraction features, in accordance with the present disclosure.

FIG. 5 is a schematic diagram illustrating in front view an embodiment of an optical valve having substantially linear light extraction features. Further, FIG. 5 shows a similar arrangement of components to FIG. 1 (with corresponding elements being similar), with one of the differences being that the light extraction features 12 are substantially linear and parallel to each other. Advantageously, such an arrangement may provide substantially uniform illumination across a display surface and may be more convenient to manufacture than the curved extraction features of FIG. 4A and FIG. 4B.

Figure 6A:
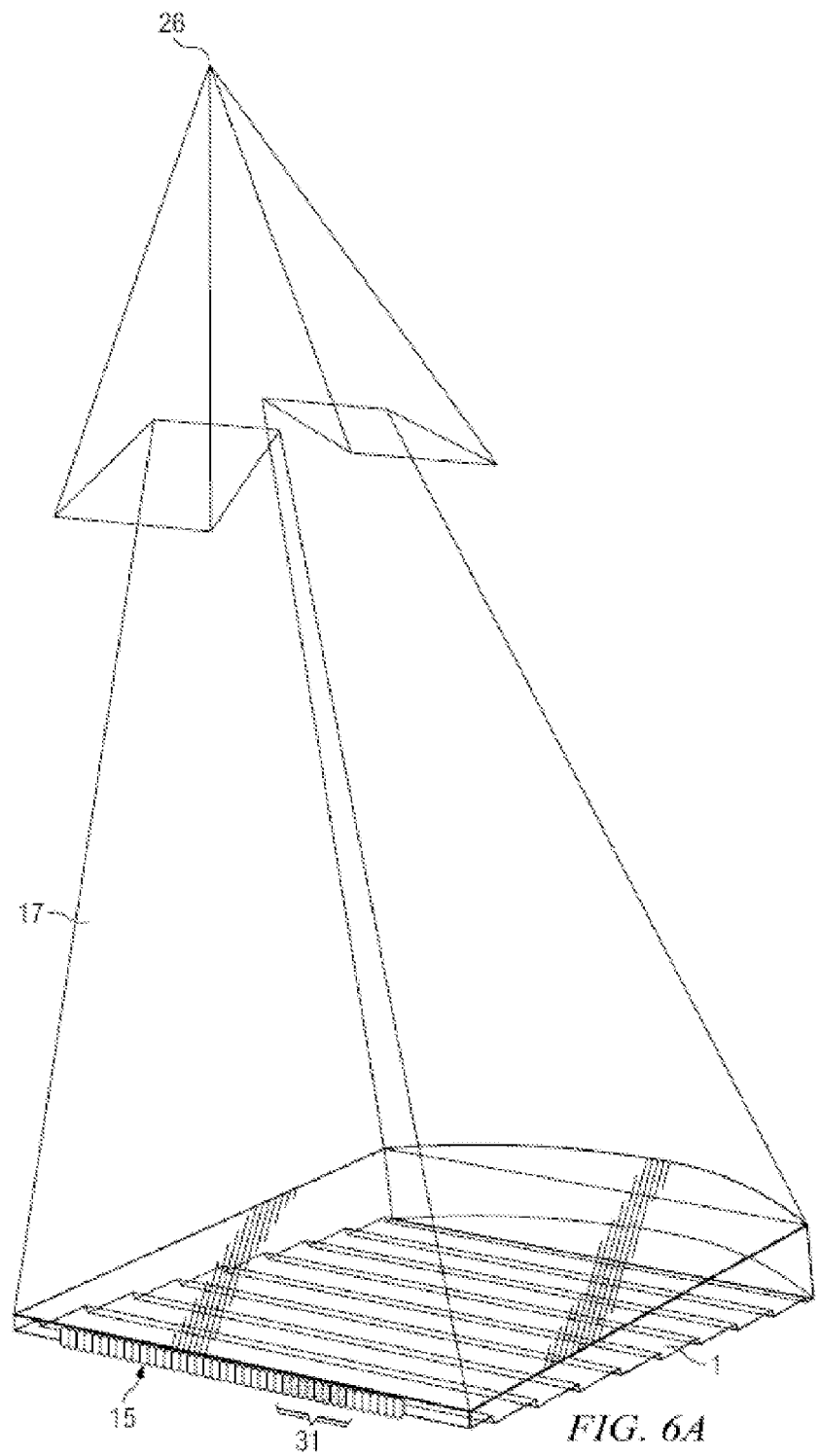
FIG. 6A is a schematic diagram illustrating one embodiment of the generation of a first viewing window in a time multiplexed imaging directional backlight apparatus, in accordance with the present disclosure.
Figure 6B:
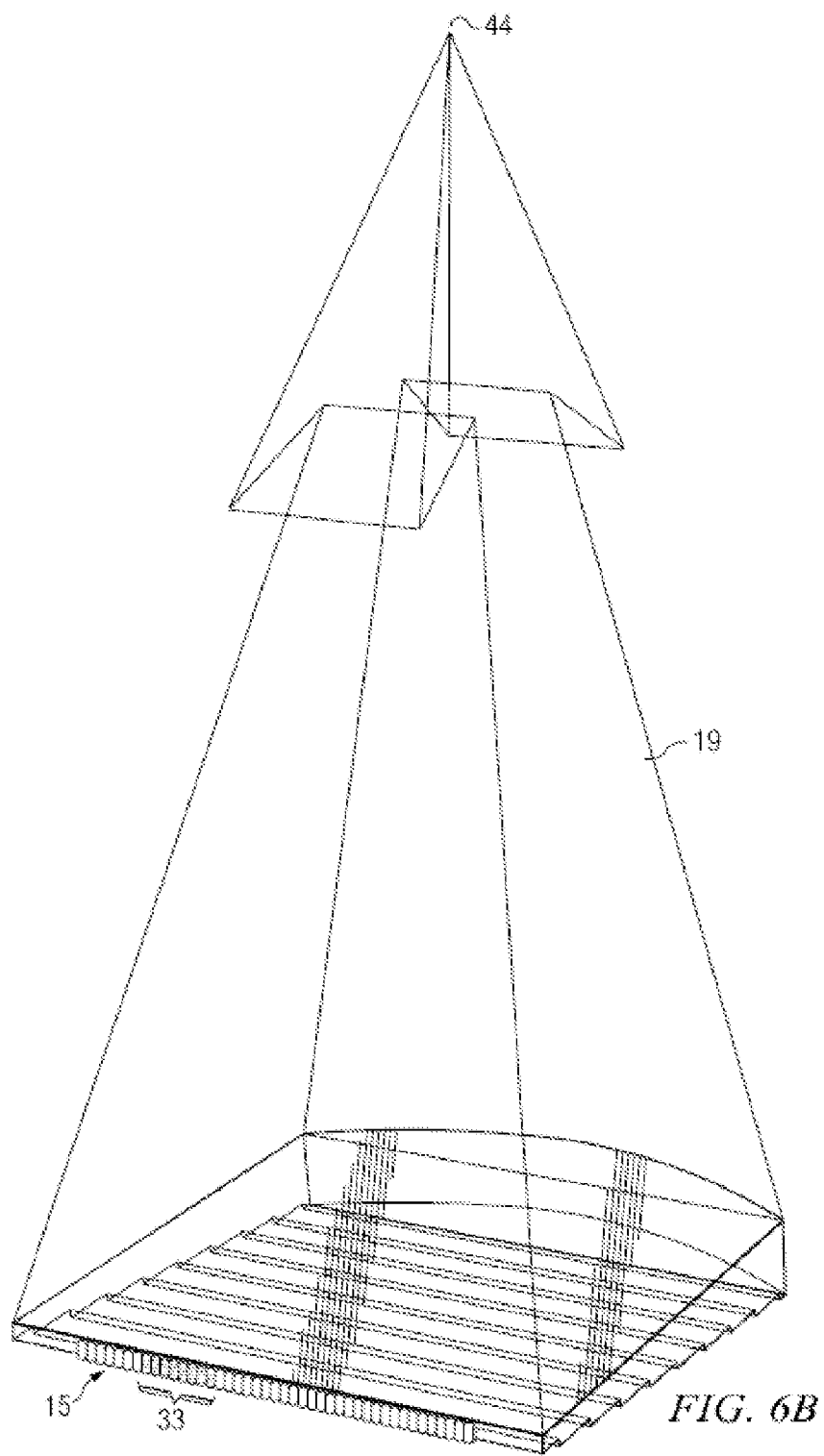
FIG. 6B is a schematic diagram illustrating another embodiment of the generation of a second viewing window in a time multiplexed optical valve apparatus in a second time slot, in accordance with the present disclosure.
Figure 6C:
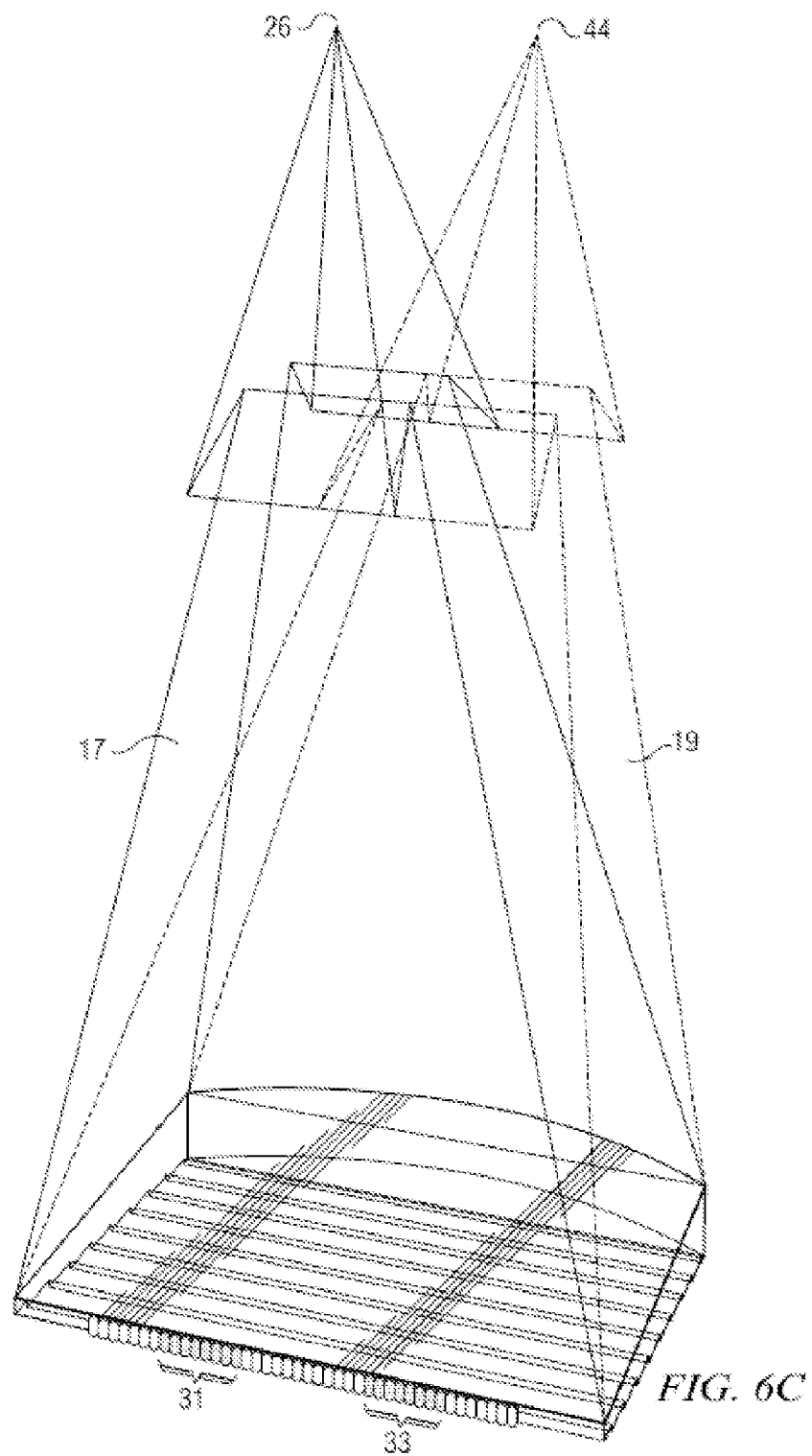
FIG. 6C is a schematic diagram illustrating another embodiment of the generation of a first and a second viewing window in a time multiplexed optical valve apparatus, in accordance with the present disclosure.

FIG. 6A is a schematic diagram illustrating one embodiment of the generation of a first viewing window in a time multiplexed imaging directional backlight apparatus, namely an optical valve apparatus in a first time slot, FIG. 6B is a schematic diagram illustrating another embodiment of the generation of a second viewing window in a time multiplexed imaging directional backlight apparatus in a second time slot, and FIG. 6C is a schematic diagram illustrating another embodiment of the generation of a first and a second viewing window in a time multiplexed imaging directional backlight apparatus. Further, FIG. 6A shows schematically the generation of illumination window 26 from stepped waveguide 1. Illuminator element 15c in illuminator array 15 may provide a light cone 17 directed towards a viewing window 26. FIG. 6B shows schematically the generation of illumination window 44. Illuminator element 15h in illuminator array 15 may provide a light cone 19 directed towards viewing window 44. In cooperation with a time multiplexed display, windows 26 and 44 may be provided in sequence as shown in FIG. 6C. If the image on a spatial light modulator 48 (not shown in FIGS. 6A, 6B, 6C) is adjusted in correspondence with the light direction output, then an autostereoscopic image may be achieved for a suitably placed viewer. Similar operation can be achieved with all imaging optical valve systems or imaging directional backlights.

Figure 7:
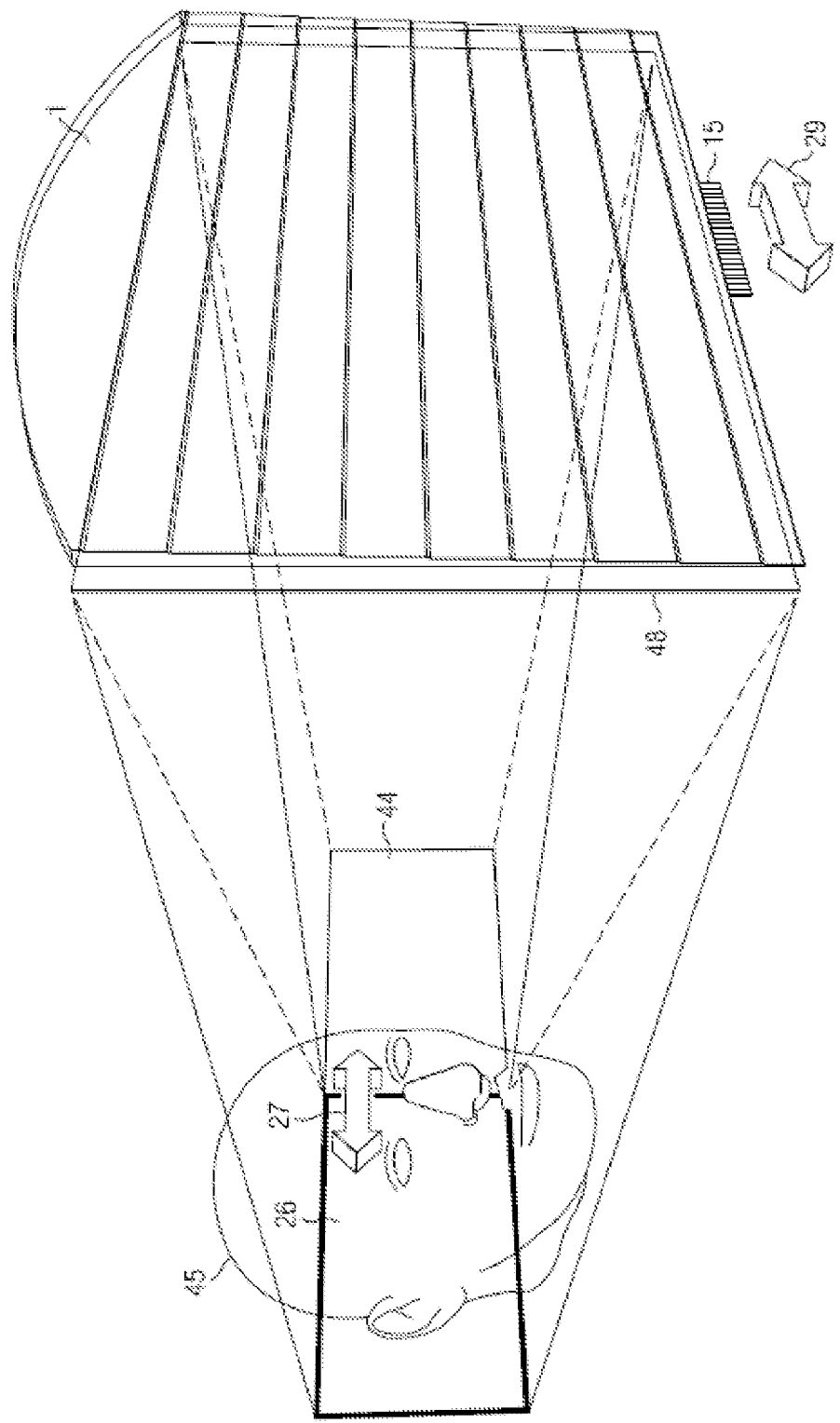
FIG. 7 is a schematic diagram illustrating an observer tracking autostereoscopic display apparatus including a time multiplexed optical valve apparatus, in accordance with the present disclosure.

FIG. 7 is a schematic diagram illustrating one embodiment of an observer tracking autostereoscopic display apparatus including a time multiplexed optical valve apparatus. As shown in FIG. 7, selectively turning on and off illuminator elements 15a to 15n along axis 29 provides for directional control of viewing windows. The head 45 position may be monitored with a sensor system comprising a camera, motion sensor, motion detector, or any other appropriate optical, mechanical or electrical means, arranged to detect the position of an observer relative to the display device. The control system controls the appropriate illuminator elements of illuminator array 15 to direct the displayed images into viewing windows in positions corresponding to the left and right eyes of the observer, in dependence on the detected position of the observer, thereby to provide substantially independent images to each eye irrespective of the head 45 position. The sensor system may be a head tracking system (or a second head tracking system) may provide monitoring of more than one head 45, 47 (head 47 not shown in FIG. 7) and may supply the same left and right eye images to each viewers' left and right eyes providing 3D to all viewers. Again similar operation can be achieved with all imaging optical valve systems or imaging directional backlights.

Figure 8:
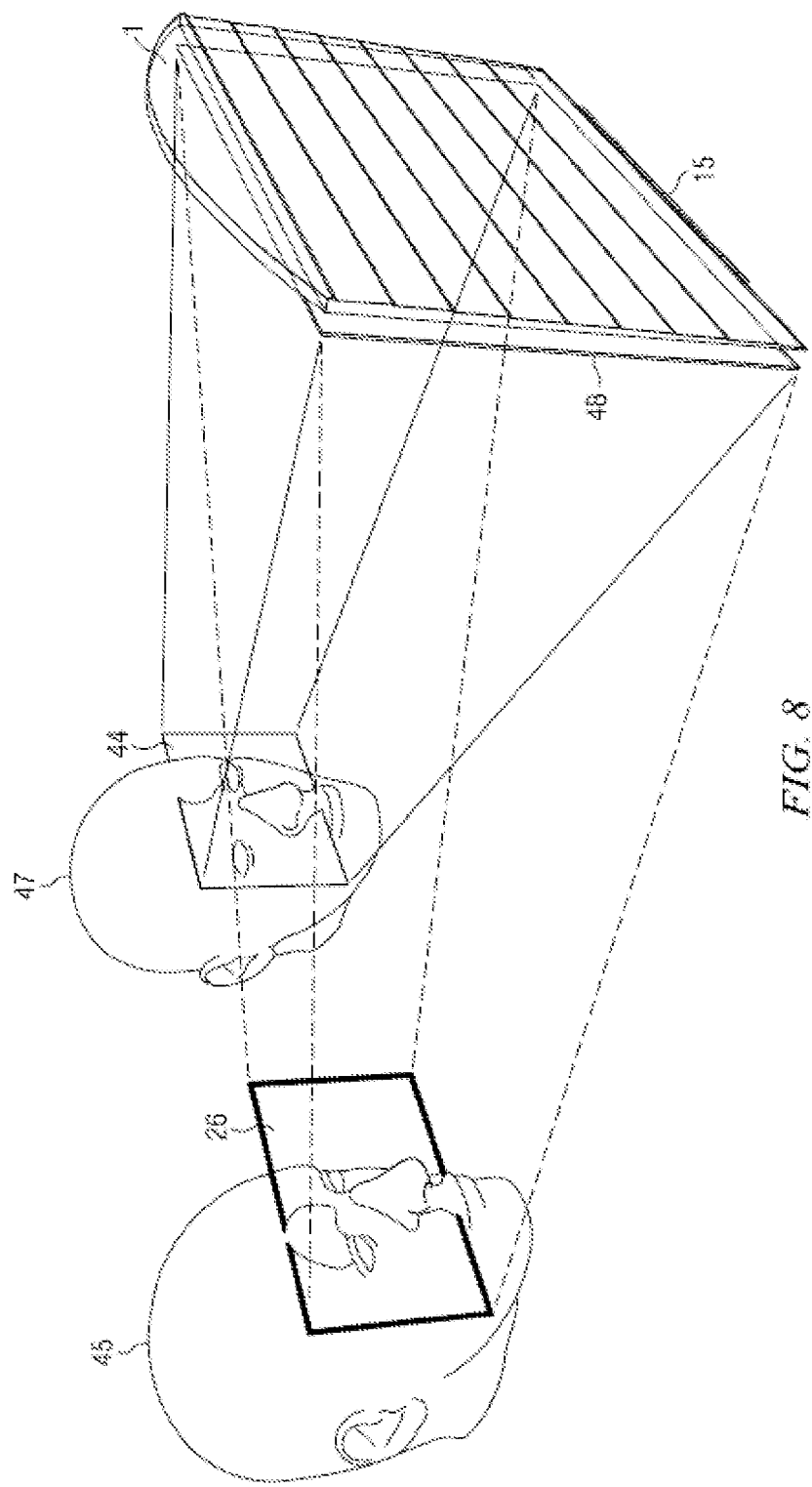
FIG. 8 is a schematic diagram illustrating a multi-viewer display apparatus including a time multiplexed optical valve apparatus, in accordance with the present disclosure.

FIG. 8 is a schematic diagram illustrating one embodiment of a multi-viewer display apparatus which includes a time multiplexed optical valve apparatus as an example of an imaging directional backlight. As shown in FIG. 8, at least two 2D images may be directed towards a pair of viewers 45, 47 so that each viewer may watch a different image on the spatial light modulator 48. The two 2D images of FIG. 8 may be generated in a similar manner as described with respect to FIG. 7 in that the two images may be displayed in sequence and in synchronization with sources whose light is directed toward the two viewers. One image is presented on the spatial light modulator 48 in a first phase, and a second image is presented on the spatial light modulator 48 in a second phase different from the first phase. In correspondence with the first and second phases, the output illumination is adjusted to provide first and second viewing windows 26, 44 respectively. An observer with both eyes in window 26 will perceive a first image while an observer with both eyes in window 44 will perceive a second image.

Figure 9:
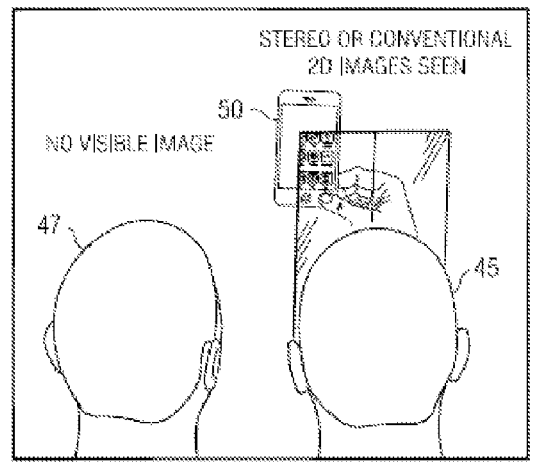
FIG. 9 is a schematic diagram illustrating a privacy display apparatus including an optical valve apparatus, in accordance with the present disclosure.

FIG. 9 is a schematic diagram illustrating a privacy display apparatus which includes an imaging directional backlight apparatus, and as illustrated, an optical valve. 2D display systems may also utilize directional backlighting for security and efficiency purposes in which light may be primarily directed at the eyes of a first viewer 45 as shown in FIG. 9. Further, as illustrated in FIG. 9, although first viewer 45 may be able to view an image on device 50, light is not directed towards second viewer 47. Thus second viewer 47 is prevented from viewing an image on device 50. Each of the embodiments of the present disclosure may advantageously provide autostereoscopic, dual image or privacy display functions.

Figure 10:
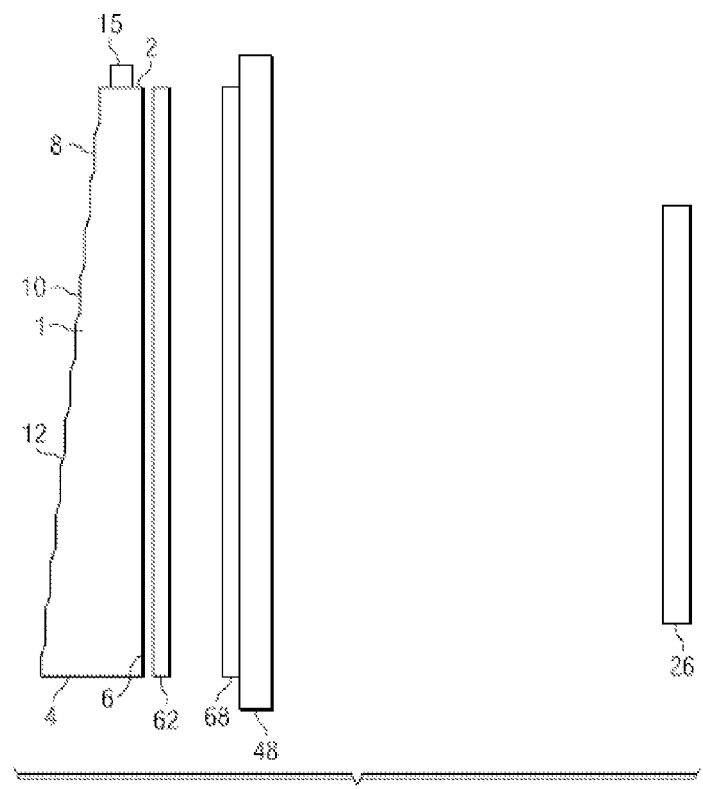
FIG. 10 is a schematic diagram illustrating in side view, the structure of a time multiplexed optical valve apparatus, in accordance with the present disclosure.

FIG. 10 is a schematic diagram illustrating in side view the structure of a time multiplexed optical valve apparatus as an example of an imaging directional backlight. Further, FIG. 10 shows in side view an autostereoscopic display, which may include the stepped waveguide 1 and a Fresnel lens 62 arranged to provide the viewing window 26 for a substantially collimated output across the stepped waveguide 1 output surface. A vertical diffuser 68 may be arranged to extend the height of the window 26 further. The light may then be imaged through the spatial light modulator 48. The illuminator array 15 may include light emitting diodes (LEDs) that may, for example, be phosphor converted blue LEDs, or may be separate RGB LEDs. Alternatively, the illuminator elements in illuminator array 15 may include a uniform light source and spatial light modulator arranged to provide separate illumination regions. Alternatively the illuminator elements may include laser light source(s). The laser output may be directed onto a diffuser by means of scanning, for example, using a galvo or MEMS scanner. In one example, laser light may thus be used to provide the appropriate illuminator elements in illuminator array 15 to advantageously provide a substantially uniform light source with the appropriate output angle, and further to provide reduction in speckle. Alternatively, the illuminator array 15 may be an array of laser light emitting elements. Additionally in one example, the diffuser may be a wavelength converting phosphor, so that illumination may be at a different wavelength to the visible output light.

Figure 11:
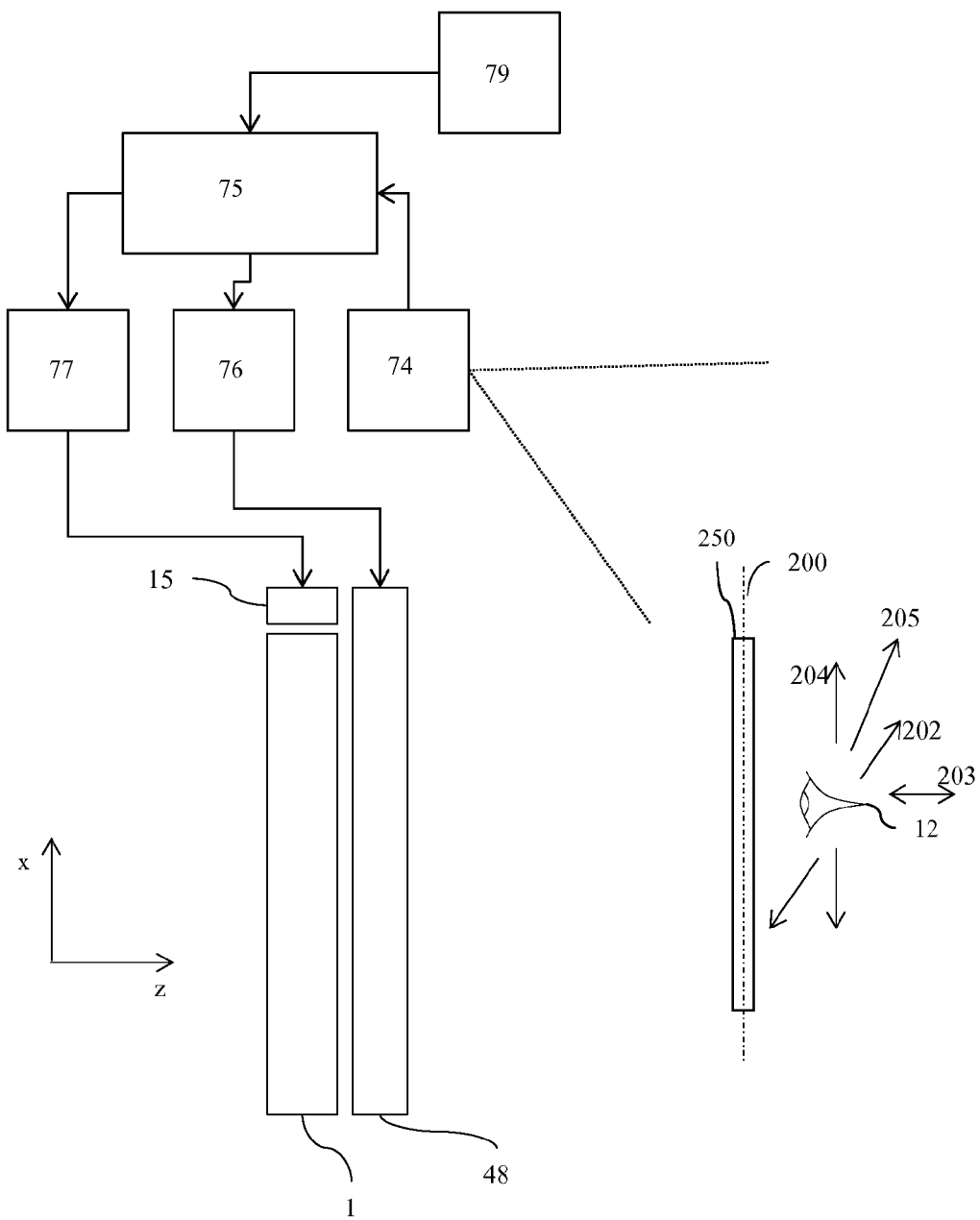
FIG. 11 is a schematic diagram illustrating a side view of an observer tracking autostereoscopic display capable of providing observer tracking in horizontal and vertical directions and comprising a directional backlight and transmissive spatial light modulator, in accordance with the present disclosure.

FIG. 11 is a schematic diagram illustrating an observer tracking time multiplexed autostereoscopic display apparatus for an observer 12 moving in horizontal direction 202 and vertical direction 204 with respect to a rear illuminated autostereoscopic display of the display apparatus. It may also be desirable to track the observer in a single direction 205 that may be orthogonal to the extent of the windows in the window plane, even for inclined viewing windows, for example direction 205 may be at 45 degrees to the horizontal direction 202 and vertical direction 204. The display apparatus comprises a display device comprising a stepped waveguide 1, an illuminator array 15 and a transmissive spatial light modulator 48 such as an LCD.

The display apparatus further comprises a control system as follows. The arrangement and operation of the control system may be applied, as appropriate, to each of the display devices disclosed herein.

An orientation sensor 79 may be used to detect the orientation of the view of the observer and thus to determine landscape or portrait operation of the LCD 48 and an observer tracking system 74 including a sensor such as a camera in cooperation with a computer vision processing system is used to detect the position of an observer in two dimensions across the display device near a nominal viewing plane 200. Thus, the observer tracking system 74 and the orientation sensor 79 together form a sensor system of the control system that detects the position of an observer in two dimensions across the display device and the orientation of the view of the observer. Other types of sensor system could alternatively be provided to obtain this information. For example the observer tracking system 74 could determine both the position and orientation. In that case the orientation could be indicated directly or by indicating the position of both eyes of the viewer.

A system control apparatus 75 of the control system is used to determine the image to be presented by means of an image controller 76 and the illumination from a light emitting element array 15 by means of an illumination controller 77. Such a display provides a viewing window array 250 at a nominal viewing plane 200. The control system and display apparatus can thus achieve the desired illumination and image data to the respective left and right eyes of the observer for movements in horizontal 202 and vertical 204 directions in both landscape and portrait modes of operation. Further such a display is capable of viewing in 2D and 3D modes in landscape and portrait operation. As will be disclosed, such landscape/portrait operation is achieved by means of viewing window array 250 that is inclined at nominally 45 degrees to horizontal and vertical axes of the LCD 48. Thus, the control system controls the display device to display temporally multiplexed left and right images and synchronously to direct the displayed images into viewing windows in positions corresponding to the left and right eyes of the observer, in dependence on the detected position of the observer and on the detected orientation of the view.

Figure 12:
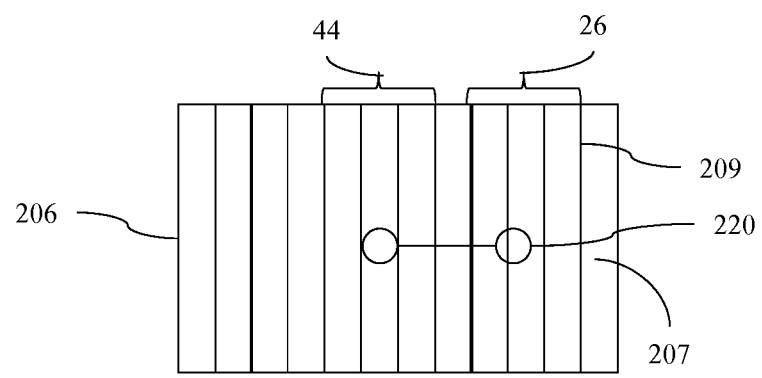
FIG. 12 is a schematic diagram illustrating a front view of an array of viewing windows of an autostereoscopic display during landscape operation, in accordance with the present disclosure.

FIG. 12 is a schematic diagram illustrating a front view of the array 206 of optical windows comprising a vertical optical window orientation for viewing a display in landscape mode. The array of pixels of the SLM 48 are arranged in an aperture that has a rectangular shape. The windows are arranged to comprise left and right eye image data. An observer 210 with right eye position 220 will see an orthoscopic 3D image, formed by composite windows (comprising groups of sub-windows) 26, 44. Observer movement in the horizontal direction can be achieved by adjusting the position of composite window 26, 44 by means of controlling the switching time (phase) and intensity of the sub-windows of the array 206. An observer moving in the vertical direction can maintain an orthoscopic image without adjusting the position or image content of the composite windows. It may be desirable to track the observer in a single direction 205 (as illustrated in FIG. 11) that may be orthogonal to the extent of the windows in the window plane, even for inclined viewing windows, for example direction 205 may be at 45 degrees to the horizontal direction 202 and vertical direction 204. It may further be desirable to track the observer in two dimensions, for example horizontally 202 and vertically 204 or in the direction 205 orthogonal to the extent of the windows in the window plane and longitudinal direction 203. It may further be desirable to track the observer in three dimensions, for longitudinal, horizontal and vertical directions 203, 202, 204 respectively.

Figure 13:
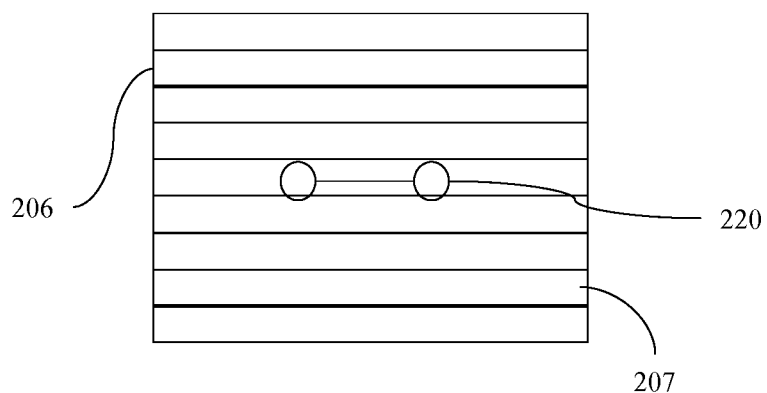
FIG. 13 is a schematic diagram illustrating a front view of an array of viewing windows of an autostereoscopic display during portrait operation, in accordance with the present disclosure.

FIG. 13 is a schematic diagram illustrating a front view of the array 206 of optical windows comprising a horizontal optical window orientation for viewing a display in portrait mode. Thus the window array 206 has rotated horizontally together with the display, for example in a mobile display used for landscape and portrait operations. Observer 220 has both eyes in the same horizontally extended window and no autostereoscopic image may be perceived, instead a single 2D view is seen.

It may be desirable to provide a display system that can be used in landscape and portrait modes for 3D operation, particularly for mobile display platforms and also rotatable desktop and advertising displays for example.

Figure 14:
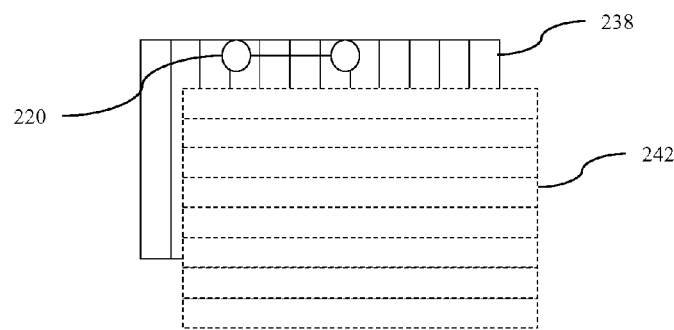
FIG. 14A is a schematic diagram illustrating a front view of an array of viewing windows from an autostereoscopic display apparatus comprising two sets of independently switchable windows for landscape operation, in accordance with the present disclosure.
FIG. 14B is a schematic diagram illustrating a front view of an array of viewing windows from an autostereoscopic display apparatus comprising two sets of independently switchable windows for portrait operation, in accordance with the present disclosure.
Figure 14B:
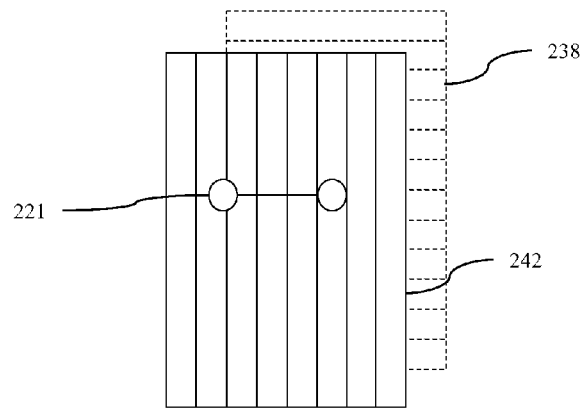

FIG. 14A is a schematic diagram illustrating a front view of an array of viewing windows from an autostereoscopic display that comprises two sets of independently switchable optical windows 238 and 242 controlled to provide landscape operation but is otherwise similar to the previously discussed displays. Such a display may comprise for example a pair of autostereoscopic displays with the outputs combined by means of a beam combining semi-mirror as known in the art. Thus the observer 220 sees light from window array 238 and little to no light from window array 242. Such an observer can be tracked as described above. Similarly, FIG. 14B is a schematic diagram illustrating a front view of an array of viewing windows from an autostereoscopic display comprising two sets of independently switchable optical windows 238 and 242 controlled to provide portrait operation. Thus the observer 220 sees light from window array 242 and little to no light from window array 238. In this manner, two directional backlights can achieve two independently tracked window arrays 238, 242 for landscape and portrait operation. Disadvantageously such a system has increased cost, thickness and light losses compared to a single stepped waveguide arrangement.

Figure 15A:
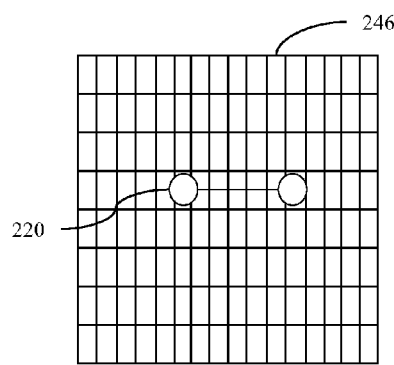
FIG. 15A is a schematic diagram illustrating a front view of an array of viewing windows from an autostereoscopic display apparatus comprising a two dimensional window array for landscape operation, in accordance with the present disclosure.
Figure 15B:
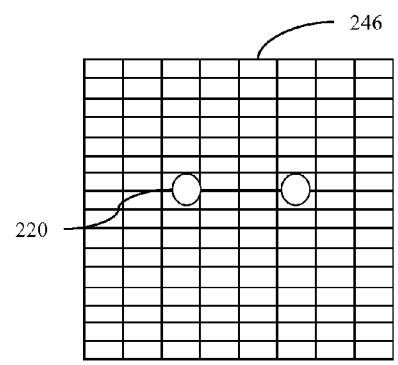
FIG. 15B is a schematic diagram illustrating a front view of an array of viewing windows from an autostereoscopic display apparatus comprising a two dimensional window array for portrait operation, in accordance with the present disclosure.

FIG. 15A is a schematic diagram illustrating a front view of an array of viewing windows from an autostereoscopic display apparatus comprising a two dimensional array of optical windows controlled to provide landscape operation for an observer 220 and FIG. 15B is a schematic diagram illustrating a front view of an array of viewing windows from an autostereoscopic display apparatus comprising a two dimensional array of optical windows controlled to provide portrait operation for an observer 220. Window array 246 may comprise independently controlled windows for horizontal and vertical observer position movement in both landscape and portrait modes. Such a display may be provided by means for example of an integral imaging display comprising a microlens array in alignment with a spatial light modulator as known in the art. Disadvantageously such an arrangement has reduced resolution 3D images.

Figure 16A:
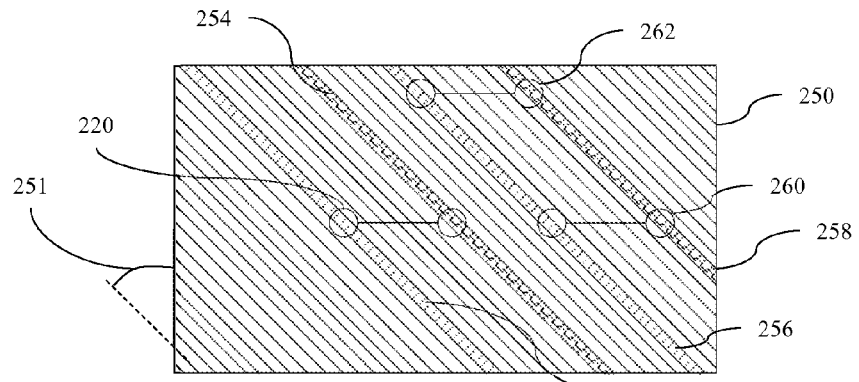
FIG. 16A is a schematic diagram illustrating a front view of an array of viewing windows for providing landscape and portrait operation from an autostereoscopic display apparatus when used in landscape mode, in accordance with the present disclosure.
Figure 16B:
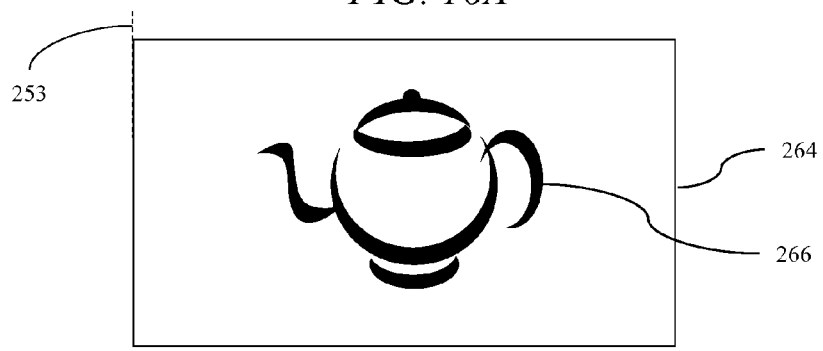
FIG. 16B is a schematic diagram illustrating a front view of an image from an autostereoscopic display apparatus in landscape mode, in accordance with the present disclosure.

There will now be described an autostereoscopic display apparatus in which the array of pixels of the SLM 48 are arranged in an aperture that has a rectangular shape, but is capable of providing landscape and portrait operation. FIG. 16A is a schematic diagram illustrating a front view of an array of optical windows 250 from an autostereoscopic display apparatus when used in landscape mode and FIG. 16B is a schematic diagram illustrating a front view of an image from the autostereoscopic display apparatus in landscape mode. Thus optical windows 250 are inclined at an angle 251 that is in a range around 45 degrees to an axis of mirror symmetry of the rectangular shape of the aperture, in this example the minor axis of mirror symmetry 253, although of course the angle to the major axis of mirror symmetry. The range may be from 25 to 65 degrees, preferably from 30 to 60 degrees, more preferably from 35 and 55 degrees and more preferably between 40 and 50 degrees and most preferably at 45 degrees. The line between the observer's eyes is thus substantially orthogonal to the panel axis for landscape viewing and parallel to the panel axis for portrait viewing. In landscape mode, observer sees image 266 on the panel 264 for one eye.

The angled viewing windows may be controlled by the control system to provide autostereoscopic display of images in varied orientations of the display device, by controlling the display in dependence on a detected position of the observer and on a detected orientation of the view. In particular, since the angled windows are separated along both axes of mirror symmetry, left and right images can be directed to be displayed images in viewing windows in positions corresponding to the left and right eyes of the observer, when the display apparatus is viewed in orientations in which either axis is at or around vertical, as follows.

FIGS. 16A and 16B illustrate the operation when the detected orientation is a landscape view, for example, when the axis 253 or mirror symmetry is vertical. For an observer 220 at a known horizontal and vertical position with respect to the display, the sub-window 252 (and adjacent sub-windows) may comprise left eye image data and the sub-window 254 may comprise right eye image data. If the observer moves laterally to a position 260, then the sub-window 256 may be addressed with left eye data and the sub-window 258 may comprise right eye data. If the observer moves further vertically and horizontally in a 45 degrees direction to position 262 then the window data may remain unchanged even though there has been a component of lateral movement. Thus an observer tracking system must determine observer position in two directions and update the display accordingly. Further if the longitudinal position is known then the display can be updated in view slices to increase the viewing freedom.

Figures 17A, 17B:
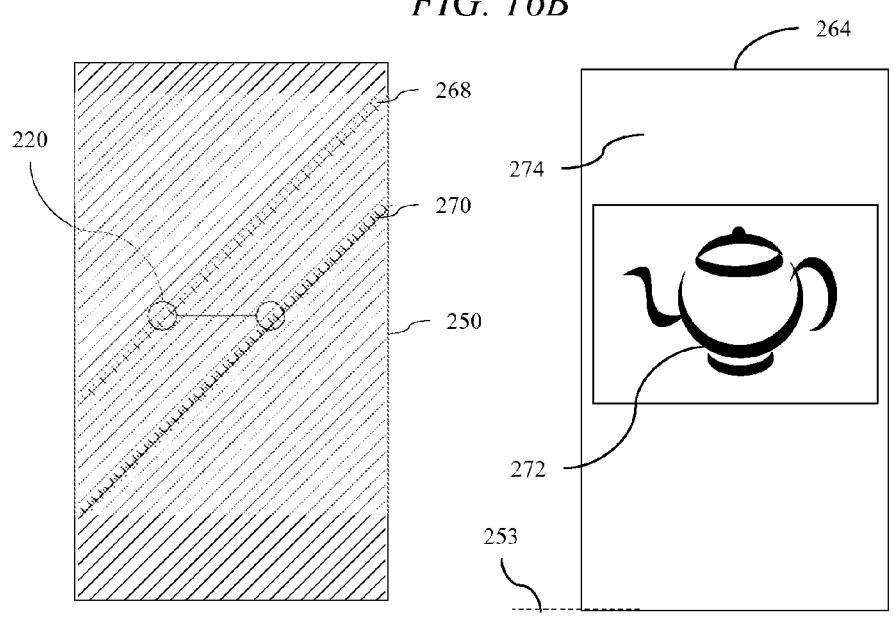
FIG. 17A is a schematic diagram illustrating a front view of an array of viewing windows for providing landscape and portrait operation from an autostereoscopic display apparatus when used in portrait mode, in accordance with the present disclosure.
FIG. 17B is a schematic diagram illustrating a front view of an image from an autostereoscopic display apparatus in portrait mode, in accordance with the present disclosure.

FIGS. 17A and 17B illustrate the operation when the detected orientation is a portrait view, for example, when the minor axis of mirror symmetry 253 is horizontal. FIG. 17A is a schematic diagram illustrating a front view of an array 250 of optical windows for providing landscape and portrait operation from an autostereoscopic display apparatus when used in portrait mode. FIG. 17B is a schematic diagram illustrating a front view of an image from an autostereoscopic display apparatus in portrait mode. In this embodiment, sub-window 268 may be addressed with left eye image data while sub-window 270 may be addressed with right eye image data. The portrait image may comprise stereo image data 272 and 2D image data 274 for example. In this manner, advantageously a single one dimensional (for example, extended in a 45 degree direction) set of windows from a single parallax optical system may be arranged to achieve landscape and portrait operation when used in cooperation with an observer tracking system. Such an arrangement can achieve increased efficiency and reduced cost compared to systems capable of achieving two dimensional window arrays.

Figure 18:
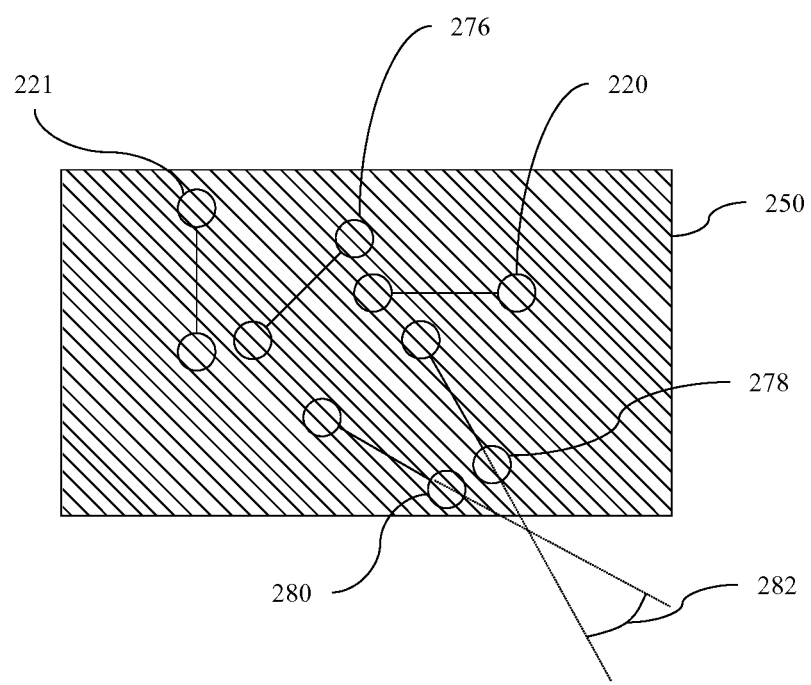
FIG. 18 is a schematic diagram illustrating a front view of an array of viewing windows for landscape and portrait operation schematically illustrating limits on panel rotation angle, in accordance with the present disclosure.

FIG. 18 is a schematic diagram illustrating a front view of an array of optical windows 250 for landscape and portrait operation schematically illustrating limits on panel rotation angle. Thus observer 220, 221, 276 can be presented with well controlled stereoscopic images. For observers in the angular range 282 and bounded by observer positions 278, 280 then little or no stereoscopic image will be seen. For these observer orientations, the control system may be arranged to address the panel with 2D data to avoid loss of fidelity from image cross talk.

Time multiplexed autostereoscopic displays advantageously achieve high resolution images in 2D and 3D modes. It may be desirable to provide a time multiplexed autostereoscopic display apparatus that can achieve landscape and portrait modes of operation from single optical systems that provide a one dimensional array of viewing windows, thus reducing system complexity and cost. There will now be described some specific display apparatuses in which the operation described above may be applied.

Figure 19A:
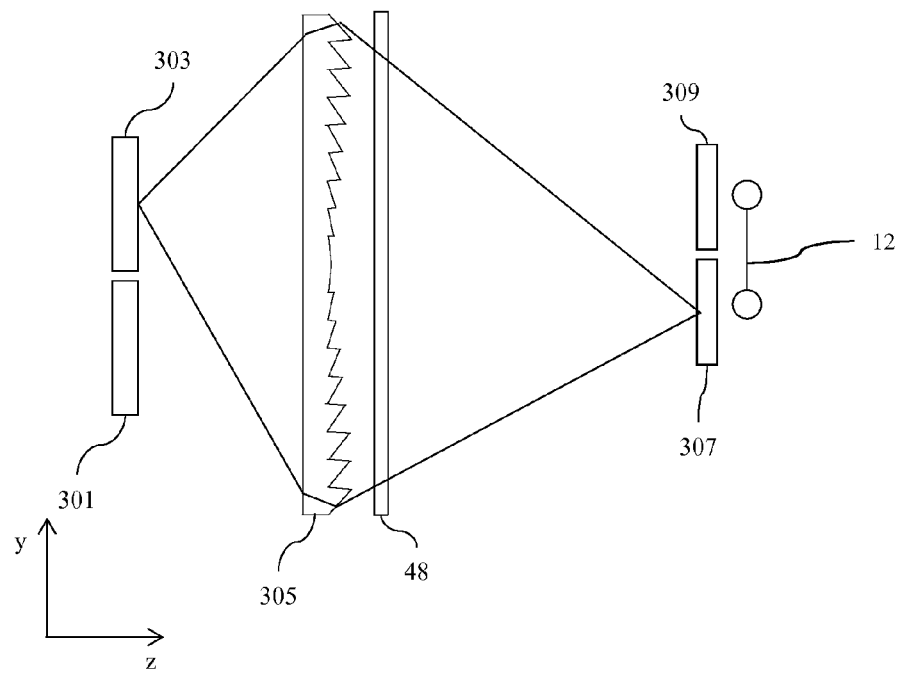
FIG. 19A is a schematic diagram illustrating a side view of a time sequential autostereoscopic display arranged to achieve viewing windows arranged at 45 degrees for landscape and portrait modes of operation, in accordance with the present disclosure.

FIG. 19A is a schematic diagram illustrating a side view of a time sequential autostereoscopic display comprising an SLM 48 that comprises an array of pixels arranged in an aperture that has a rectangular shape (as described further below). The display is configured to provide viewing windows arranged in a range around 45 degrees for landscape and portrait modes of operation. A light source array may comprise at least two light emitting elements 301, 303 arranged at the back working distance of a Fresnel lens 305 arranged to image the respective elements 301, 303 to viewing windows 307, 309 through LCD 48 to be observed by observer 12.

Figure 19B:
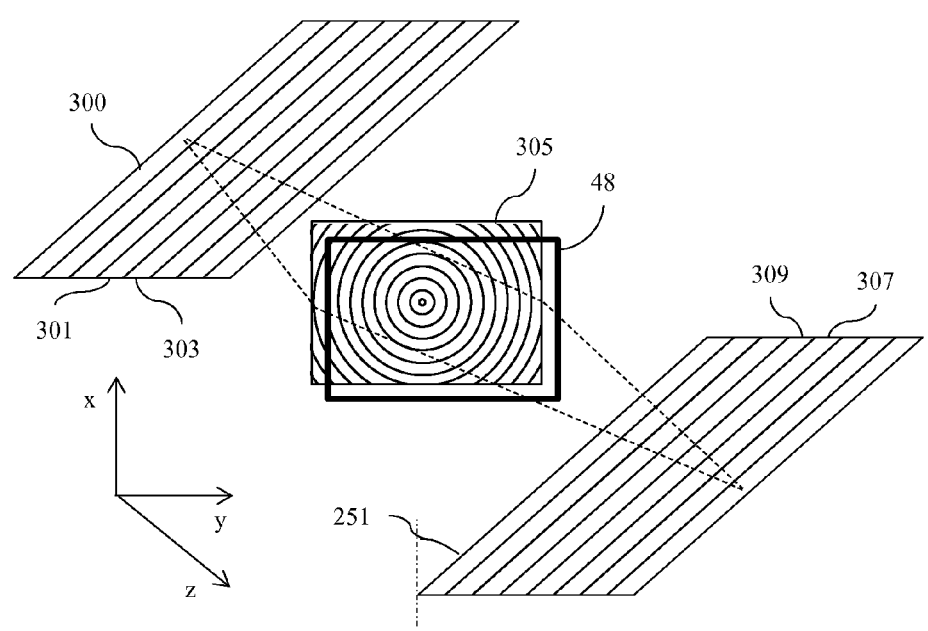
FIG. 19B is a schematic diagram illustrating a front view of the structure of a time sequential autostereoscopic display arranged to achieve viewing windows arranged at 45 degrees for landscape and portrait modes of operation, in accordance with the present disclosure.

FIG. 19B is a schematic diagram illustrating a front view of the structure of the same time sequential autostereoscopic display. The optical windows 307, 309 are inclined at an angle that is in a range around 45 degrees to an axis of mirror symmetry of the rectangular shape of the aperture, the range being as described above. This is achieved by the light source array 300 being arranged at an angle 251 with respect to the axis of mirror symmetry of the rectangular shape of the aperture.

Figure 19C:
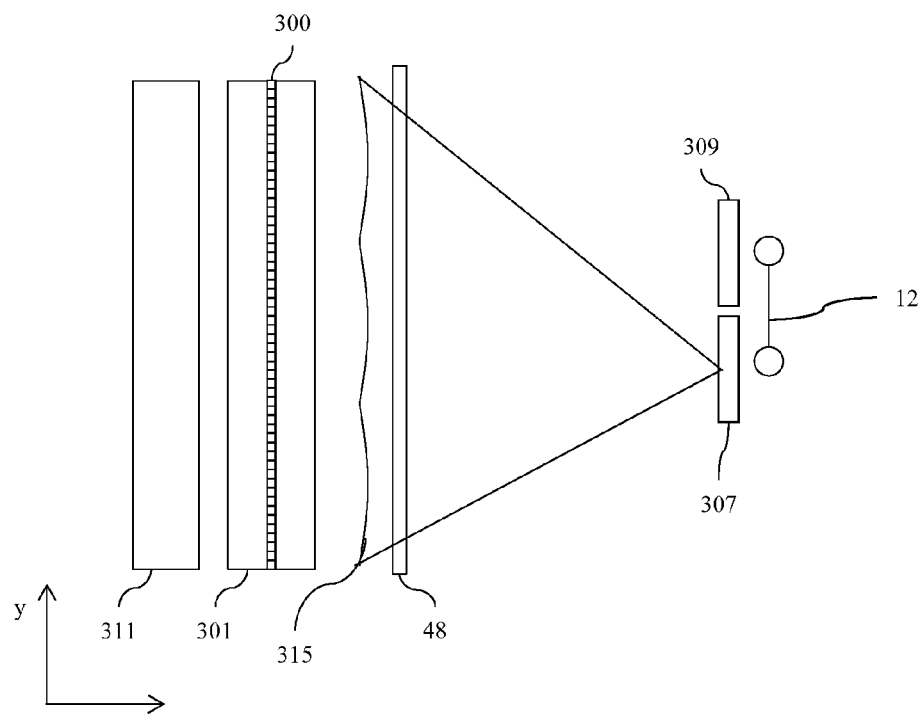
FIG. 19C is a schematic diagram illustrating a side view of a time sequential autostereoscopic display arranged to achieve viewing windows arranged at 45 degrees for landscape and portrait modes of operation, in accordance with the present disclosure.
Figure 19D:
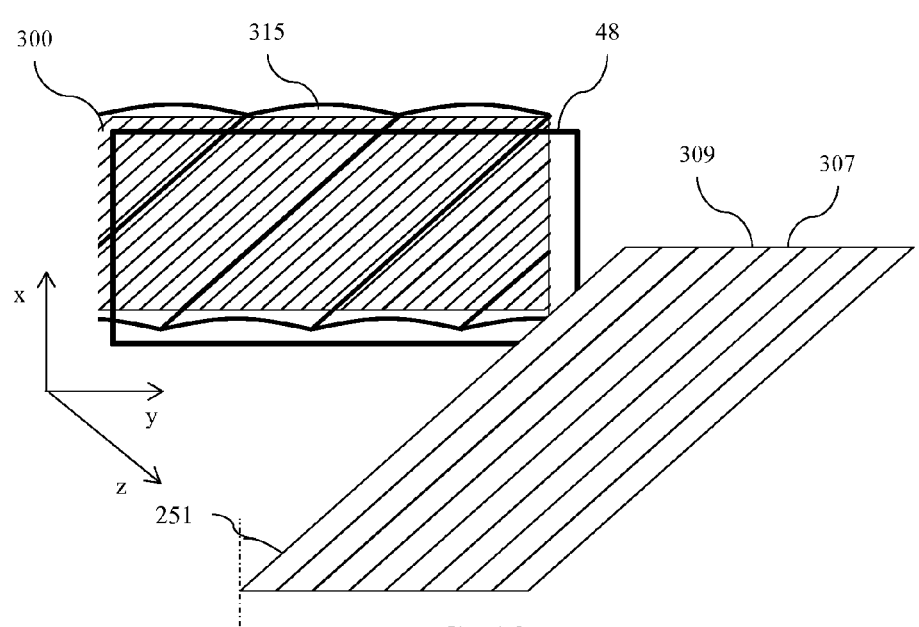
FIG. 19D is a schematic diagram illustrating a front view of the structure of a time sequential autostereoscopic display arranged to achieve viewing windows arranged at 45 degrees for landscape and portrait modes of operation, in accordance with the present disclosure.

FIG. 19C is a schematic diagram illustrating a side view of a time sequential autostereoscopic display arranged to achieve viewing windows arranged at 45 degrees for landscape and portrait modes of operation. The optical windows 307, 309 are inclined at an angle that is in a range around 45 degrees to an axis of mirror symmetry of the rectangular shape of the aperture, the range being as described above. The display may comprise a light source array 300 that is inclined at 45 degrees to a lens array 315. The light source array may comprise a backlight 311 and a spatial light modulator 301 that may comprise a liquid crystal display for example. FIG. 19D is a schematic diagram illustrating a front view of the structure of the same time sequential autostereoscopic display arranged to achieve viewing windows arranged at 45 degrees for landscape and portrait modes of operation. Both the array 300 and the lens array 315 are typically inclined in a range around 45 degrees to achieve the inclined viewing windows 307, 309. Advantageously the present embodiment reduces the back working distance compared to the arrangement of FIG. 19A.

Each of the displays in FIGS. 19A to 19D are controlled by the control system using the sensor system shown in FIG. 11 in the manner described above to provide landscape and portrait modes of operation.

Figure 19E:
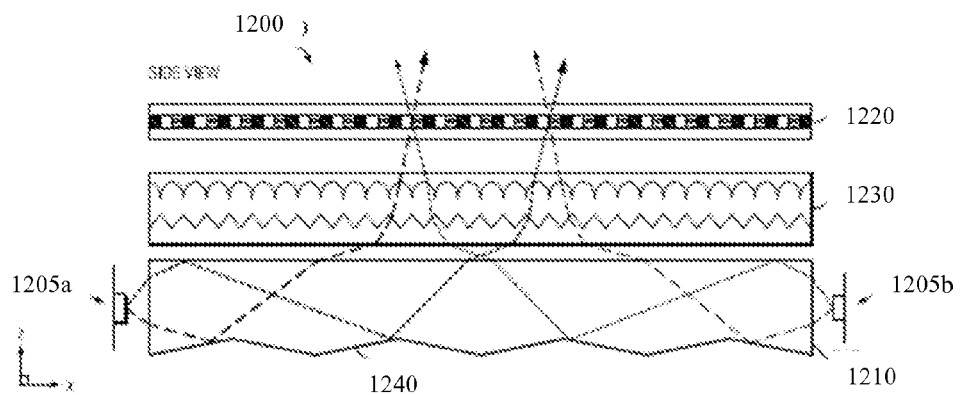
FIG. 19E is a schematic diagram illustrating a side view of a time sequential autostereoscopic display, in accordance with the present disclosure.

FIG. 19E is a schematic diagram illustrating a side view of a time sequential autostereoscopic display arranged to achieve two viewing windows as discussed in U.S. Pat. No. 7,750,982 to Nelson et al. which is herein incorporated by reference. Left and right illumination elements 1205a, 1205b are arranged to illuminate a waveguide 1210 comprising extraction features 1240 arranged to achieve left and right windows in cooperation with light directing element 1230 through spatial light modulator 1220. In the present embodiments, such a display may be modified so that it can be arranged with optical windows arranged in a range around 45 degrees for landscape and portrait modes of operation.

Figure 19F:
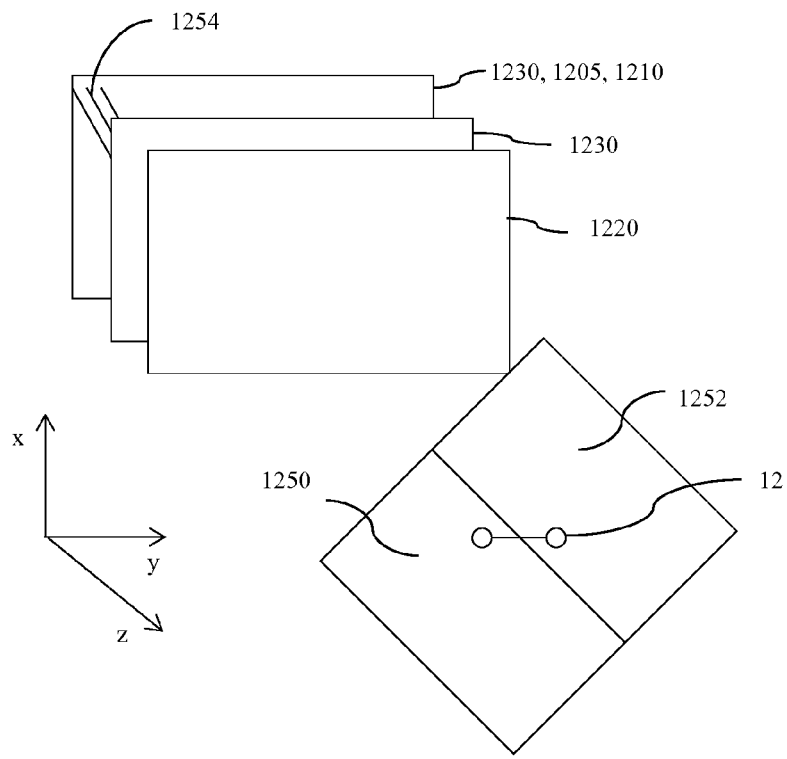
FIG. 19F is a schematic diagram illustrating a front view of the structure of a time sequential autostereoscopic display arranged to achieve two viewing windows arranged at 45 degrees for landscape and portrait modes of operation, in accordance with the present disclosure.

FIG. 19F is a schematic diagram illustrating a front view of the structure of a time sequential autostereoscopic display arranged to achieve two viewing windows arranged in a range around 45 degrees for landscape and portrait modes of operation as shown in FIG. 19E. The features 1254 comprising extraction features 1240 and element 1230 may be aligned at an angle with respect to the major axes of the spatial light modulator 1220. Advantageously such a structure achieves a relatively thin optical structure. Viewing windows may be arranged in a range around 45 degrees to the panel major axis to achieve landscape and portrait operation for a given vertical height of the viewer with respect to the window position.

It may be further desirable to provide a stepped waveguide autostereoscopic display apparatus using a one dimensional light source array and a single stepped waveguide to achieve landscape and portrait modes of operation. It may thus be desirable to provide a stepped waveguide apparatus that can achieve viewing windows oriented at 45 degree to the major axis of the image from the LCD 48.

The following display devices are based on and incorporate the structures of FIGS. 1 to 10. Accordingly, except for the modifications and/or additional features which will now be described, the above description applies to the following apparatuses but for brevity will not be repeated. The following displays incorporate a stepped waveguide 1 as described above but with the following modifications to provide viewing windows inclined at an angle that is in a range around 45 degrees to an axis of mirror symmetry of the rectangular shape of the aperture, the range being as described above. In each case the optical axis of the waveguide 1 extends from the input end 2 to the reflective end 4. The optical axis is defined by the optical elements in the light path, for example the reflective end 4 if it is a curved mirror, the extraction features if they are curved, or other components having optical power as described below. In most cases, the optical axis of the waveguide is perpendicular to the input end 2. In many cases the optical axis is central in the waveguide, but in some cases it is offset as described below.

Each of the following displays is controlled by the control system using the sensor system shown in FIG. 11 in the manner described above to provide landscape and portrait modes of operation.

Figure 20:
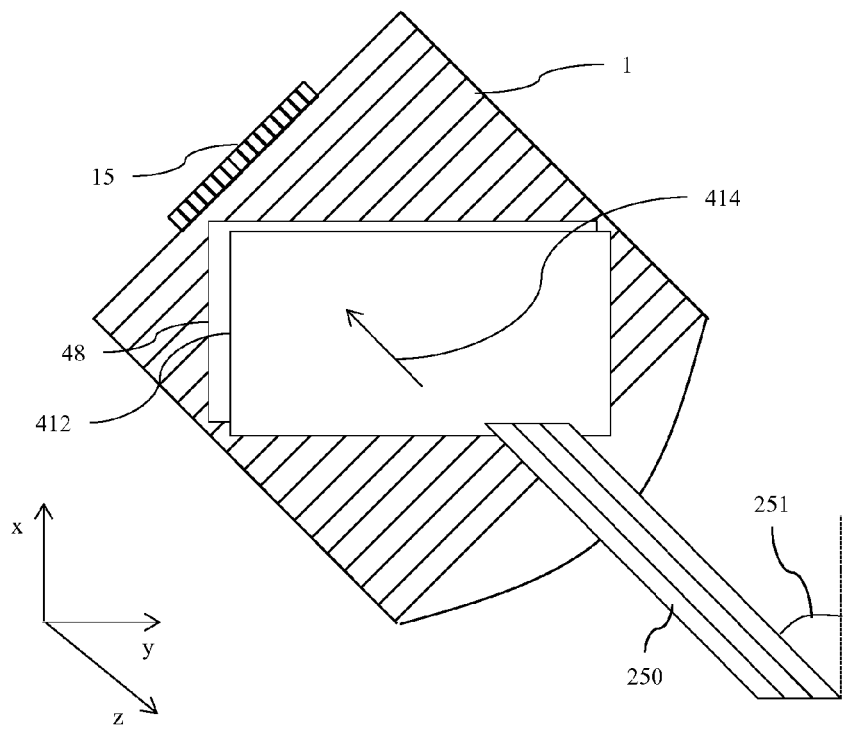
FIG. 20 is a schematic diagram illustrating a front view of an autostereoscopic display comprising a stepped imaging directional backlight arranged to achieve landscape and portrait operation, in accordance with the present disclosure.

FIG. 20 is a schematic diagram illustrating a front view of a stepped waveguide 1 aligned in a range around 45 degrees to an LCD for landscape and portrait viewing. Thus stepped waveguide 1 achieves viewing windows that are extended orthogonally to the direction of light extraction features 12 in cooperation with asymmetric diffuser 412. The viewing windows are at angle 251 in a range around 45 degrees to the vertical axis of the LCD 48 so that observer tracking for landscape and portrait orientations can be achieved. Thus, the waveguide 1 is oriented with respect to the SLM 48 with the optical axis of the waveguide extending at the same angle to the axis of symmetry the shape of the aperture of the SLM 48 as the extent of the viewing windows. Such an arrangement has a large bezel size.

Figure 21:
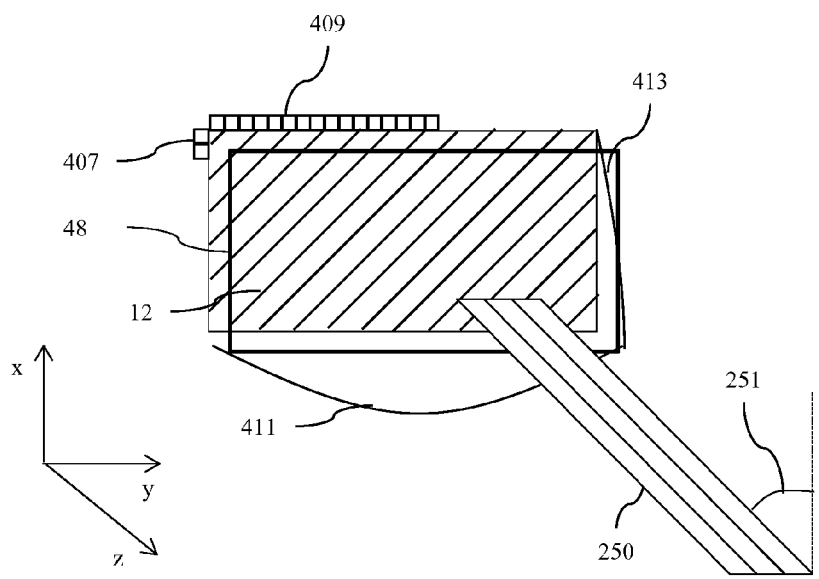
FIG. 21 is a schematic diagram illustrating a front view of an autostereoscopic display comprising a stepped imaging directional backlight arranged to achieve landscape and portrait operation, in accordance with the present disclosure.

FIG. 21 is a schematic diagram illustrating a front view of a stepped waveguide arranged with tilted light extraction features 12 for landscape and portrait viewing. For illustrative purposes, diffuser 412 is omitted. Such an arrangement may achieve a smaller bezel size by incorporating light emitting elements in arrays 407, 409 on two edges of the stepped waveguide, and correspondingly two reflecting sides 411, 413 with optical power on other edges. Thus, the waveguide 1 is again oriented with respect to the SLM 48 with the optical axis of the waveguide extending at the same angle to the axis of symmetry of the shape of the aperture of the SLM 48 as the extent of the viewing windows. Features may be oriented to the vertical, for example at 22.5 degrees to achieve viewing windows 250 at an angle 251 of 45 degrees. However, such an arrangement may suffer from multiple sets of viewing windows that are not accurately aligned as well as other optical artifacts.

It may be desirable to arrange stepped waveguide to achieve 45 degree window orientation with a form factor that is aligned with the LCD 48 with high image quality in a thin package and at low cost. To achieve this, in the following displays, the waveguide 1 is oriented with respect to the SLM 48 with the optical axis of the waveguide 1 extending parallel or perpendicular to an axis of symmetry of the shape of the aperture, and to achieve the desired viewing window angle, one or more optical elements of the display are arranged to rotate the viewing windows around the normal to the SLM 48.

Figure 22:
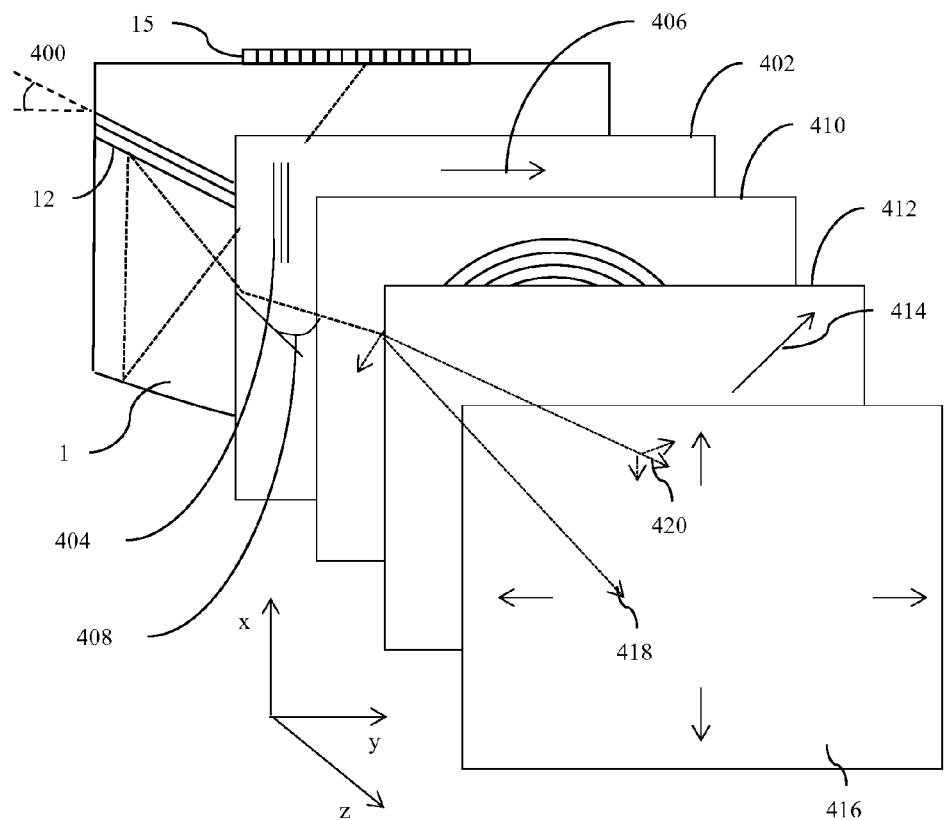
FIG. 22 is a schematic diagram illustrating a front view of an autostereoscopic display comprising a stepped imaging directional backlight arranged to achieve landscape and portrait operation, in accordance with the present disclosure.

FIG. 22 is a schematic diagram illustrating a front view of an autostereoscopic display comprising a stepped imaging directional backlight arranged to achieve landscape and portrait operation; that does not comprise a reflective optical element 460. In this display, the optical axis of the waveguide 1 extends parallel to the minor axis of the shape of the aperture. Stepped waveguide 1 comprises light extraction features 12 that are oriented to extend at an angle 400 to the horizontal axis that is non-zero. Furthermore, the light extraction features 12 are inclined relative to the optical axis of the waveguide 1 in a plane containing the normal to the SLM 48 and at a non-zero angle to the optical axis. Herein, the reference to the light extraction features 12 (or other features) being inclined "in a plane" has its normal meaning that the light extraction features 12 (or other features) are inclined as viewed in that plane, notionally as though the inclination is achieved by a rotating the light extraction features 12 (or other features) from a non-inclined state around a normal to that plane.

As a result of the reflection occurring at the light extraction features 12, the optical windows are rotated around the normal to the SLM 48. Light directed from extraction features 12 achieves a window orientation of 45 degrees to the horizontal axis. However, the inclination also causes deflection of the light reflected by the light extraction features 12 away from the normal to the SLM 48 by the same angle. Accordingly, an asymmetric diffuser 412 may be provided in front of the waveguide 1 as a correction element arranged to deflect light that has exited the waveguide 1 back towards the normal to the SLM 48, and thereby compensate for that deflection. The asymmetric diffuser 412 is inclined with major diffusion axis 414 at an angle of 45 degrees so as to achieve extended window array in a range around 45 degrees suitable for landscape and portrait operation. Thus light rays 420 are diffused along a 45 degree axis 414. Fresnel lens 410 may be used to collect the light from the features 12 and direct to a window array 250.

Instead of the asymmetric diffuser 412, a different correction element to deflect light back towards the normal to the SLM 48, and thereby compensate for the deflection of the optical windows at the light extraction windows, for example a prismatic array or a Fresnel lens offset from the optical axis. Another possibility is that the light extraction features are concave and have an optical axis that is offset from the optical axis of the waveguide 1, by an amount that compensates for the deflection of the light reflected by the light extraction features 12 away from the normal to the SLM 48.

Figure 23:
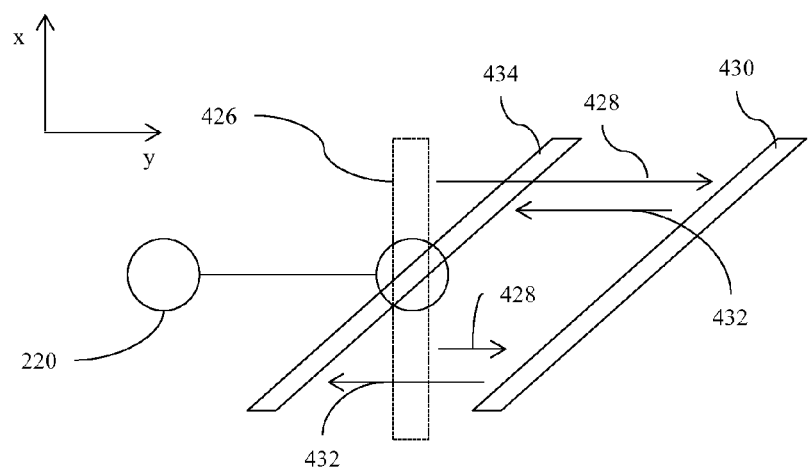
FIG. 23 is a schematic diagram illustrating a front view of the processing of viewing windows by the apparatus of FIG. 22, in accordance with the present disclosure.

FIG. 23 is a schematic diagram illustrating a front view of the processing of viewing windows through the structure of FIG. 22. If angle 400 in FIG. 22 were to be set an angle of 0 degrees then vertical sub-window 426 may be achieved. However, the rotated and tilted features 12 of the present embodiment rotate and translate the respective window 426 to a position of window 430 in the window plane. Thus the centre of illumination power of the sub-window is off-axis which is undesirable for substantially on-axis viewing of the display. A further beam deflection element 402 for example comprising elongate prisms with orientation shown by edges 404 may be provided which produces a horizontal deflection of the tilted windows in direction 406.

Thus in operation, vertical window 426 is rotated by 45 degrees with translations 428 that vary with respect to window height at position 430. The beam deflector element 402 shifts the window 430 to window position 434 in direction 432. Advantageously such an arrangement achieves on-axis windows that are inclined in a range around 45 degrees suitable for landscape and portrait operation modes.

Figure 24:
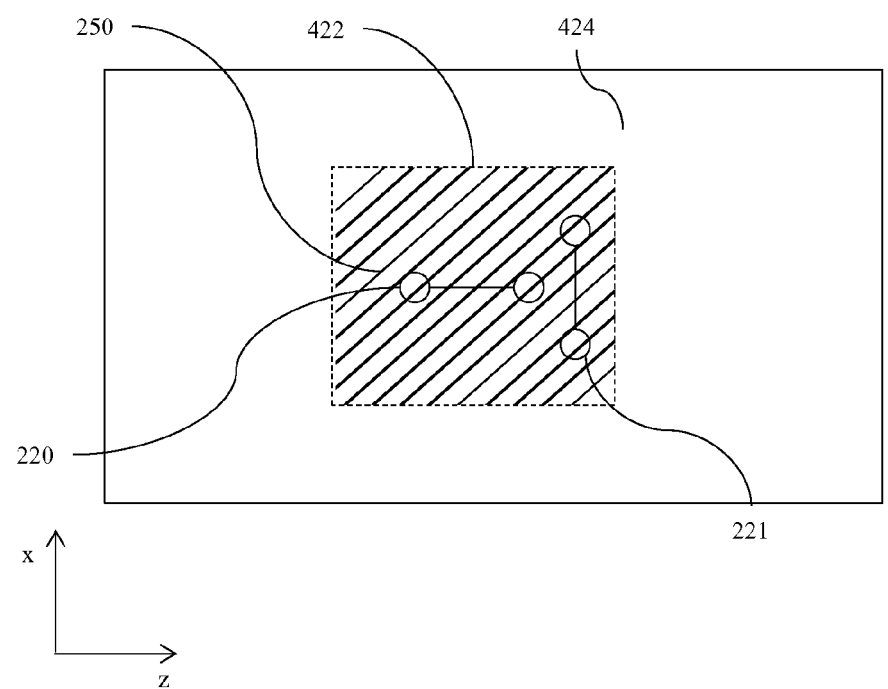
FIG. 24 is a schematic diagram further illustrating a front view of the processing of viewing windows by the apparatus of FIG. 22, in accordance with the present disclosure.

FIG. 24 is a schematic diagram illustrating a front view of an array of viewing windows for landscape and portrait operation achieved by the apparatus of FIG. 20A. Additional off-axis diffusing element 416 (not shown) may for example comprise Lumisty™ from Sumitomo Chemical Co. Ltd., such that on-axis light is transmitted while off-axis light is diffused. In this manner, a central window region 422 may be provided for on-axis autostereoscopic viewing while an off-axis 2D region 424 may be provided for 2D viewing. Thus observers with positions 220, 221 may be achieved, providing on-axis landscape and portrait modes and off axis 2D modes. Advantageously, such an arrangement uses a single stepped waveguide imaging directional backlight, has low cost and small bezel.

Figure 25:
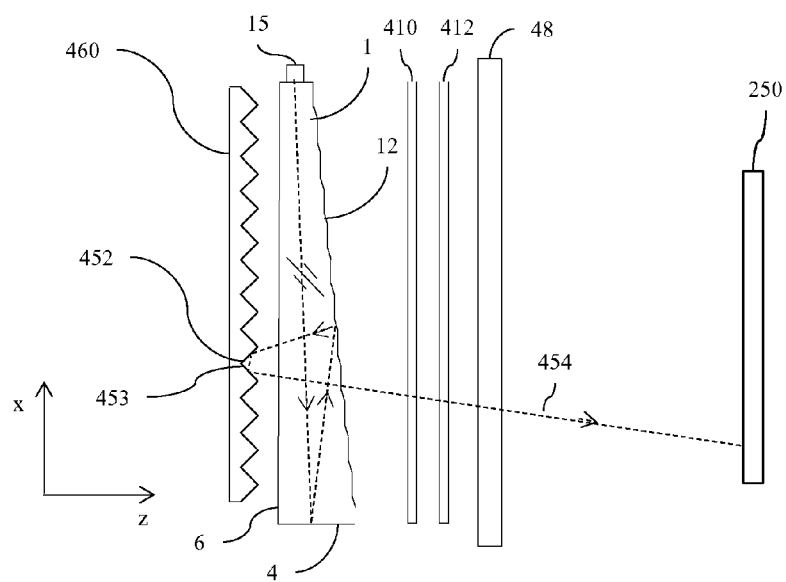
FIG. 25 is a schematic diagram illustrating a side view of an autostereoscopic display apparatus comprising a stepped imaging directional backlight and reflective optical element arranged to achieve landscape and portrait operation, in accordance with the present disclosure.
Figure 26A:
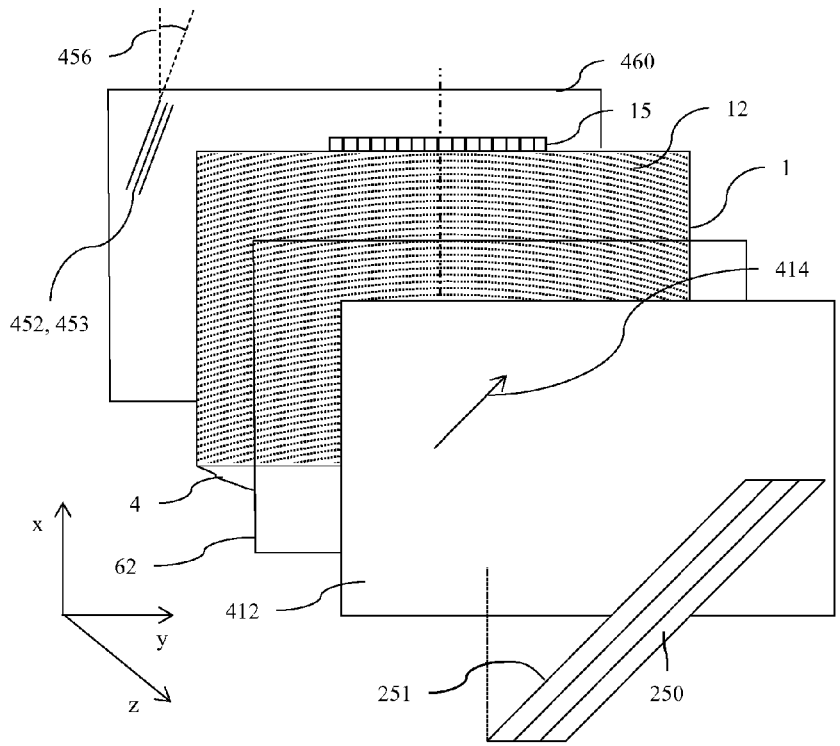
FIG. 26A is a schematic diagram illustrating a front view of the autostereoscopic display apparatus of FIG. 25 with a first position of light emitting element array, in accordance with the present disclosure.

FIG. 25 is a schematic diagram illustrating a side view of an autostereoscopic display comprising a stepped imaging directional backlight comprising a reflective element arranged to achieve landscape and portrait operation. FIG. 26A is a schematic diagram illustrating a front view of the autostereoscopic display apparatus of FIG. 25 comprising a stepped imaging directional backlight arranged to achieve landscape and portrait operation and shown with a light emitting element array 15 on the long side of the waveguide 1. This arrangement provides advantages over the embodiment of FIG. 22 wherein element 402 that is transmissive and thus may have limited optical power, light losses from Fresnel reflections and may provide a chromatic distribution of window offsets due to material dispersion.

Stepped waveguide 1 is oriented with features 12 arranged between the planar side 6 and LCD 48. Thus light rays 454 from features 12 are directed away from the panel and are incident on a reflective optical element 460 arranged to reflect the light exiting the first guide surface back through the waveguide 1. Thus, this reflected light then exits the waveguide 1 through the second guide surface. Thus, the waveguide 1 is used in the display device in an orientation that is reversed from that shown in U.S. patent application Ser. No. 13/300,293 so that the second guide surface faces forwards, rather than backwards. Therefore the SLM 48 extends across the second guide surface of the waveguide 1 for modulating the light exiting therethrough.

In this case, the light extraction features 12 are inclined relative to the optical axis of the waveguide in a plane containing the optical axis and the normal to the SLM 48, and so do not rotate the optical windows around the normal to the SLM 48. Thus an additional optical element is needed to provide that rotation, in particular in this example the reflective element 460 that is arranged as follows.

The reflective element 460 is a prism array comprising linear array of pairs of reflective corner facets 452, 453. The reflective corner facets 452, 453 of each pair are inclined relative to the normal to the SLM 48 in opposite senses in a plane containing the normal to the SLM 48 and at a non-zero angle to the optical axis of the waveguide 1 and at a non-zero angle to the perpendicular to the optical axis of the waveguide 1. Thus the corner facets 452, 453 as viewed along the normal to the SLM 48 extend at a non-zero angle to the optical axis of the waveguide, typically with an orientation of 22.5 degrees with respect to the optical axis to achieve a 45 degree rotation of the optical windows. The angle of inclination of the corner facets 452, 453 in that plane is selected to reverse the light on the double reflection, typically using an angle of inclination of 45 degrees.

Optical windows 250 are rotated around the normal to the SLM 48 by the double reflection at corner facets 452, 453, due to them extending at a non-zero angle to the optical axis of the waveguide 1. Due to the double reflection, the rotation is achieved without any deflection away from the normal to the SLM 48. The reflected light is then transmitted through the waveguide 1 to diffuser 412 with axis direction 414. The extraction features 12 may comprise curved elements and a Fresnel mirror may be arranged on reflective end 4 to provide collimation of light within the stepped waveguide 1.

Advantageously the present embodiment achieves window arrays with a 45 degree orientation from a single reflective layer and so chromatic aberration effects are reduced. A thin package with small bezel size may be achieved at low cost. Further advantageously the stepped waveguide may have extraction features substantially as used in a landscape only implementation.

Figure 26B:
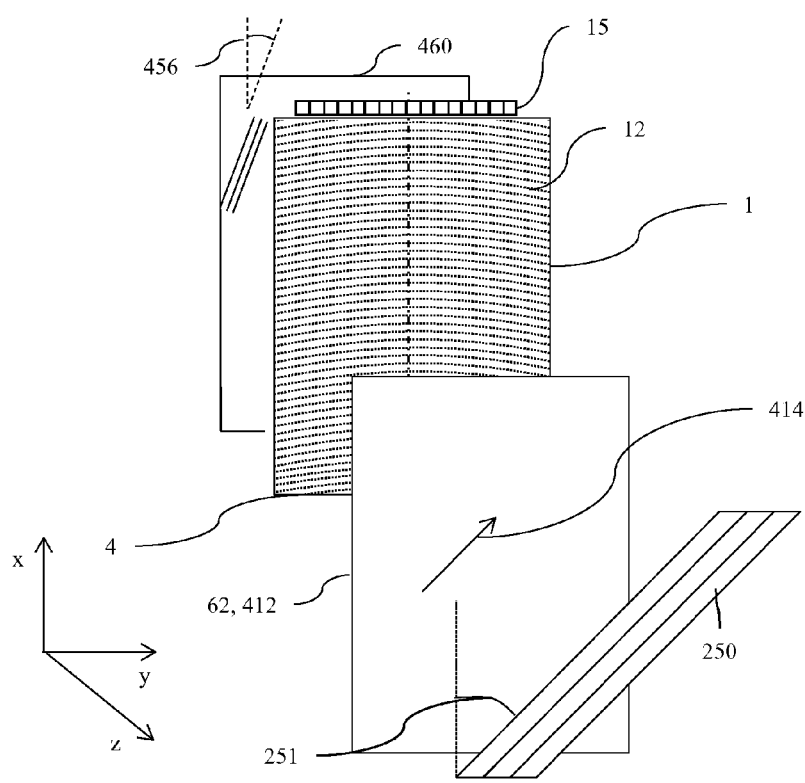
FIG. 26B is a schematic diagram illustrating a front view of the autostereoscopic display apparatus of FIG. 25 with a second position of light emitting element array, in accordance with the present disclosure.

FIG. 26B is a schematic diagram illustrating a front view of the autostereoscopic display apparatus of FIG. 25 comprising a stepped imaging directional backlight arranged to achieve landscape and portrait operation and shown with a light emitting element array 15 on the short side of the waveguide 1. In this display, the optical axis of the waveguide 1 extends parallel to the major axis of the shape of the aperture. By way of comparison with FIG. 26A, the present embodiment advantageously achieves a narrow bezel width to either side of the long edges of the waveguide 1. Such an arrangement can more conveniently be arranged inside the package of mobile display platforms without increasing their width. Further, the separation of the end 4 comprising an optically powered reflector from the array 15 is increased. Advantageously the magnification of the system is reduced compared to the embodiment of FIG. 26A, thus requiring larger pitch LEDs of the array 15 for a given viewing distance to achieve flicker free observer tracking. Larger pitch LEDs may advantageously be cheaper to make and more convenient to package. Further, the numerical aperture of the optical system can be reduced, thus improving aberrations of the imaging system, thus increasing viewing freedom.

Figure 26C:
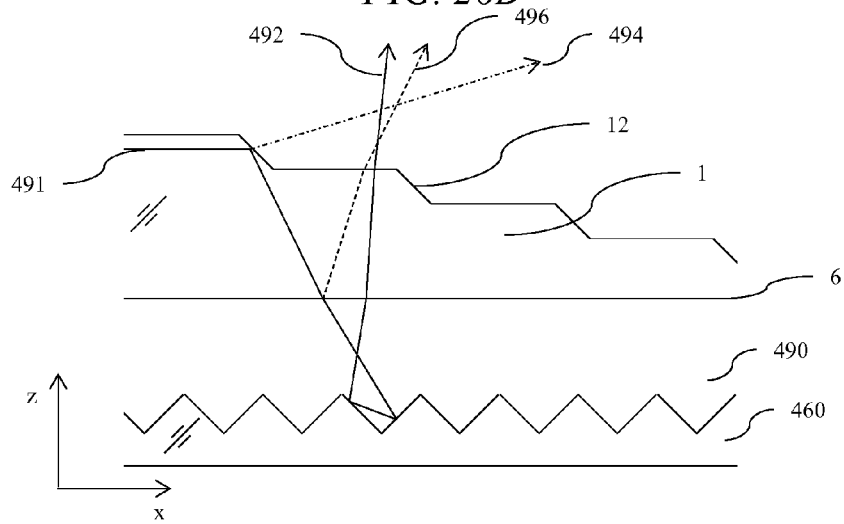
FIG. 26C is a schematic diagram illustrating a side view of part of the autostereoscopic display apparatus of FIG. 25, in accordance with the present disclosure.

FIG. 26C is a schematic diagram illustrating a front view of the autostereoscopic display apparatus of FIG. 25. Input light ray 491 is incident on a light extraction feature 12 and is directed towards the side 6 of the waveguide 1. Light rays 492 pass through air gap 490 whereon they are reflected at the prismatic side of structure 460 and are transmitted through the waveguide 1 towards the observer plane to achieve tilted window array 250 at the window plane. Light rays 496 however are reflected at side 6 at the air interface of the waveguide and are redirected towards the window plane without any rotation. Thus stray windows of low intensity can be created which are not inclined in a range around 45 degrees to the panel orientation. Advantageously side 6 may be provided with an anti-reflection coating to reduce this effect.

Figure 26D:
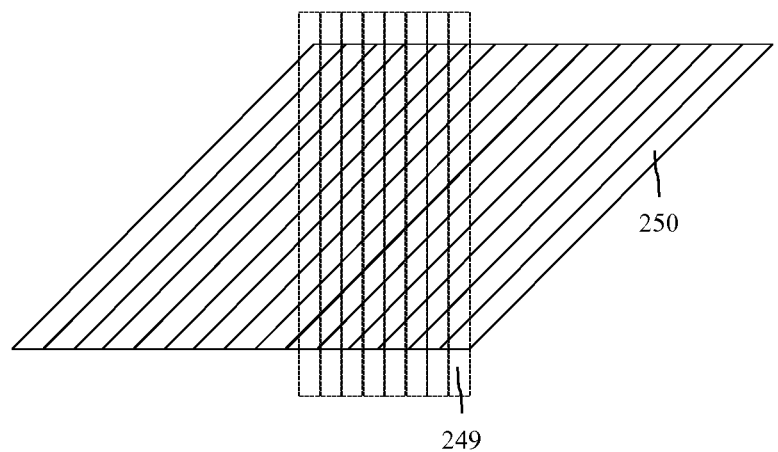
FIG. 26D is a schematic diagram illustrating a front view of an array of viewing windows in landscape mode, in accordance with the present disclosure.
Figure 26E:
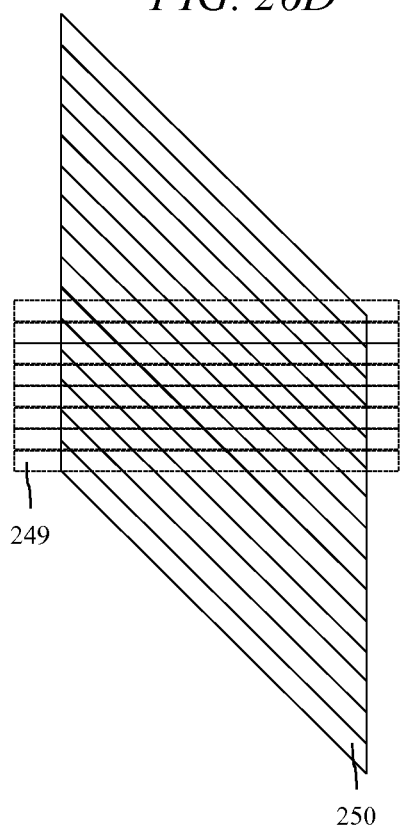
FIG. 26E is a schematic diagram illustrating a front view of an array of viewing windows in portrait mode, in accordance with the present disclosure.

FIG. 26D is a schematic diagram illustrating a front view of an array of viewing windows arising from the stray light reflection at side 6 as shown in FIG. 26C, for example in landscape mode of operation. FIG. 26E is a schematic diagram illustrating a front view of an array of viewing windows arising from the stray light reflection at side 6 as shown in FIG. 26C, for example in portrait mode of operation.

In this manner window array 249 overlays window array 250, creating regions of increased cross talk when left eye data is imaged in the desired location for right eye data. The observer's horizontal and vertical position can be measured with respect to this window array. Advantageously, real time cross talk correction of base images can be provided to compensate for the variation in cross talk with viewing position, such that left eye data is modified to reduce the visibility of right eye cross talk, dependent on viewing position.

Figure 26F:
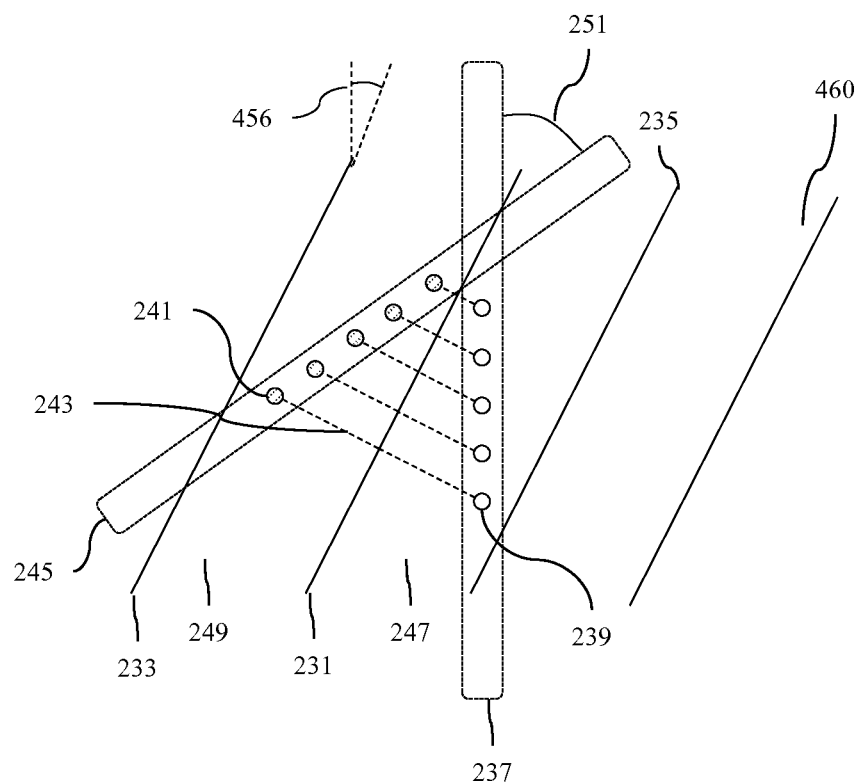
FIG. 26F is a schematic diagram illustrating a top view of the incidence of light rays onto the element 460 of FIG. 25, in accordance with the present disclosure.

FIG. 26F is a schematic diagram illustrating a top view of the incidence of light rays onto the element 460 of FIG. 25. Troughs 231 and peaks 233 forming the edges of substantially planar reflecting facets 247, 249 of element 460 are oriented at an angle 456 (typically 22.5 degrees) to the vertical. Such facets 247, 249 are arranged so that normally incident light rays arranged to provide a vertical incident illumination window 237 from the stepped waveguide 1 is incident thereon. Window 237 thus comprises light rays that are incident at positions 239. At reflection on the inclined reflecting surface 247 of the element 460, the light ray positions are directed to positions 241 on the respective oppositely inclined surface 249 of the element 460, with a translation 243 that is orthogonal to trough 231. In this manner, the output rays are inclined at an angle 251 and achieve an output window 245 orientation that is advantageously desirable for landscape and portrait orientation.

In the present embodiments, the illumination that is incident on the rotating optical element, for example element 460 may be in the collimated space (for example prior to a focusing element such as Fresnel lens 410) or may be in the imaging space (for example after a focusing element such as curved light extraction features 12).

Figure 27:
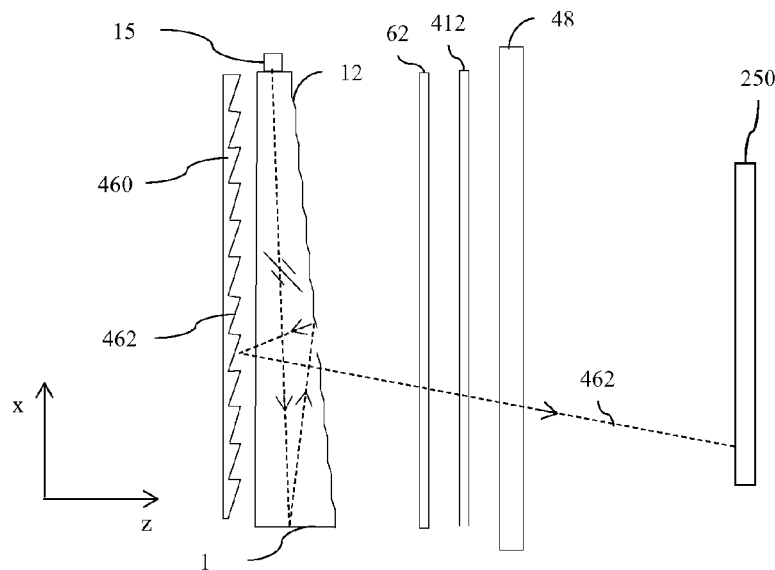
FIG. 27 is a schematic diagram illustrating a side view of an autostereoscopic display apparatus comprising a stepped imaging directional backlight and reflective optical element arranged to achieve landscape and portrait operation, in accordance with the present disclosure.
Figure 28:
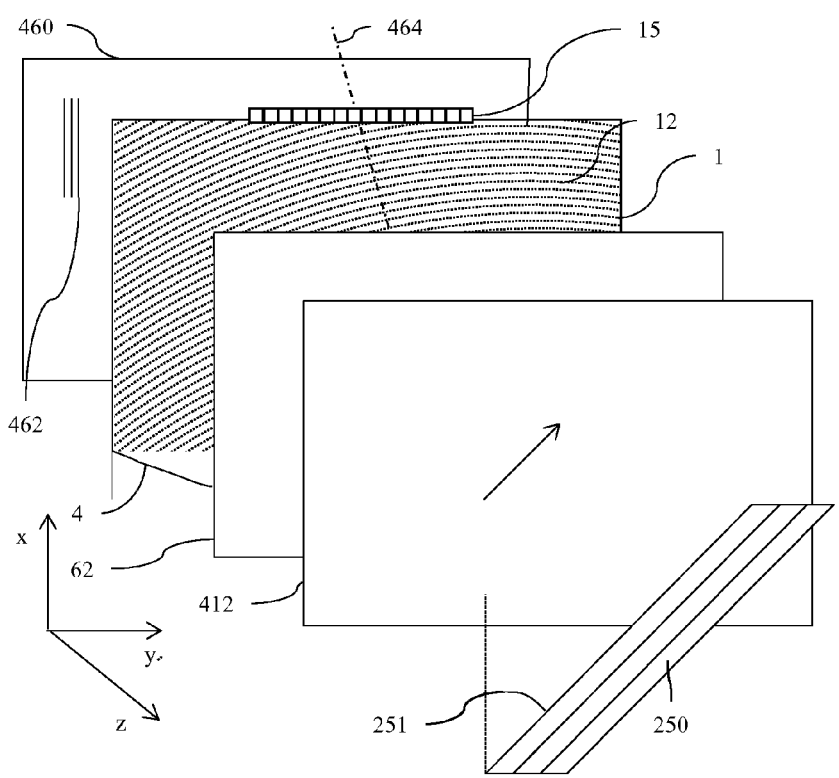
FIG. 28 is a schematic diagram illustrating a front view of the autostereoscopic display apparatus of FIG. 27, in accordance with the present disclosure.

FIG. 27 is a schematic diagram illustrating a side view of an autostereoscopic display comprising a stepped imaging directional backlight and reflective optical element arranged to achieve landscape and portrait operation. FIG. 28 is a schematic diagram illustrating a front view of the autostereoscopic display apparatus of FIG. 27 comprising a stepped imaging directional backlight and reflective optical element arranged to achieve landscape and portrait operation. The stepped imaging waveguide 1 comprises curved light extraction features 12 that are arranged with a tilted axis 464 arranged to achieve a rotation of the viewing windows 250 in the window plane.

In this example, the light extraction features 12, as well as being concave, are inclined relative to the optical axis of the waveguide 1 in a plane containing the normal to the SLM 48 and at a non-zero angle to the optical axis, similar to the display of FIG. 22. As a result of the reflection occurring at the light extraction features 12, the optical windows are rotated around the normal to the SLM 48. In this case, the reflective element 460 is arranged to compensate for the deflection of the light reflected by the light extraction features 12 away from the normal to the SLM 48. In particular, the reflective element 460 comprises a linear array of reflective facets 462 inclined relative to the normal to the SLM 48 in a plane containing the normal to the SLM 48 and perpendicular to the optical axis of the waveguide, so that the facets 462 themselves extend parallel to the optical axis of the waveguide 1 (vertical in FIG. 28). The angle of inclination within that plane is selected to provide the desired deflection for compensation. Advantageously such a display can achieve landscape-portrait operation in a thin form factor.

Figure 29:
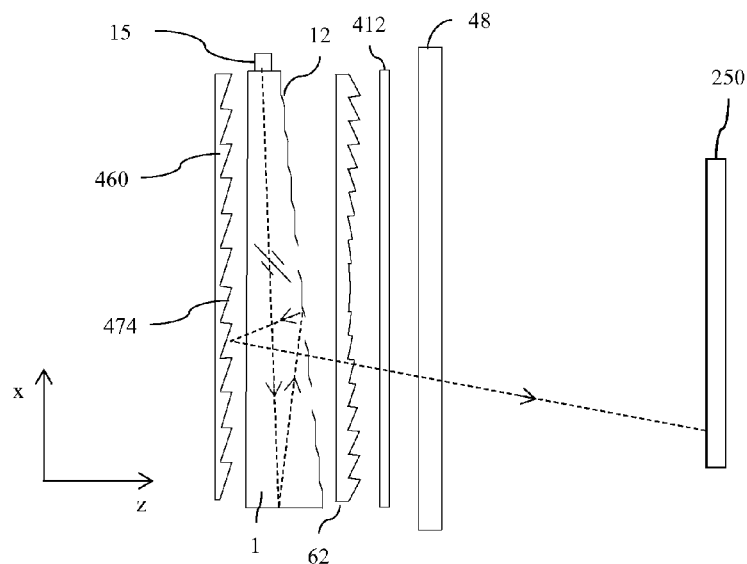
FIG. 29 is a schematic diagram illustrating a side view of an autostereoscopic display apparatus comprising a stepped imaging directional backlight and reflective optical element arranged to achieve landscape and portrait operation, in accordance with the present disclosure.
Figure 30:
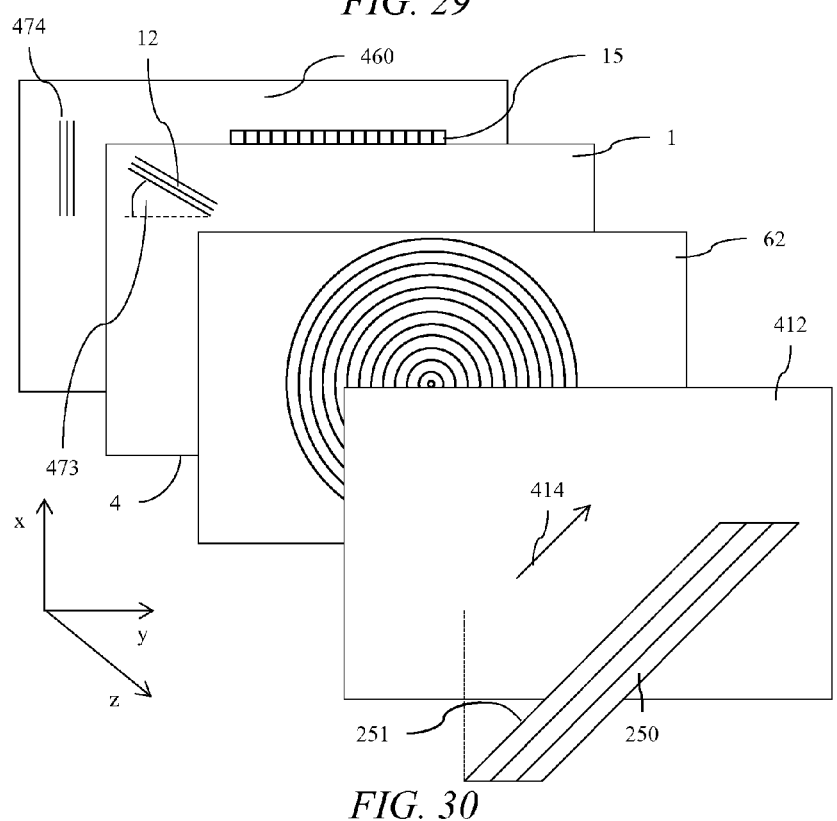
FIG. 30 is a schematic diagram illustrating a front view of the autostereoscopic display apparatus of FIG. 29, in accordance with the present disclosure.

FIG. 29 is a schematic diagram illustrating a side view of an autostereoscopic display comprising a stepped imaging directional backlight and reflective optical element arranged to achieve landscape and portrait operation. FIG. 30 is a schematic diagram illustrating a front view of the autostereoscopic display apparatus of FIG. 29 comprising a stepped imaging directional backlight and reflective optical element arranged to achieve landscape and portrait operation. In this example, the light extraction features 12 are inclined relative to the optical axis of the waveguide 1 in a plane containing the normal to the SLM 48 and at a non-zero angle to the optical axis, similar to the display of FIG. 22, typically at an angle 473 to the horizontal of 22.5 degrees so that the windows 250 are rotated by 45 degrees. Reflective optical element 460 has the same construction as in FIG. 29 to compensate for the window deflection arising from the reflection at the extraction features 12. Advantageously the present embodiment can achieve central and 45 degree tilted achromatic viewing windows for portrait operation in a thin package from a single waveguide 1, thus reducing cost and increasing performance.

Figure 31:
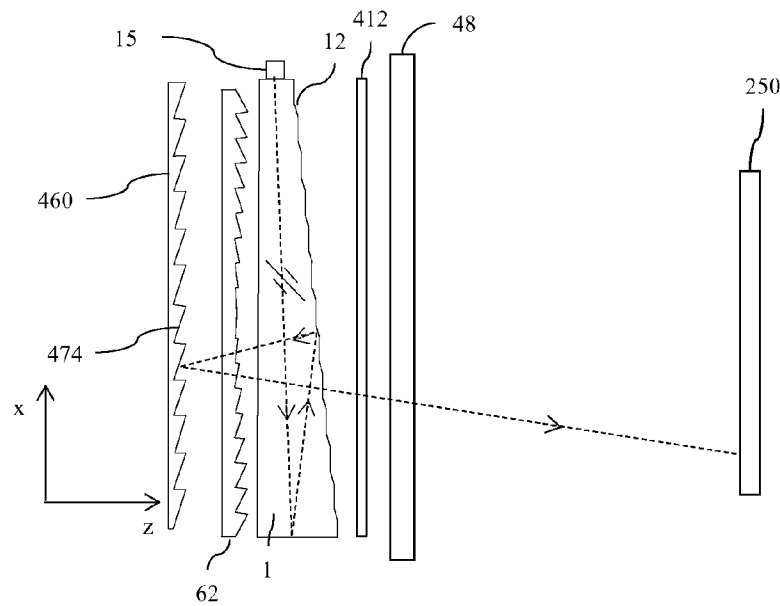
FIG. 31 is a schematic diagram illustrating a side view of an autostereoscopic display apparatus comprising a stepped imaging directional backlight and reflective optical element arranged to achieve landscape and portrait operation, in accordance with the present disclosure.
Figure 32A:
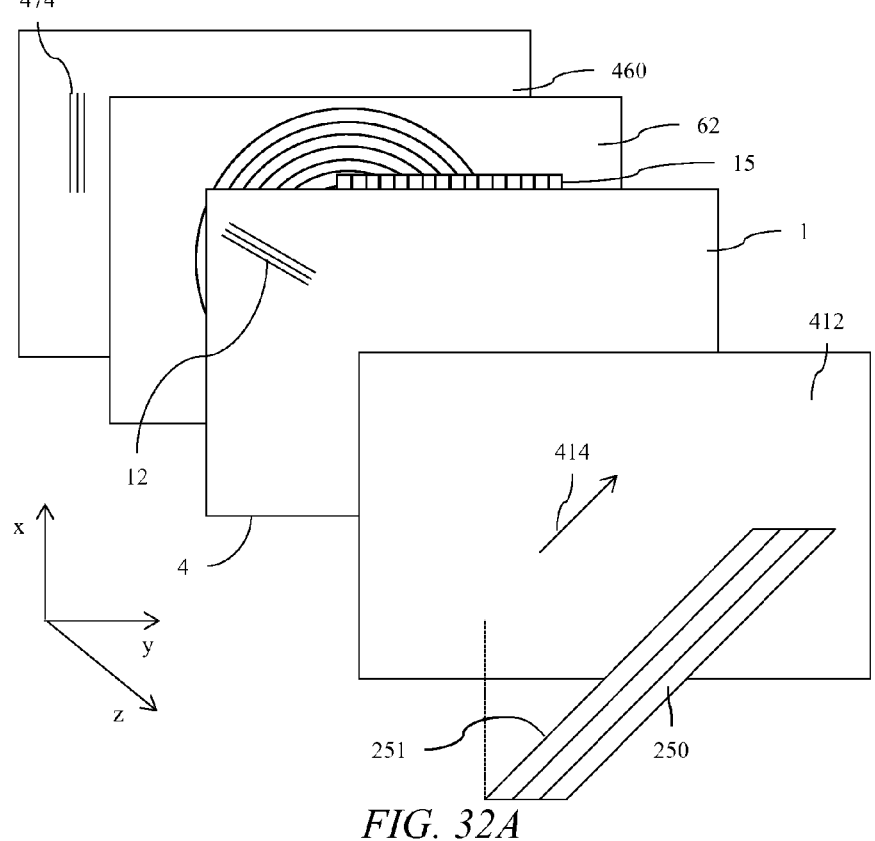
FIG. 32A is a schematic diagram illustrating a front view of the autostereoscopic display apparatus of FIG. 31, in accordance with the present disclosure.

FIG. 31 is a schematic diagram illustrating a side view of an autostereoscopic display comprising a stepped imaging directional backlight and reflective optical element arranged to achieve landscape and portrait operation. FIG. 32A is a schematic diagram illustrating a front view of the autostereoscopic display apparatus of FIG. 31 comprising a stepped imaging directional backlight arranged to achieve landscape and portrait operation. This is similar in operation to the arrangements of FIGS. 29 and 30, however the Fresnel lens 62 is positioned at a greater distance from the LCD 48, advantageously reducing Moiré fringing between the lens and panel.

Figure 32B:
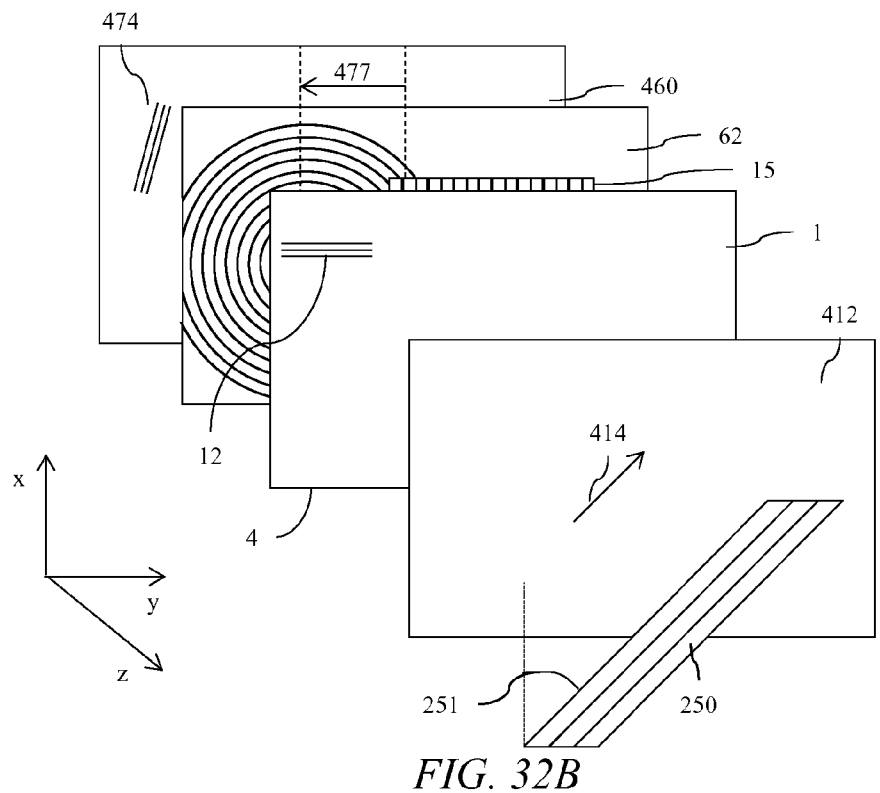
FIG. 32B is a schematic diagram illustrating a front view of an autostereoscopic display apparatus comprising a stepped imaging directional backlight and reflective optical element arranged to achieve landscape and portrait operation, in accordance with the present disclosure.

FIG. 32B is a schematic diagram illustrating a front view of an autostereoscopic display apparatus comprising a stepped imaging directional backlight and reflective optical element arranged to achieve landscape and portrait operation. In this case, the light extraction features 12 are inclined relative to the optical axis of the waveguide in a plane containing the optical axis and the normal to the SLM 48 (horizontally in FIG. 32B), and so do not rotate the optical windows around the normal to the SLM 48. Thus an additional optical element is needed to provide that rotation, in particular in this example the reflective element 460 that is arranged as follows.

In particular, the reflective element 460 comprises a linear array of reflective facets 462 inclined relative to the normal to the SLM 48 in a plane containing the normal to the SLM 48 and at a non-zero angle to the perpendicular to the optical axis of the waveguide 1, so that the facets 462 themselves extend at a non-zero angle to the optical axis of the waveguide 1. As a result of the reflection occurring at the reflective facets 462, the optical windows are rotated around the normal to the SLM 48. The degree of rotation of the optical window may in general be dependent on the angle of inclination and the orientation of the plane, so reflective facets 462 having orientations different from 22.5 degrees may be used to achieve a 45 degree optical window rotation.

However, the inclination also causes deflection of the light reflected by the reflective facets 462 away from the normal to the SLM 48 by the same angle. Accordingly, the Fresnel lens 62 optical axis has an offset 477 from the optical axis so that the Fresnel lens 62 acts as a correction element arranged to deflect light that has exited the waveguide 1 back towards the normal to the SLM 48, and thereby compensate for that deflection. Advantageously the optical windows from the waveguide 1 may be achieved with reduced aberrations due to the reduced thickness of waveguide between the features 12 and guide surface 6.

Figure 32C:
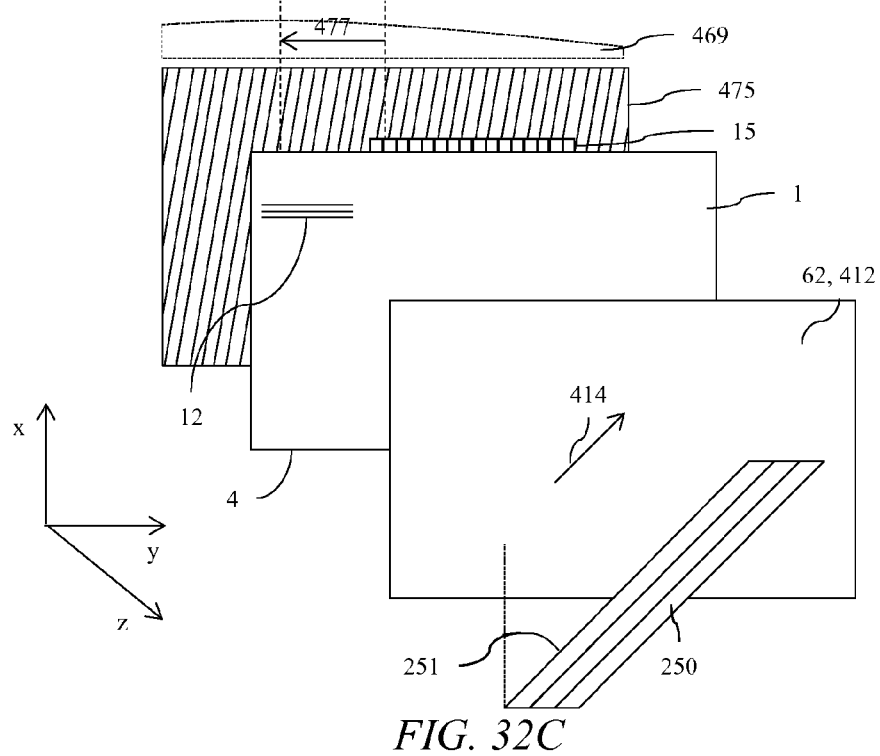
FIG. 32C is a schematic diagram illustrating a front view of the autostereoscopic display apparatus comprising a stepped imaging directional backlight and reflective optical element arranged to achieve landscape and portrait operation, in accordance with the present disclosure.

FIG. 32C is a schematic diagram illustrating a front view of the autostereoscopic display apparatus comprising a stepped imaging directional backlight and reflective optical element arranged to achieve landscape and portrait operation. In this case, the light extraction features 12 are inclined relative to the optical axis of the waveguide in a plane containing the optical axis and the normal to the SLM 48 (horizontally in FIG. 32B), and so do not rotate the optical windows around the normal to the SLM 48. Thus an additional optical element is needed to provide that rotation, in particular in this example the reflective element 475 that is arranged as follows.

The reflective element 475 achieves rotation of optical windows 250 as follows. The reflective element 475 comprises a linear array of reflective facets 462 inclined relative to the normal to the SLM 48 in a plane containing the normal to the SLM 48 and at a non-zero angle to the perpendicular to the optical axis of the waveguide 1, so that the facets themselves extend at a non-zero angle to the optical axis of the waveguide 1. As a result of the reflection occurring at the reflective facets 462, the optical windows are rotated around the normal to the SLM 48. To avoid deflection of the light reflected by the reflective facets 462 away from the normal to the SLM 48 by the same angle the reflective facets are sections of a one dimensional Fresnel mirror having an optical axis that is offset from the optical axis of the waveguide 1, thereby to compensate for deflection of the light reflected by the reflective features away from the normal to the spatial light modulator that may otherwise occur. The optical centre of the Fresnel mirror may have an offset 477 from an axial position, as illustrated by the effective sag profile 469 shown for reference. Advantageously the present example achieves reduced chromatic aberration for both optical window deflection and rotation, a reduced number of components, lower cost and lower complexity.

Figure 33:
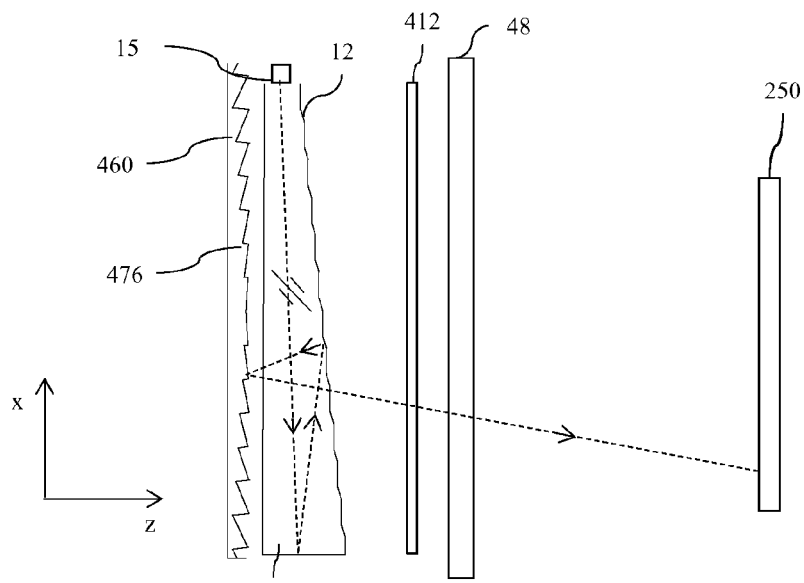
FIG. 33 is a schematic diagram illustrating a side view of an autostereoscopic display apparatus comprising a stepped imaging directional backlight and reflective optical element arranged to achieve landscape and portrait operation, in accordance with the present disclosure.
Figure 34:
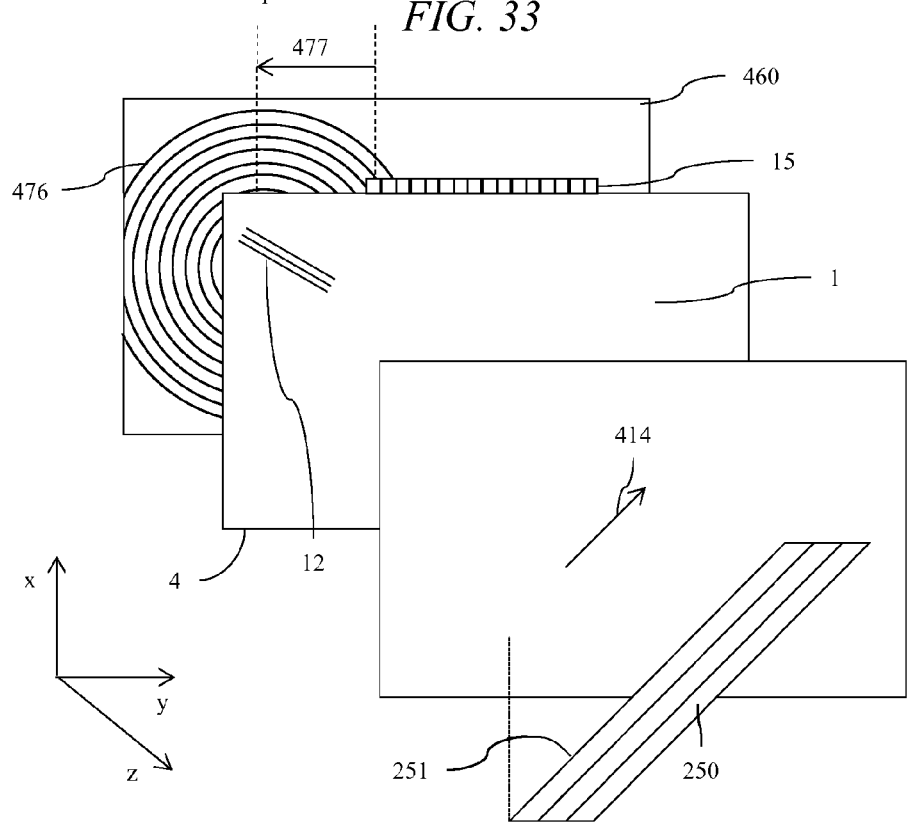
FIG. 34 is a schematic diagram illustrating a front view of the autostereoscopic display apparatus of FIG. 33, in accordance with the present disclosure.

FIG. 33 is a schematic diagram illustrating a side view of an autostereoscopic display comprising a stepped imaging directional backlight and reflective optical element arranged to achieve landscape and portrait operation. FIG. 34 is a schematic diagram illustrating a front view of the autostereoscopic display apparatus of FIG. 33 comprising a stepped imaging directional backlight and reflective optical element arranged to achieve landscape and portrait operation. In this example, the light extraction features 12 are inclined relative to the optical axis of the waveguide 1 in a plane containing the normal to the SLM 48 and at a non-zero angle to the optical axis, similar to the display of FIG. 22. To compensate for the deflection of the optical windows after rotation, the reflective element 460 is a Fresnel mirror having a Fresnel mirror surface 476 provided with a lateral offset from the optical axis of the waveguide 1 so that it operates in an off-axis position. Advantageously such an arrangement can achieve a reduction in the number of components while using tilted linear features 12 in the waveguide which may be more convenient to fabricate.

Figures 35, 36:
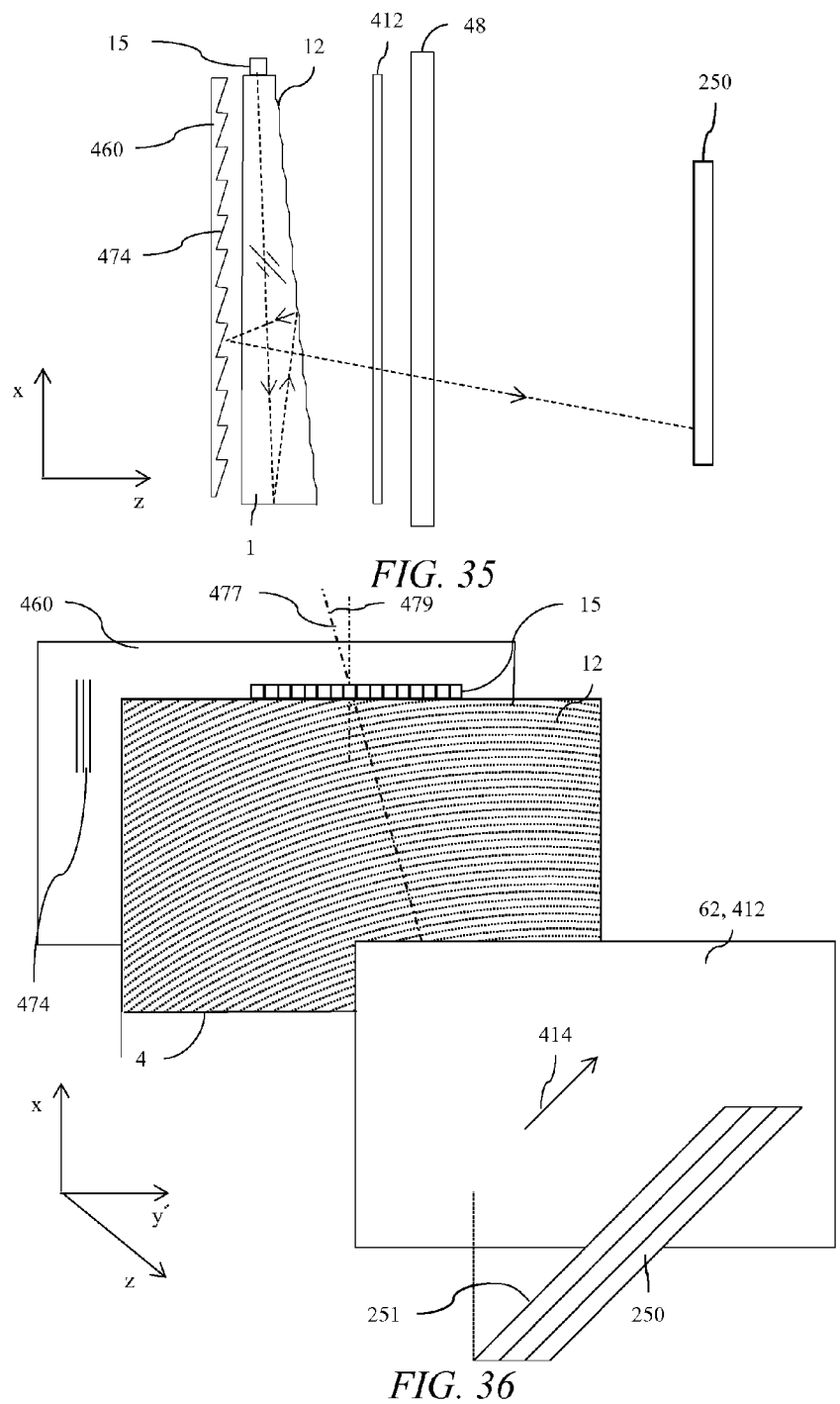
FIG. 35 is a schematic diagram illustrating a side view of an autostereoscopic display apparatus comprising a stepped imaging directional backlight and reflective optical element arranged to achieve landscape and portrait operation, in accordance with the present disclosure.
FIG. 36 is a schematic diagram illustrating a front view of the autostereoscopic display apparatus of FIG. 35, in accordance with the present disclosure.

FIG. 35 is a schematic diagram illustrating a side view of an autostereoscopic display comprising a stepped imaging directional backlight and reflective optical element arranged to achieve landscape and portrait operation. FIG. 36 is a schematic diagram illustrating a front view of the autostereoscopic display apparatus of FIG. 35 comprising a stepped imaging directional backlight and reflective optical element arranged to achieve landscape and portrait operation. The Fresnel mirror surface 476 is replaced by a linear prismatic surface 474 to provide a window offset and the window tilt is achieved using curved and tilted light extraction features 12 with an axis 477 inclined at an angle 479 of 22.5 degrees to the vertical. Advantageously the embodiment can further reduce the number and complexity of the components used in the system, reducing cost.

Figure 37:
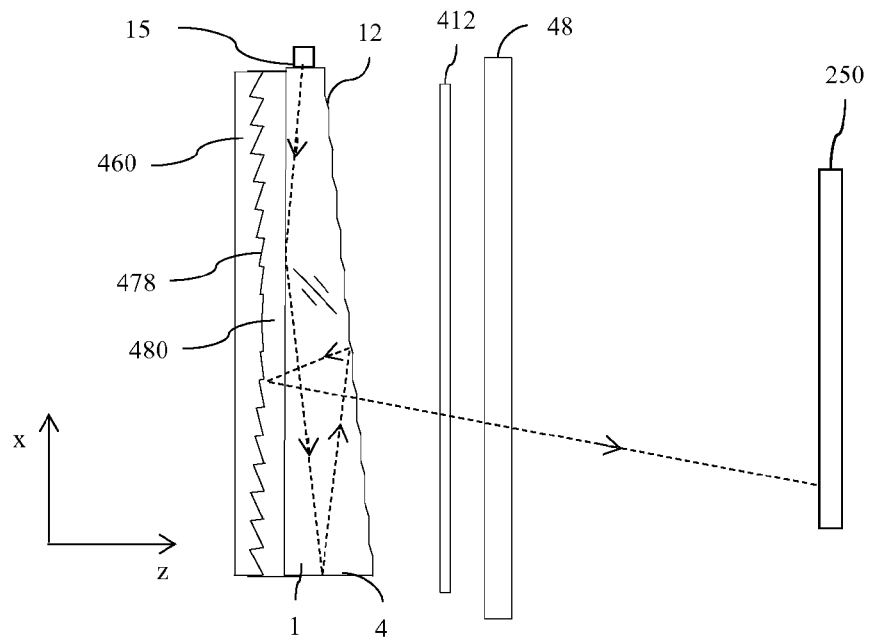
FIG. 37 is a schematic diagram illustrating a side view of an autostereoscopic display apparatus comprising a stepped imaging directional backlight and reflective optical element arranged to achieve landscape and portrait operation, in accordance with the present disclosure.

FIG. 37 is a schematic diagram illustrating a side view of an autostereoscopic display comprising a stepped imaging directional backlight and reflective optical element arranged to achieve landscape and portrait operation. In this embodiment a low refractive index material 480 such as a fluorinated material or silicone material with refractive index 1.42 or lower may be inserted between the reflective element 460 and side 6 of the waveguide, so as to enable guiding within a desired cone angle within the waveguide (for example formed from a polymer material with typical refractive index 1.49~1.56) while advantageously reducing thickness and light losses in the output path of the system. The side 478 may be made reflective through metallization for example.

Figure 38:
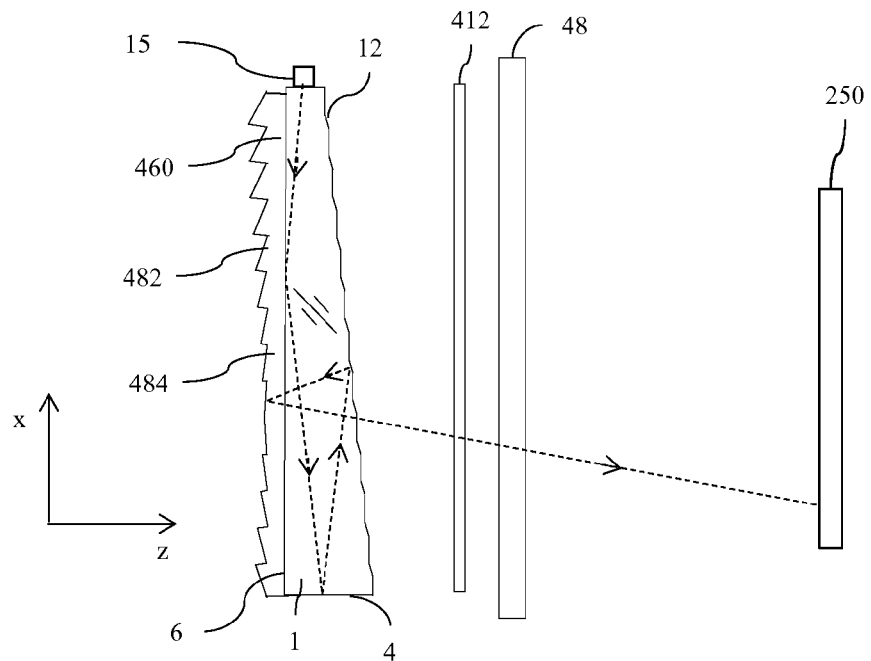
FIG. 38 is a schematic diagram illustrating a side view of an autostereoscopic display apparatus comprising a stepped imaging directional backlight and reflective optical element arranged to achieve landscape and portrait operation, in accordance with the present disclosure.

FIG. 38 is a schematic diagram illustrating a side view of an autostereoscopic display comprising a stepped imaging directional backlight and reflective optical element arranged to achieve landscape and portrait operation. In this embodiment a low refractive index material 480 is used to form the reflective element 460 with an external reflective coating applied and formed on side 6 of the waveguide, so as to enable guiding within a desired cone angle within the waveguide while advantageously reducing thickness and light losses in the output path of the system. Advantageously, this can achieve further reduction in number of processing steps and reduced device cost.

Figure 39:
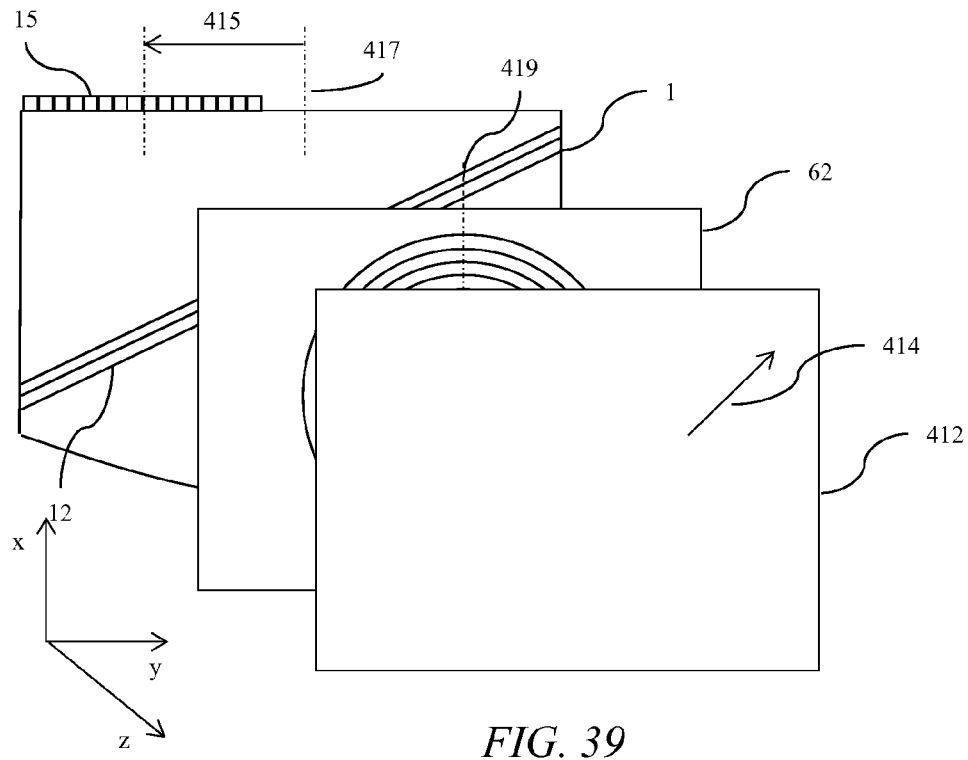
FIG. 39 is a schematic diagram illustrating a front view of an autostereoscopic display apparatus comprising a stepped imaging directional backlight arranged to achieve landscape and portrait operation, in accordance with the present disclosure.

FIG. 39 is a schematic diagram illustrating a front view of an autostereoscopic display apparatus comprising a stepped imaging directional backlight arranged to achieve landscape and portrait operation. Light extraction features 12 are arranged to rotate viewing windows by 45 degrees. For linear features 12, a Fresnel lens 62 is arranged to achieve tilted viewing windows 250 (not shown) in cooperation with diffuser 412. To compensate for window displacement 428, the light emitting element array 15 may be offset from the central axis 417 of the stepped waveguide 1 by a displacement 415. The Fresnel lens axis 419 may be centralized. By way of comparison with FIG. 25 for example, no reflective element is used. Reflective elements such as element 460 can have absorption at their surface due to non-ideal reflectivity of coatings such as aluminium coatings, thus reducing light transmission. Thus the present apparatus may achieve viewing windows for landscape and portrait operation from a single stepped waveguide with increased light output.

Figure 40:
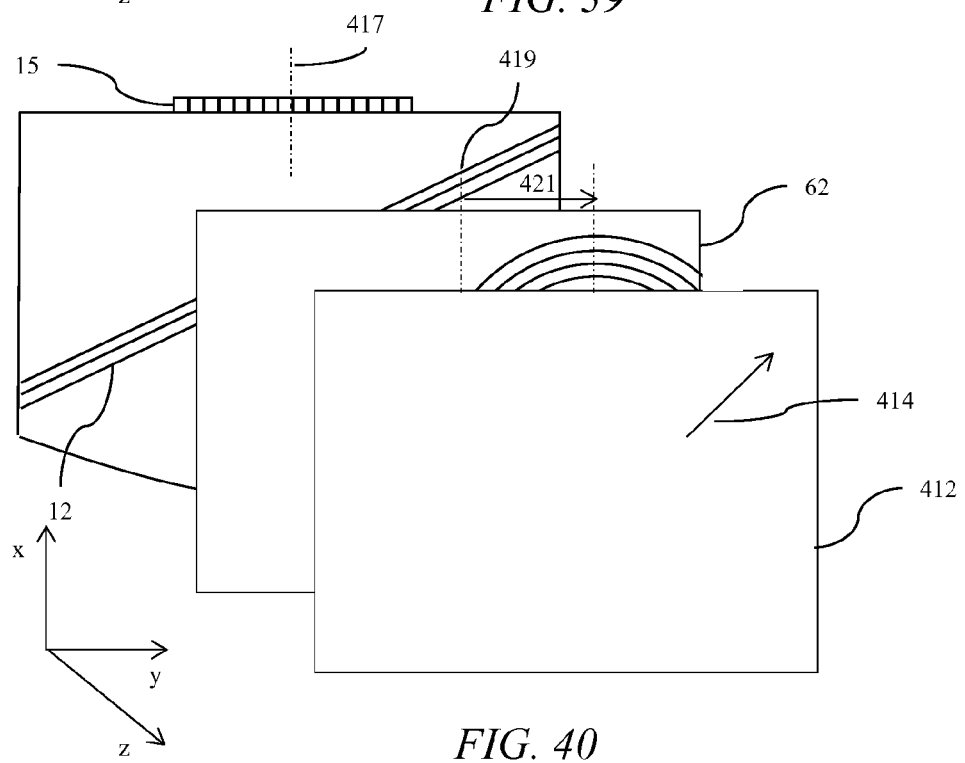
FIG. 40 is a schematic diagram illustrating a front view of an autostereoscopic display apparatus comprising a stepped imaging directional backlight arranged to achieve landscape and portrait operation, in accordance with the present disclosure.

FIG. 40 is a schematic diagram illustrating a front view of an autostereoscopic display apparatus comprising a stepped imaging directional backlight arranged to achieve landscape and portrait operation. By way of comparison with FIG. 39, the array 15 may be centralized while the lens 62 may have an axial displacement 421 from the central axis 419, again achieving viewing windows for landscape and portrait operation. Advantageously, the light cone from the light emitting element array 15 can be more uniformly directed into the waveguide 1, improving uniformity compared to the embodiment of FIG. 39.

In a further embodiment (not shown), window displacement correction can be achieved by means of displacement 415 light emitting element array 15 and displacement 421 of Fresnel lens 62. Advantageously the offset provided can be increased and the imaging performance degradation shared between the artifacts of array 15 displacement 415 and lens 62 displacement 417.

Figure 41:
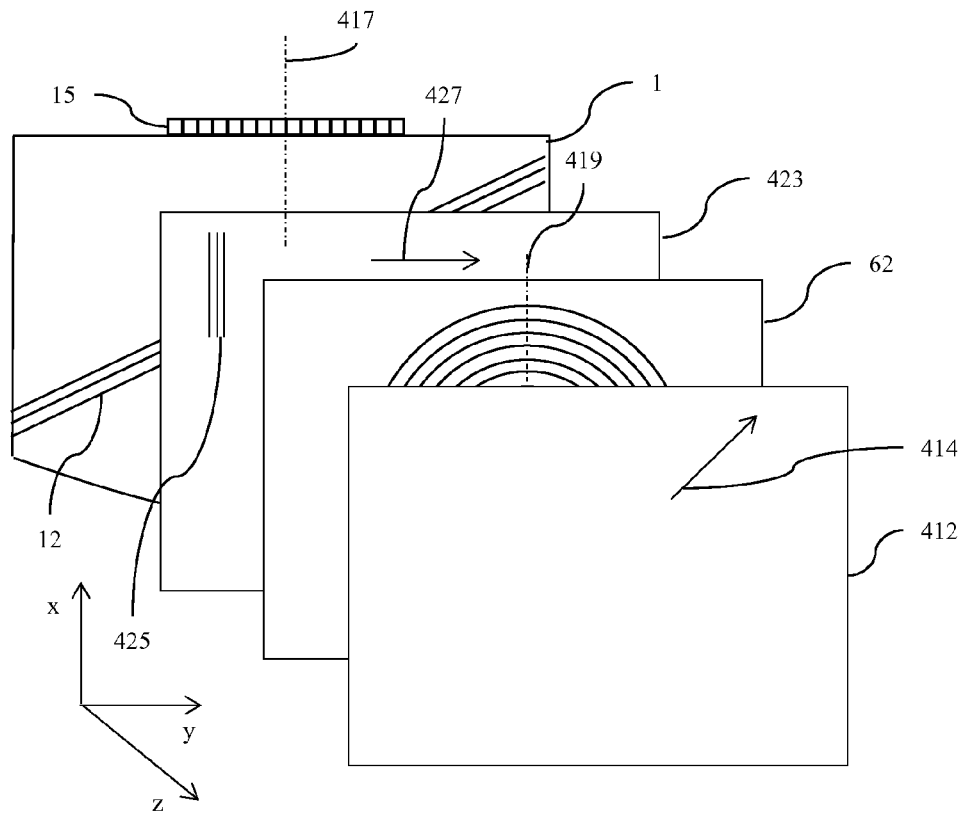
FIG. 41 is a schematic diagram illustrating a front view of an autostereoscopic display apparatus comprising a stepped imaging directional backlight arranged to achieve landscape and portrait operation, in accordance with the present disclosure.
Figure 42:
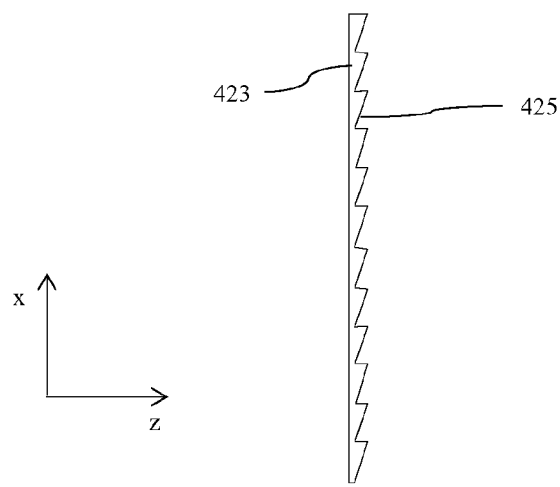
FIG. 42 is a schematic diagram illustrating a side view of a light deflection film, in accordance with the present disclosure.

FIG. 41 is a schematic diagram illustrating a front view of an autostereoscopic display apparatus comprising a stepped imaging directional backlight arranged to achieve landscape and portrait operation and light deflection film. FIG. 42 is a schematic diagram illustrating a side view of the light deflection film. Array 15 and lens 62 are both arranged centrally with respect to axes 417, 419. An additional light deflection film 423 comprising prism elements 425 is arranged to deflect the windows horizontally to compensate for window displacement 428 during the rotation after reflection from the features 12. Advantageously such an arrangement can achieve on-axis operation from the waveguide 1 and the Fresnel lens 62, improving the aberrations of the viewing window and extending viewing freedom.

Figure 43:
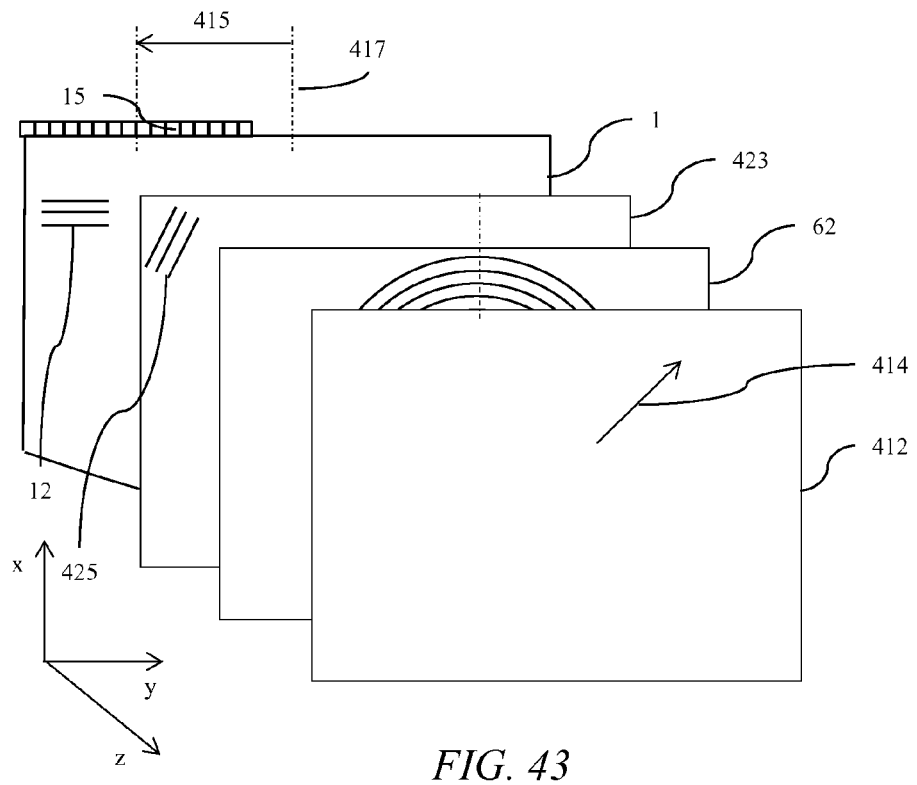
FIG. 43 is a schematic diagram illustrating a front view of an autostereoscopic display apparatus comprising a stepped imaging directional backlight arranged to achieve landscape and portrait operation, in accordance with the present disclosure.

FIG. 43 is a schematic diagram illustrating a front view of an autostereoscopic display apparatus comprising a stepped imaging directional backlight arranged to achieve landscape and portrait operation. In this embodiment, features 12 are arranged horizontally and the array 15 is offset by displacement 415. The window rotation is achieved by inclined prism elements 425 in the film 423, with window position correction achieved by the array 15 offset with respect to the Fresnel lens. Advantageously the control of rotation can be achieved in film 423, reducing complexity of fabrication of waveguide 1.

Figure 44:
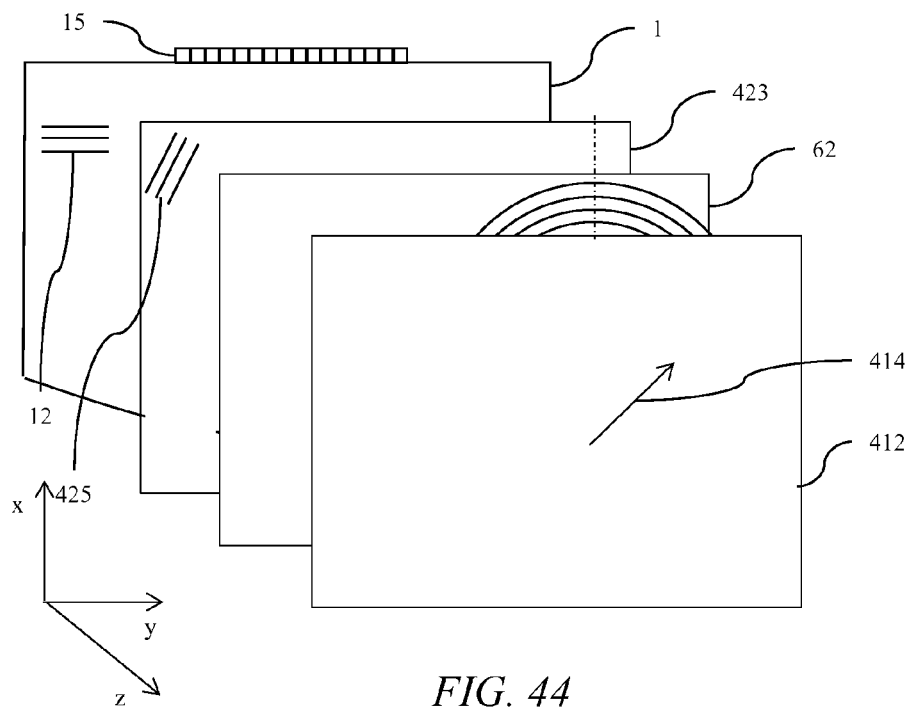
FIG. 44 is a schematic diagram illustrating a front view of an autostereoscopic display apparatus comprising a stepped imaging directional backlight arranged to achieve landscape and portrait operation, in accordance with the present disclosure.

FIG. 44 is a schematic diagram illustrating a front view of an autostereoscopic display apparatus comprising a stepped imaging directional backlight arranged to achieve landscape and portrait operation. In comparison to FIG. 43, the light coupling of the elements of the array 15 may be more uniform across the array of light emitting elements.

Figure 45:
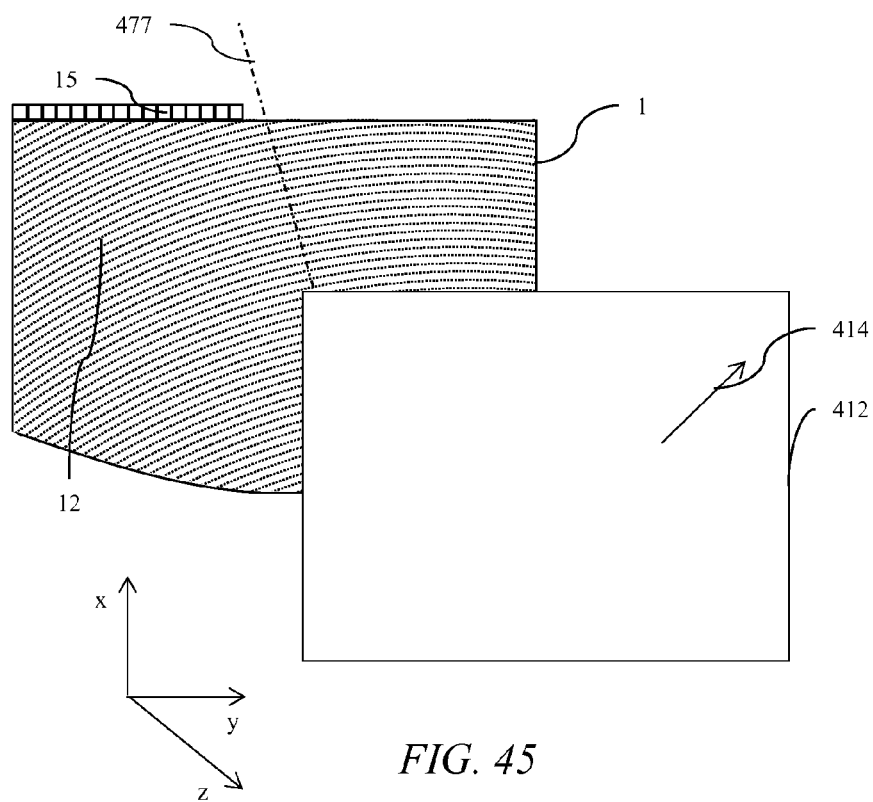
FIG. 45 is a schematic diagram illustrating a front view of an autostereoscopic display apparatus comprising a stepped imaging directional backlight arranged to achieve landscape and portrait operation, in accordance with the present disclosure.

FIG. 45 is a schematic diagram illustrating a front view of an autostereoscopic display apparatus comprising a stepped imaging directional backlight arranged to achieve landscape and portrait operation. Waveguide 1 may comprise curved light extraction features 12 to provide a window imaging function. The axis 477 of the curved features 12 may be tilted and may also be offset to provide window rotation and some window displacement. Array 15 may also be offset to achieve window displacement. Such an embodiment can achieve landscape and portrait operation with a small number of components thus reducing cost and complexity as well as thickness. Further prismatic films 423 (not shown) can also be incorporated to provide further window displacement.

Figure 46:
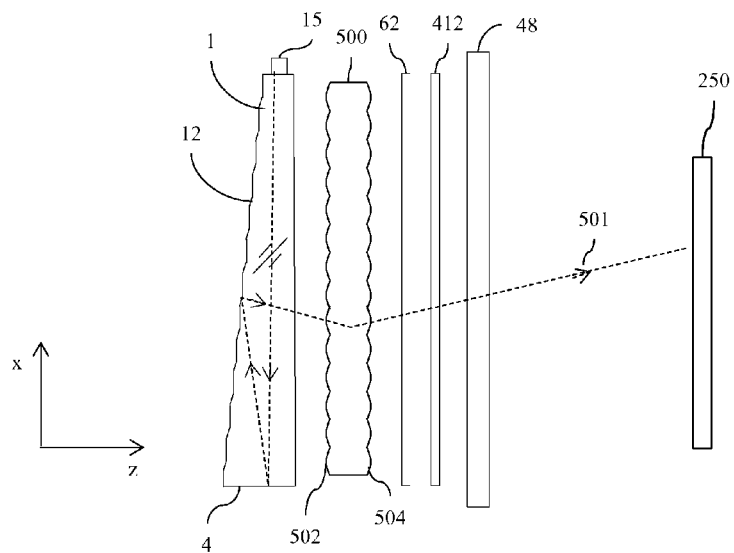
FIG. 46 is a schematic diagram illustrating a side view of an autostereoscopic display apparatus comprising a stepped imaging directional backlight and a Gabor superlens arranged to achieve landscape and portrait operation, in accordance with the present disclosure.

FIG. 46 is a schematic diagram illustrating a side view of an autostereoscopic display device comprising a stepped imaging directional backlight and a Gabor superlens 500 arranged to rotate the viewing windows around the normal to the SLM 48 in order to achieve landscape and portrait operation. Gabor superlens 500 comprises first cylindrical lens array 502 and second cylindrical lens array 504 that are substantially confocal as will be described. Each of the lens arrays 502 and 504 comprises an array of lenses that each have a positive optical power in respective first meridians and no optical power in respective second meridians perpendicular to the first meridians. The lenses are therefore cylindrical lenses, although the profile of the lens surface in the first meridians may have a shape that is circular or non-circular so the word "cylindrical" in this context does not imply a mathematically strict restriction to a cylindrical shape. The second meridians of the lenses of each of the lens arrays 502 and 504 extend parallel to each other. As described below, the pitches of the two lens arrays 502 and 504 may be the same or different, but respective lenses of the lens arrays 502 and 504 are aligned with each other.

The Gabor superlens 500 is oriented so that the second meridians extend at a non-zero acute angle to the optical axis of the waveguide 1. This angle is selected to achieve the desired window rotation as described below. Further, side lobe windows 507, 509 may be produced, as will be described below.

The first and second lens arrays 502 and 504 are further arranged with coincident focal planes that extend perpendicular to the normal to the SLM 48. The first and second lens arrays 502 and 504 are formed by a common piece of material within which the coincident focal planes are disposed, by shaping of the outer surfaces of that material.

The Gabor superlens 500 is arranged between the waveguide 1 and a Fresnel lens 62, and hence between the waveguide 1 and the SLM 48. Light rays 501 from the array 15 are directed through the superlens 500 and directed to viewing windows 250.

Figure 47:
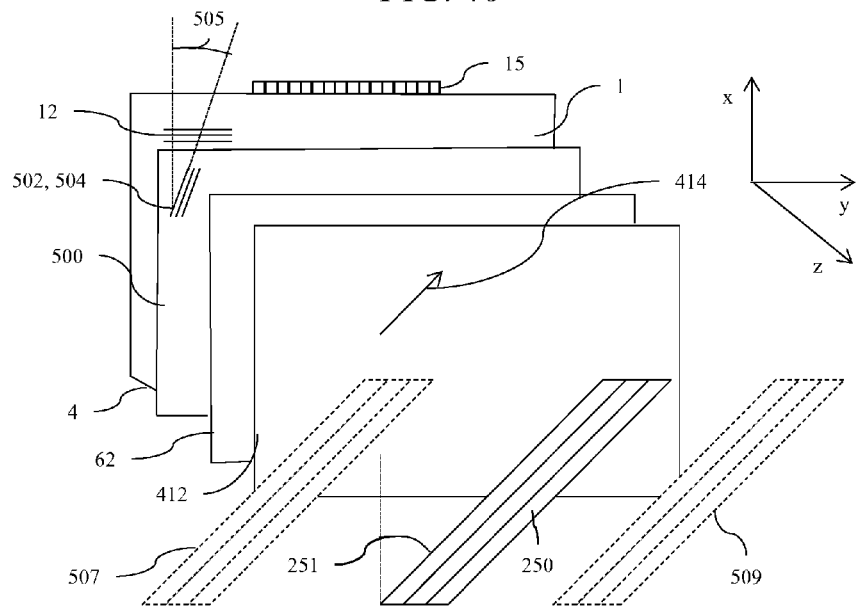
FIG. 47 is a schematic diagram illustrating a front view of an autostereoscopic display apparatus comprising a stepped imaging directional backlight and a Gabor superlens arranged to achieve landscape and portrait operation, in accordance with the present disclosure.

FIG. 47 is a schematic diagram illustrating a front view of an autostereoscopic display device comprising a stepped imaging directional backlight and a Gabor superlens 500 arranged as described above with reference to FIG. 46 to achieve landscape and portrait operation.

Advantageously the present embodiments may achieve landscape and portrait orientation with a single thin optical component. Viewing windows may be central to the system optical axis. Side lobes 507, 509 may be used to achieve increased width of viewing freedom. Some possible constructions of the Gabor superlens 500 that may be applied in the display devices of FIGS. 46 and 47 will now be described.

Figure 48A:
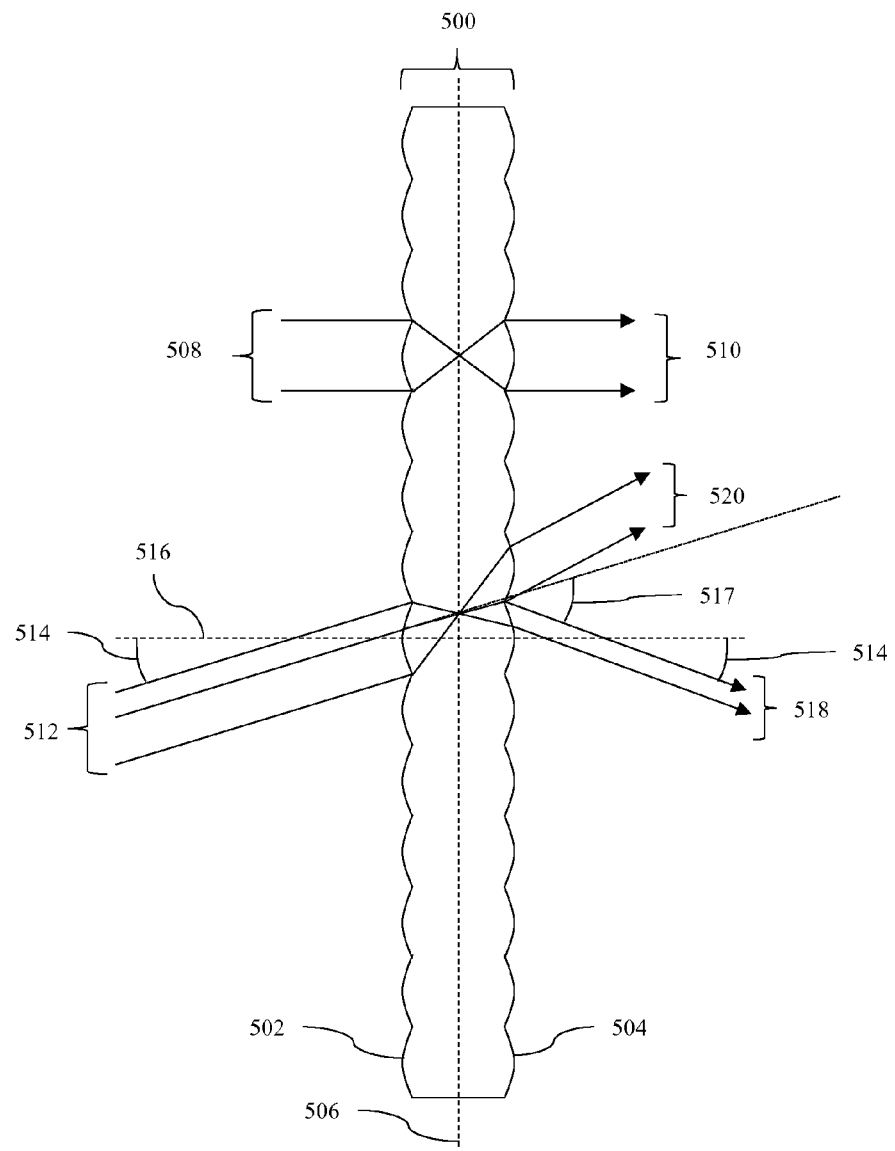
FIG. 48A is a schematic diagram illustrating a side view of a Gabor superlens, in accordance with the present disclosure.

FIG. 48A is a schematic diagram illustrating a side view of the Gabor superlens 500. Beam 508 incident on-axis to the superlens 500 is incident at lens array 508 and imaged through the optical system 510 to produce an output collimated beam 510 with substantially no geometric losses of light. The cylindrical lens arrays 502, 504 have a nominally coincident focus at the plane 506 which may be the best focus for an on-axis point, or advantageously the best focus for an on-axis point representing an off-axis position in the window plane of 32 mm to 130 mm. Typically there will be no diffusing surface at the plane 506 which will degrade the directionality of the light within the superlens.

Off-axis light beam 512 incident at an angle 514 to the optical axis 516 of the lens 502 from a given light source will be split by the superlens 500 into beams 518, 520 with a total beam deflection angle 517 that is twice the angle 514. As will be shown, such angle doubling advantageously achieves window rotation for a Gabor superlens 500 that is inclined at an angle to the incident viewing windows from the waveguide 1. Thus beam 520 may achieve viewing windows 509 while beam 518 may achieve windows 250. This effectively creates the side lobes 507 and 509 described above. That is, where a given light source is operated in order to direct light into a given viewing window corresponding to one of the beams 518 and 520, then the splitting causes light also to be directed into another viewing window corresponding to the other one of the beams 518 and 520. Considering the brightness of the given viewing window, this represents a loss of light into the side lobes 507 and 509 which may be undesirable. Such loss may be reduced by design of the Gabor superlens 500 as follows or may be compensated in the control as described below. However, the side lobes 507 and 509 may advantageous in other contexts, for example by providing additional viewing windows that may be used to display images.

The lenses of the lens arrays 502, 504 may have substantially the same pitch as each other. Alternatively the lens arrays 502, 504 may have a different pitch to advantageously achieve an optical focussing property of the resultant beam across the width of the spatial light modulator. Within each of the respective arrays 502, 504, the lenses may typically have a constant pitch across the respective arrays 502, 504. Some modifications to the Gabor superlens 500 will now be described. These modifications may be applied in any combination.

Figure 48B:
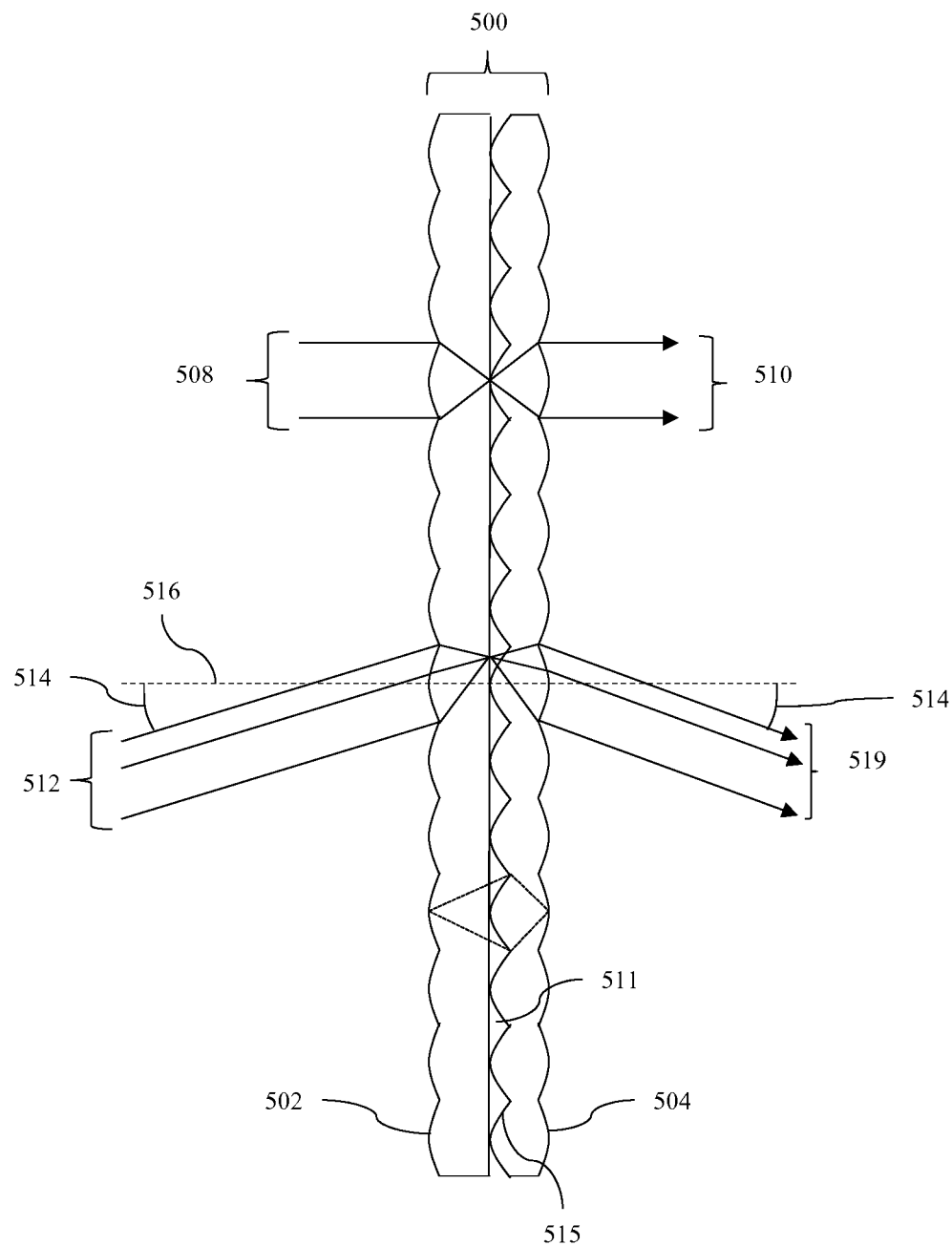
FIG. 48B is a schematic diagram illustrating a side view of a Gabor superlens, in accordance with the present disclosure.

FIG. 48B is a schematic diagram illustrating a side view of the Gabor superlens 500 with a modification to reduce the formation of side lobes. In the modified form, the Gabor superlens 500 comprises third lens array 515 disposed between the first and second lens arrays 502, 504. The lenses of the third lens array 515 each have a positive optical power in respective first meridians and no optical power in respective second meridians perpendicular to the first meridians. The lenses of the third lens array 515 are arranged to image the aperture of each lens of the first array 502 that is closest to the waveguide 1 onto the aperture of a respective aligned lens of the second array 504. This has the effect that the third lens array 515 may redirect incident light beams 512 more fully into output beam 519. Advantageously this reduces light loss into side lobe beams 520. Typically such field lens arrays 515 may have high power and so reduce the optical power that can be provided by the arrays 502, 504 increasing cost and thickness. The lenses of the third lens array 515 are separated from the first array 502 by an air gap 511 to provide the desired positive optical power. Further such lenses may further increase aberrations and scatter in the optical system. It may be desirable to reduce the vignetting that creates side lobe beams 520 without a field lens 515.

Figure 49:
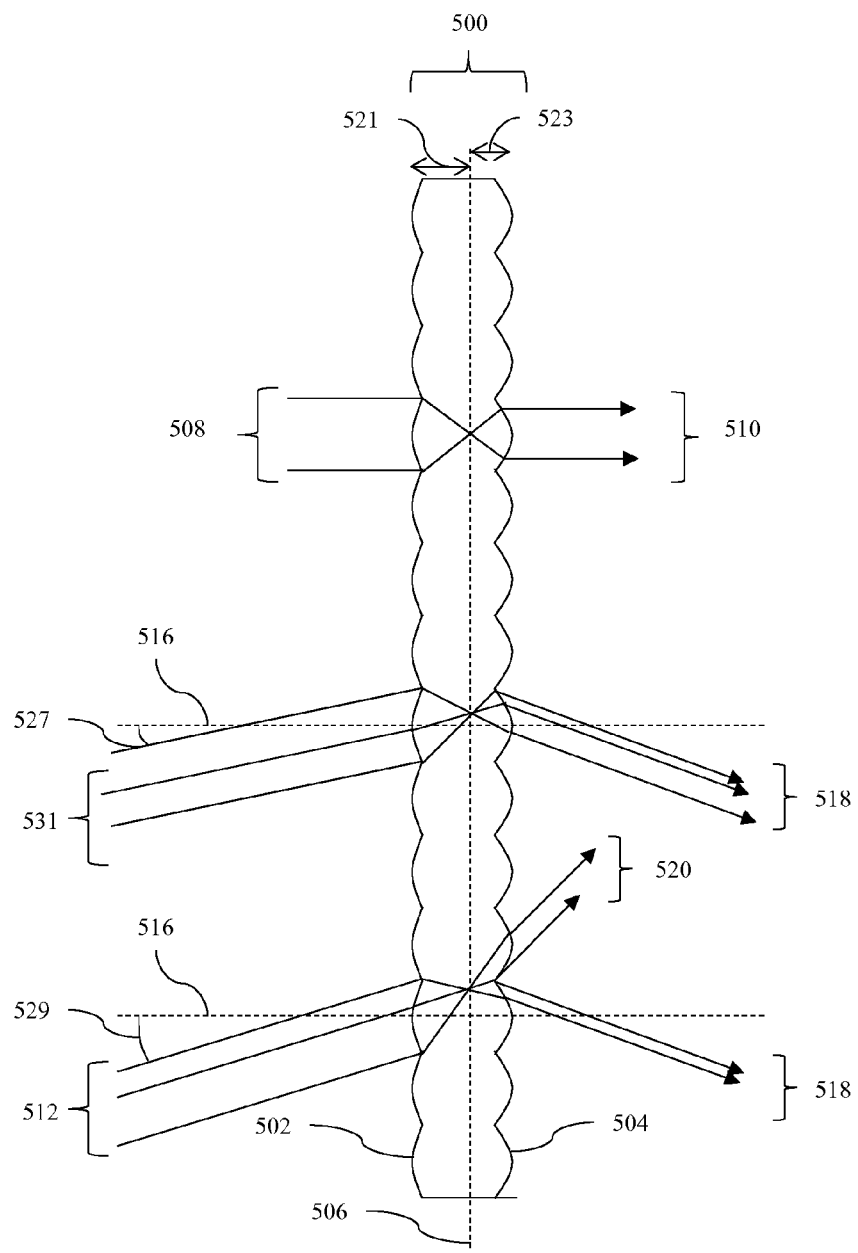
FIG. 49 is a schematic diagram illustrating a side view of a Gabor superlens, in accordance with the present disclosure.

FIG. 49 is a schematic diagram illustrating a side view of the Gabor superlens with another modification. In the modified form, the Gabor superlens 500 is arranged such that the focal length 521 of the lenses of the first lens array 502 is greater than the focal length 523 of the lenses of the second lens array 504. Thus on axis beam 508 is again directed efficiently through the superlens 500. However, beam 531 at angle 527 continues to be directed entirely within the aperture of lens array 504, so that no beams 520 are generated and side lobes 507, 509 are not present. In the present embodiment, the rotation angle of the superlens 500 will typically be different to 22.5 degrees to achieve a 45 degree rotation, depending on the focal length ratio. Such an arrangement advantageously can achieve privacy and high efficiency modes of operation without the creation of side beams and display intensity reduction for off-axis viewing positions. In alternative embodiment (not shown) the focal length 521 of the lens array 502 may be less than the focal length 523 of the lens array 504. Advantageously such an arrangement may achieve a greater pitch of light emitting elements of the array 15 for a given window separation. Advantageously such an embodiment may achieve a reduced window pitch for a given LED size and thus reduce image flicker for a tracked moving observer. Further such an arrangement may enable display size to be reduced for a given light source size without increasing window size, thus reducing display flicker.

Alternatively, the focal length of the lenses of the first array of lenses arranged to receive light from the waveguide be less than the focal length of lenses of the second array.

Figure 50:
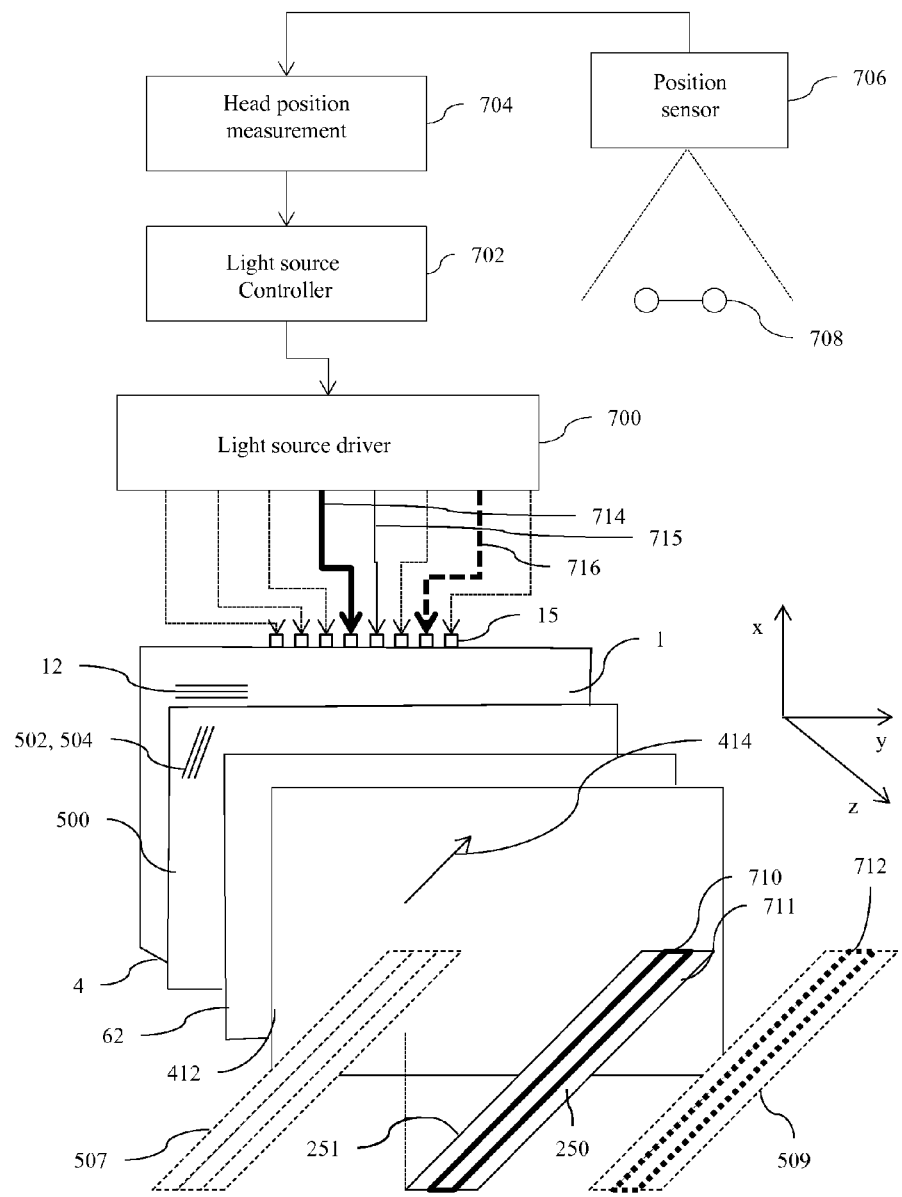
FIG. 50 is a schematic diagram illustrating a control system arranged to compensate for vignetting effects in an autostereoscopic display comprising a Gabor superlens, in accordance with the present disclosure.

FIG. 50 is a schematic diagram illustrating a control system arranged to compensate for vignetting effects in an autostereoscopic display comprising a Gabor superlens. This control system is a modified form of the control system shown in FIG. 11 and described above. Accordingly, except for the modifications, the above description applies and for brevity is not repeated.

Observer 708 is observed by sensor 706 such as a camera and head position is determined by system 704 such as an image processing system. Light source controller 702 determines which light source to drive and instructs a light source array 15 driver 700 accordingly.

Figure 51:
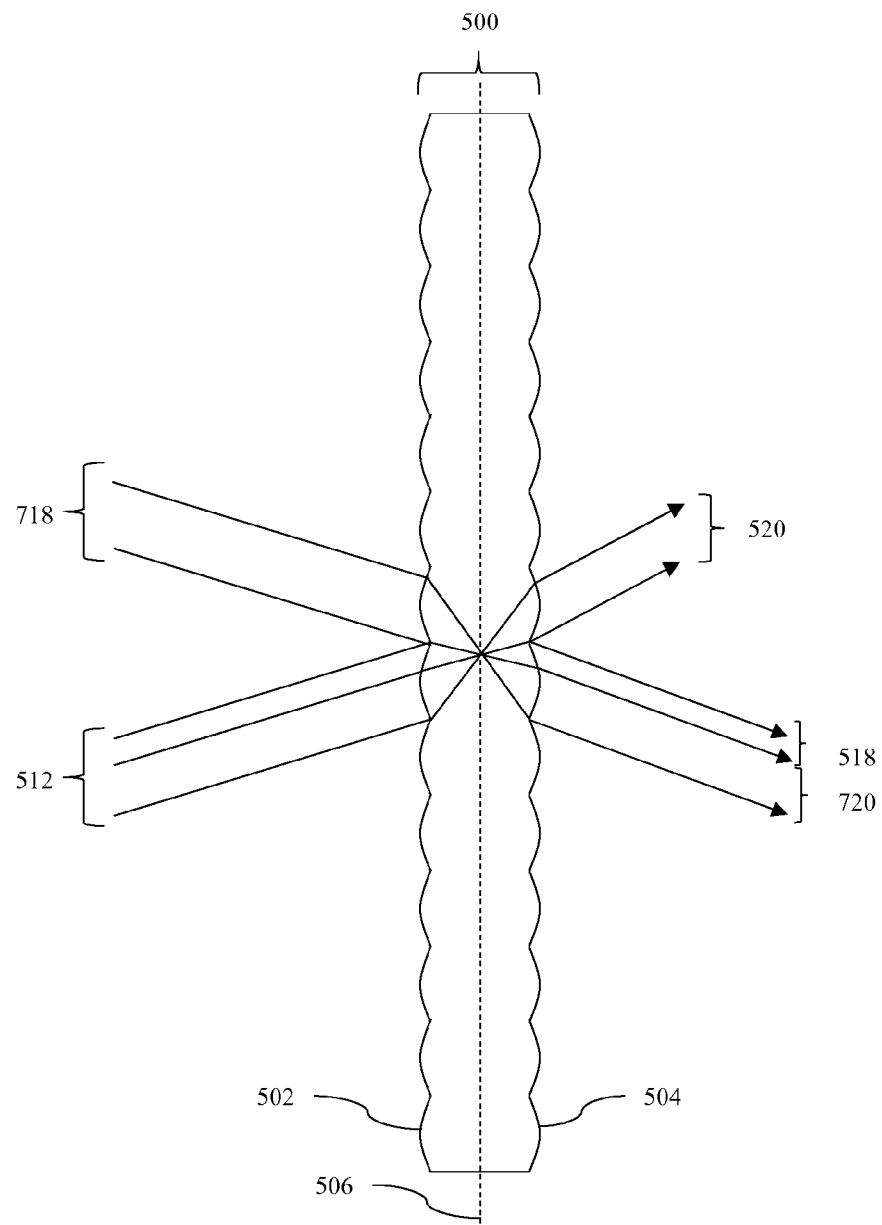
FIG. 51 is a schematic diagram illustrating operation of an off-axis compensation light source arranged to compensate for vignetting effects in an autostereoscopic display comprising a Gabor superlens, in accordance with the present disclosure.

FIG. 51 is a schematic diagram illustrating operation of an off-axis compensation light source arranged to compensate for vignetting effects in an autostereoscopic display comprising a Gabor superlens.

In operation for on-axis light, a single drive line 714 is operated to achieve illumination of viewing window 710. This is possible because on-axis light is not split, as shown in FIG. 48 and described above.

For off-axis illumination angle 514, drive line 715 is operated to operate a given light source providing a given adjacent viewing window 711, however the splitting causes light also to be directed into another viewing window and so the intensity of the given viewing window is reduced by vignetting. The intensity of the display can be compensated by reducing the power on drive line 714 however that may achieve reduced display brightness. Instead, the following control operation is performed to operate a further, separated light source to direct compensatory light into the given viewing window. In particular, there is operated the drive line 716 to operate a further, separated light source that directs light primarily into a high angle lobe window 712, but also has a side lobe corresponding to the given viewing window 710 that can be used to increase intensity in that window 710 as illustrated in FIG. 51. Thus beam 512 achieves output cone 518 in the desired direction and unwanted light into cone 520. However, if the superlens 500 is illuminated by light beam 718 then output beam 720 is generated in the same direction as beam 518. Thus by driving line 716 the intensity loss of the main central lobe can be increased. Further the technique can be used to increase the lateral viewing freedom of the display with a reduced number of light sources, reducing cost and complexity.

Figure 52:
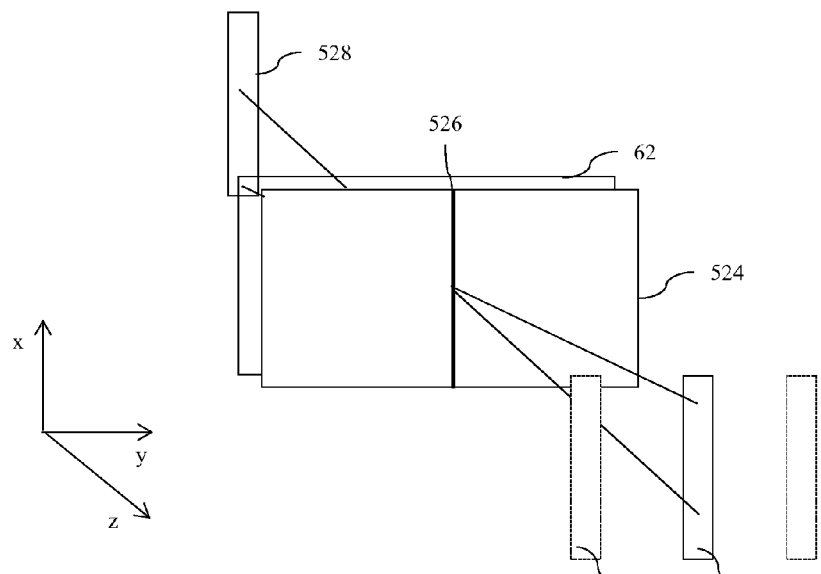
FIG. 52 is a schematic diagram illustrating operation of a Gabor superlens, in accordance with the present disclosure.

FIG. 52 is a schematic diagram illustrating operation of a Gabor superlens 524 aligned with a Fresnel lens 62 and with axis parallel to a vertically extended light source 528. Such an arrangement is provided for explanation of rotated Gabor superlens operation. Thus the superlens 524 is provided with a light beam substantially collimated in a first (horizontal) direction. Thus superlens directs light into central viewing window 542 and some light will fall into side lobe viewing windows 543 due to the finite width of the source 528. The viewing windows are vertical (parallel to lens axes) as would be expected.

Figure 53:
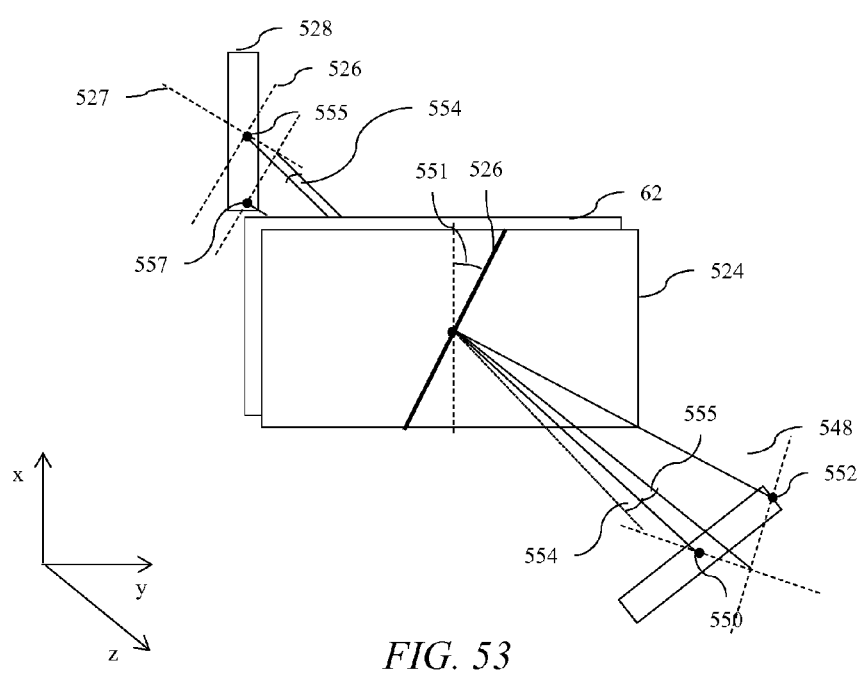
FIG. 53 is a schematic diagram illustrating operation of a Gabor superlens, in accordance with the present disclosure.

FIG. 53 is a schematic diagram illustrating operation of a Gabor superlens 524 to rotate the viewing windows around the normal to the SLM 48 which is aligned with the optical axis of the Gabor superlens 524. The rotation is illustrated by considering two points 552 and 557 in the viewing window 528. In FIG. 53, the geometric axes (first meridians) of the lens arrays 502, 504 of the Gabor superlens 524 extend parallel to direction 526 that is inclined at an angle 551 (that may be 22.5 degrees if the focal lengths are equal) to the optical axis of the waveguide (vertical in FIG. 53).

Point 555 at the illuminator is aligned with the optical axis of the Gabor superlens 524 and so is directed to point 550 in the window plane that is also aligned with the optical axis of the Gabor superlens 524 such that no lateral deflection takes place.

Point 557 is vertically below the point 555 in the window, and so is inclined at a lateral angle 554 to the geometric axis (first meridian) of the Gabor superlens 524. Resolved in the direction 526 parallel to the geometric axis (first meridian), there is no deflection of the point 557 because the Gabor superlens 524 has no optical power in that direction.

Resolved in the direction 527 parallel to the second meridian, there is a deflection of the point 557 by twice the lateral angle 554. This is equivalent to deflection shown in FIG. 48A of the off-axis light beam 512 by twice the angle 514 relative to the optical axis 516 of the Gabor superlens 524. Thus, the lateral deflection is twice the angle 554. Further, the Fresnel lens 62 flips the vertical orientation of the lens so that the point 557 is imaged to the point 552. Thus the total lateral deflection of the point 557 is twice the tilt angle 551 of the lens in this example where the lens arrays of the Gabor superlens 524 have equal focal lengths. As can be seen from FIG. 53, the point 552 is rotated around the optical axis of the Gabor superlens 524 and hence also around the normal to the SLM 48. Similar rotation occurs for every point in the viewing window 528 with the result that the viewing window 528 as a whole is rotated. If the focal length of the arrays 502, 504 is different, the rotation angle of the window 528 will be different to twice the angle 551.

Figure 54:
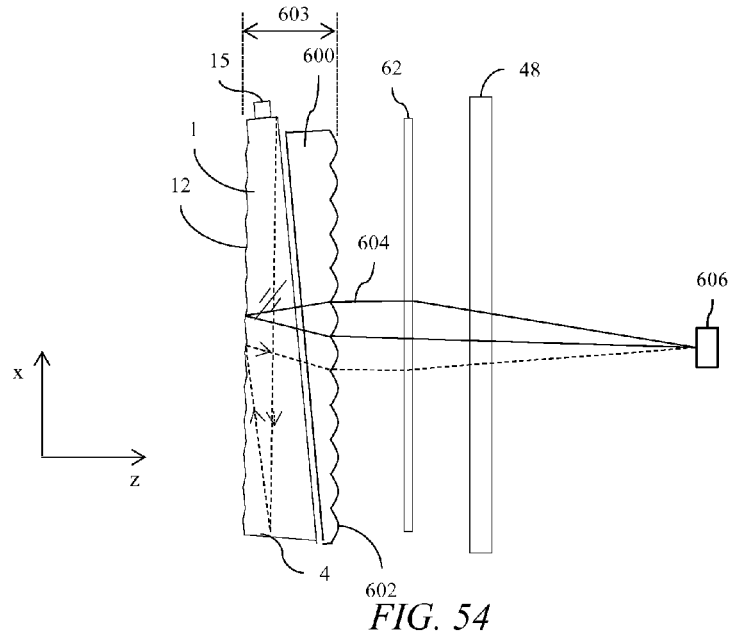
FIG. 54 is a schematic diagram illustrating a side view of an autostereoscopic display apparatus comprising a stepped imaging directional backlight and a collimating lens array arranged to achieve collimated operation, in accordance with the present disclosure.

FIG. 54 is a schematic diagram illustrating a side view of an autostereoscopic display apparatus including a display device comprising a stepped imaging directional backlight and a collimating lens array arranged to achieve collimated operation.

The display device comprises a waveguide 1 and an SLM 48 extending across the first guide surface of the waveguide 1 as described above. In addition, the display device comprise a lens element 600 arranged between the waveguide 1 and the SLM 48. The lens element 600 comprises a focussing lens array 602 of cylindrical lenses that each have a positive optical power in respective first meridians extending across the light extraction features and no optical power in respective second meridians perpendicular to the first meridians. The lenses are therefore cylindrical lenses, although the profile of the lens surface in the first meridians may have a shape that is circular or non-circular so the word "cylindrical" in this context does not imply a mathematically strict restriction to a cylindrical shape.

The lenses of the lens element 600 aligned with respective light extraction features 12 of the waveguide 1 and are arranged with a focus on the respective light extraction features 12. The lens element has a wedge shape such that the separation 603 of cylindrical lenses 602 to features 12 is substantially equal across the display area. The lenses of the lens element 600 may have the same pitch as the light extraction features 12 with which they are aligned or may have a different pitch. The lenses of array 600 are arranged with a nominal focal length (determined for example by minimising ray intersect curves over the aperture and field of view of each lens of the lens array) substantially the same as the separation 603. Extracted light rays 604 from features 12 is thus substantially collimated by the lens array 600, so that the output light rays 604 have a small divergence arising from the small size of features 12. Thus a window 606 of small vertical extent is produced by the optical system. Advantageously, this may increase the brightness of the display device.

Figure 55:
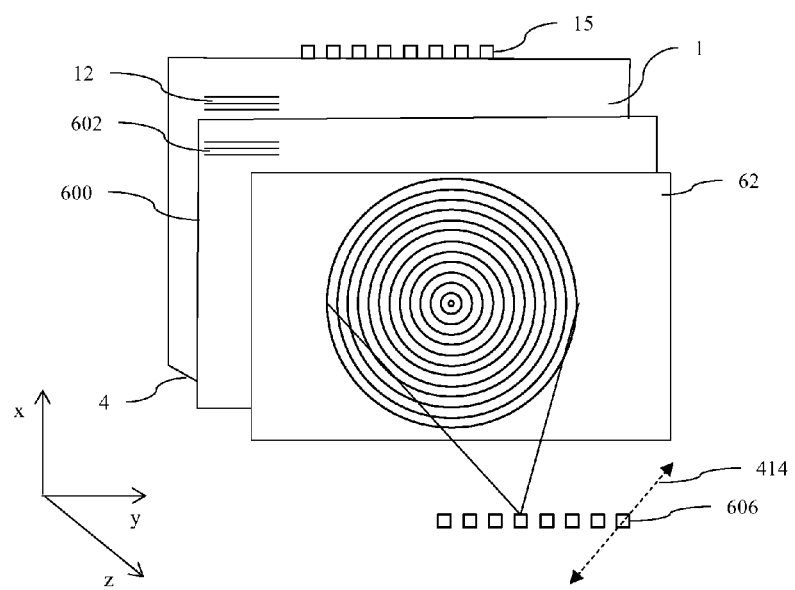
FIG. 55 is a schematic diagram illustrating a front view of an autostereoscopic display apparatus comprising a stepped imaging directional backlight and a collimating lens array arranged to achieve collimated operation, in accordance with the present disclosure.

FIG. 55 is a schematic diagram illustrating a front view of the autostereoscopic display apparatus of FIG. 54, showing The lenses 602 extending parallel to the light extraction features 12. If the Fresnel lens 62 is omitted and replaced by curved features 12 then the cylindrical lenses may be arranged with the same form as the features 12 so that they continue to collimate the output light rays 604. Thus an array of viewing windows 606 is produced each with small lateral and vertical height. As will be shown diffusion in a direction 414 may then be provided to achieve viewing windows at 45 degrees to the display to advantageously achieve landscape and portrait modes of operation.

Figure 56:
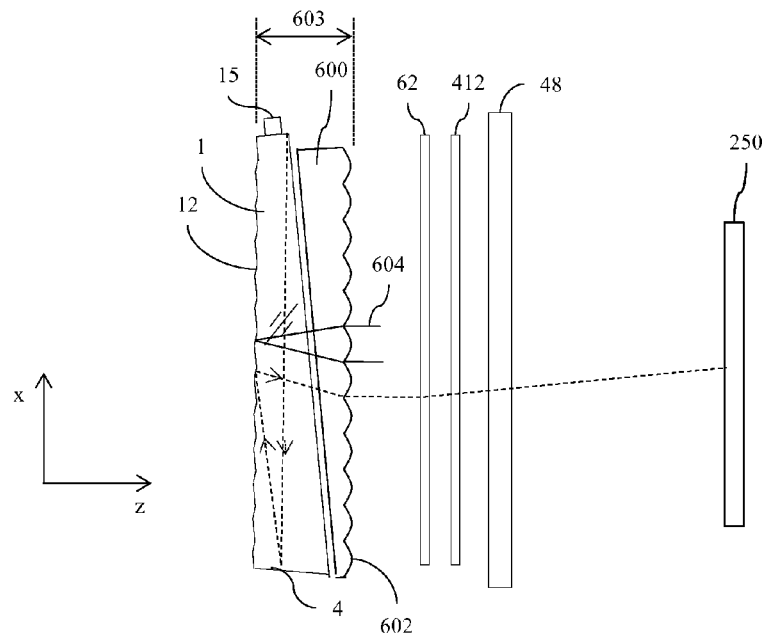
FIG. 56 is a schematic diagram illustrating a side view of an autostereoscopic display apparatus comprising a stepped imaging directional backlight and a collimating lens array arranged to achieve landscape and portrait operation, in accordance with the present disclosure.
Figure 57:
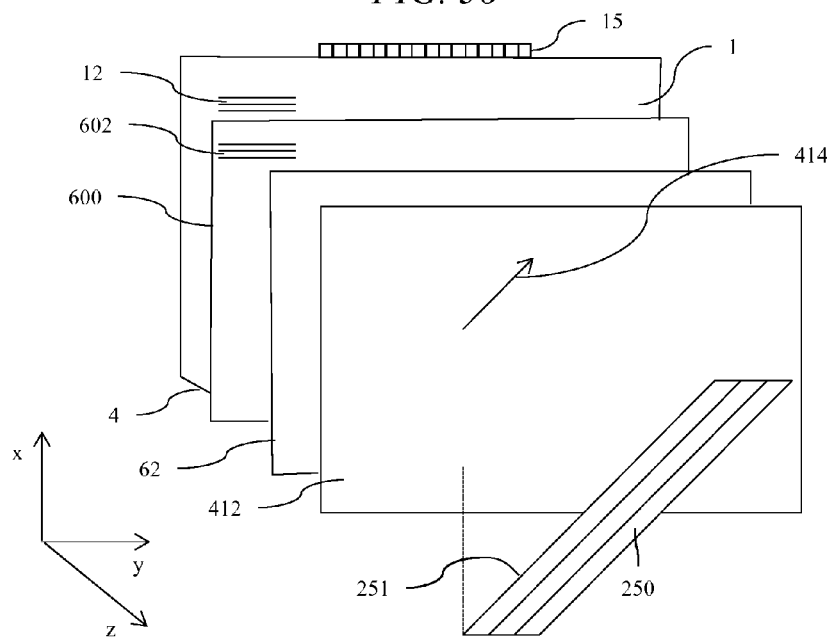
FIG. 57 is a schematic diagram illustrating a front view of an autostereoscopic display apparatus comprising a stepped imaging directional backlight and a collimating lens array arranged to achieve landscape and portrait operation, in accordance with the present disclosure.

FIG. 56 is a schematic diagram illustrating a side view of an autostereoscopic display apparatus comprising a stepped imaging directional backlight and a collimating lens array arranged to achieve landscape and portrait operation. FIG. 57 is a schematic diagram illustrating a front view of the same autostereoscopic display apparatus. The autostereoscopic display apparatus is the same as that shown in FIG. 54 except for the addition of an asymmetric diffuser 412 disposed between the array of focussing elements and the SLM 48. The asymmetric diffuser 412 has an axis 414 along which it is arranged to diffuse light that extends at a non-zero acute angle to the optical axis of the waveguide 1. The asymmetric diffuser 412 diffuses light along this axis 414 to create viewing windows 606 extending at the same angle to achieve viewing windows 250. This angle is chosen to be in the range described above. The display apparatus has a control system and operation as described above. Such a system advantageously achieves landscape and portrait operation in a thin and low cost package.

Figure 58:
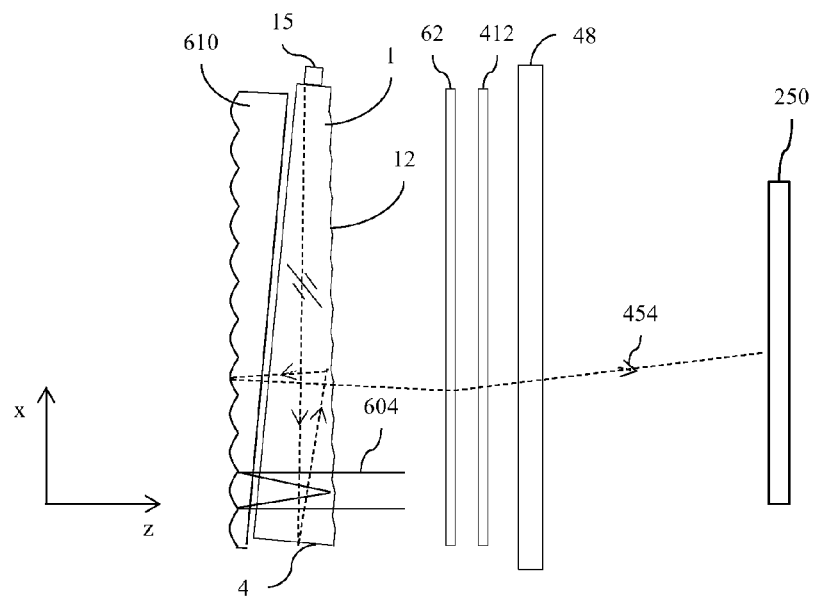
FIG. 58 is a schematic diagram illustrating a side view of an autostereoscopic display apparatus comprising a stepped imaging directional backlight and a collimating mirror array arranged to achieve landscape and portrait operation, in accordance with the present disclosure.
Figure 59A:
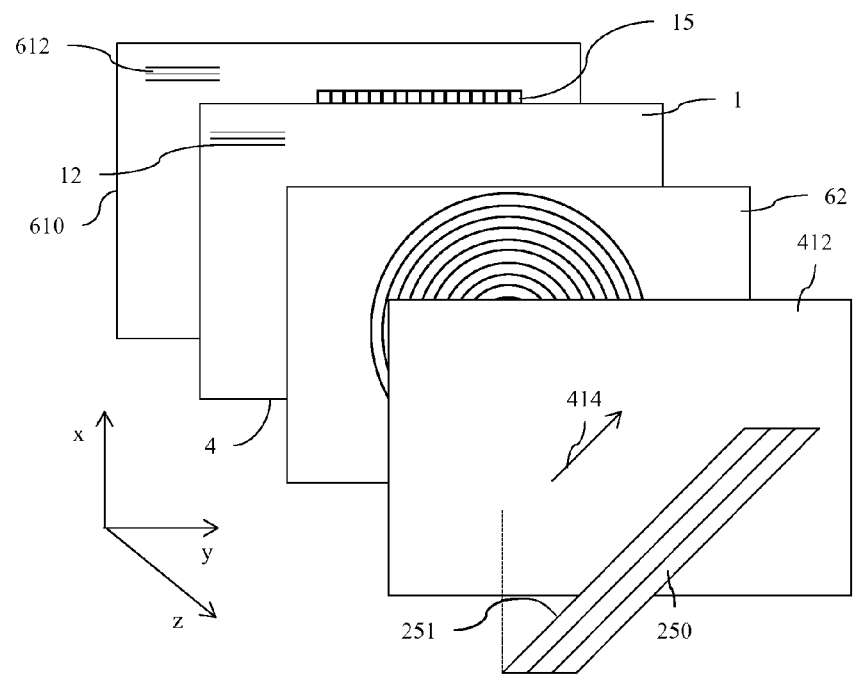
FIG. 59A is a schematic diagram illustrating a front view of an autostereoscopic display apparatus comprising a stepped imaging directional backlight and a collimating mirror array arranged to achieve landscape and portrait operation, in accordance with the present disclosure.

FIG. 58 is a schematic diagram illustrating a side view of an autostereoscopic display apparatus and FIG. 59A is a schematic diagram illustrating a front view of the same autostereoscopic display apparatus. The display apparatus the same as the display apparatus of FIG. 56 but with the following modifications. The waveguide 1 is operated in reversed mode with the SLM 48 extending across the second guide surface of the waveguide so that light is output away from the SLM 48 in a first pass and directed onto a reflective element 610 comprising an array of concave mirrors. The reflective element 610 reflects the light exiting the first guide surface of the waveguide 1 back through the first guide surface to exit the waveguide 1 through the second guide surface. The concave mirrors each have a positive optical power in respective first meridians extending across the light extraction features and no optical power in respective second meridians perpendicular to the first meridians. The mirrors are therefore cylindrical mirrors, although the profile of the mirror surface in the first meridians may have a shape that is circular or non-circular so the word "cylindrical" in this context does not imply a mathematically strict restriction to a cylindrical shape.

The concave mirrors of the reflective element 610 are aligned with respective light extraction features 12 of the waveguide 1 and are arranged with a focus on the respective light extraction features 12. Thus the reflective element 610 has the same function and operation as the lens element 61, as described above.

As described previously, the asymmetric diffuser 412 with axis direction 414 at 45 degrees can be used to diffuse the output to achieve viewing windows 250 for landscape and portrait operation. Advantageously the reflective element 610 may achieve low chromatic dispersion of viewing windows 250 and may operate at a higher numerical aperture, thus collecting more light with fewer aberrations than the transmissive embodiment of FIG. 56.

Figure 59B:
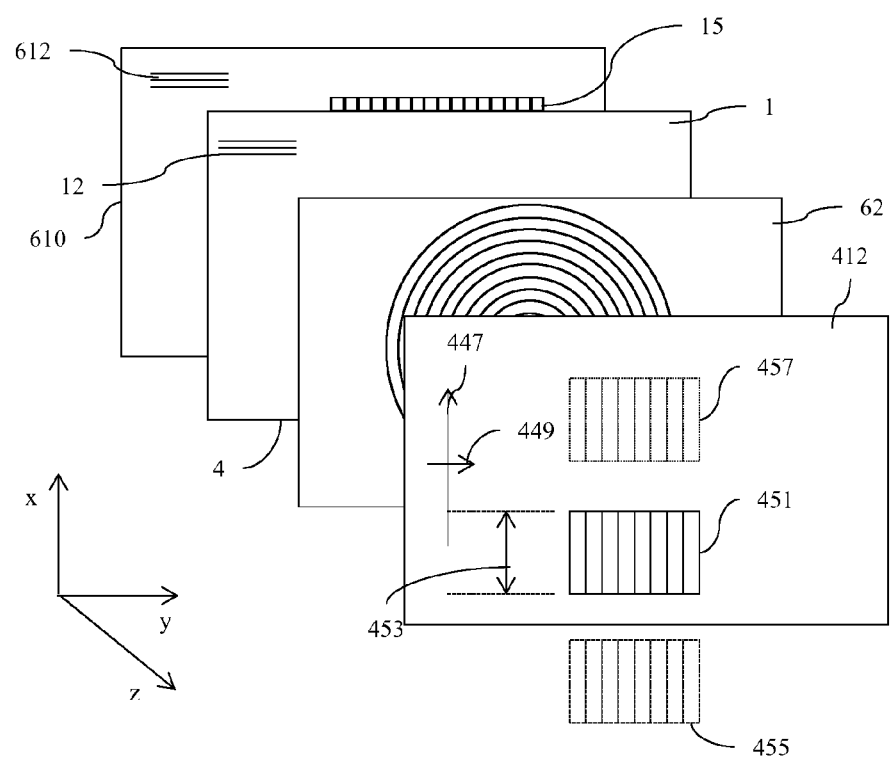
FIG. 59B is a schematic diagram illustrating a front view of a directional display apparatus comprising a stepped imaging directional backlight and a collimating mirror array arranged to achieve high brightness operation, in accordance with the present disclosure.

FIG. 59B is a schematic diagram illustrating a front view of a directional display apparatus comprising a stepped imaging directional backlight and a collimating mirror array arranged to achieve high brightness operation. This embodiment is similar in structure to FIG. 59A, however the asymmetric diffuser 412 has major axis diffusion spread 447 and minor axis diffusion spread 449 which may achieve different angular spread in major and minor axes respectively. Thus output viewing window array 451 with nominal vertical height 453 is produced for corresponding windows 606 shown in FIG. 55 when no diffuser is present. The height 453 is substantially determined by the size of the features 12 and the focal length of the concave mirrors 612 of the array 610. Further window lobes 455, 457 may be produced in the vertical direction due to overfill of the aperture of the mirrors of the mirror array. In this manner, the brightness of the output of the waveguide 1 is directed to a small range of vertical viewing angles with height 453. Such a display can advantageously achieve very high brightness from array 15 of LEDs. Advantageously such a display can be used in bright outdoors lighting conditions with low power consumption and can achieve reduced power consumption for screen luminance desirable for indoors operation. Observer tracking can be used to direct appropriate viewing windows to observer 12 to further reduce power consumption. Such a display may be used for an autostereoscopic display apparatus or for a very high brightness 2D display apparatus.

Figure 59C:
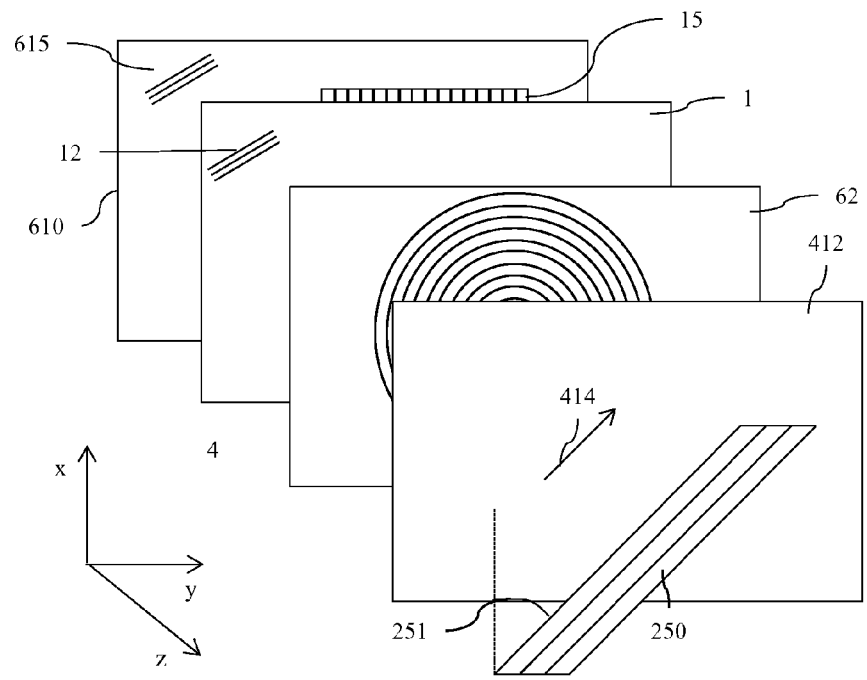
FIG. 59C is a schematic diagram illustrating a front view of a directional display apparatus comprising a stepped imaging directional backlight and a collimating mirror array arranged to achieve high brightness operation with inclined viewing windows, in accordance with the present disclosure.

FIG. 59C is a schematic diagram illustrating a front view of a directional display apparatus comprising a stepped imaging directional backlight and a collimating mirror array arranged to achieve high brightness operation with inclined viewing windows. Extraction features 12 and mirrors 615 may be inclined to the horizontal to achieve rotated viewing windows 250, for example similar manner to that shown in FIG. 41. Advantageously the lobes 455, 457 may be imaged in the same orientation as windows 451 so that the cross talk of the display is reduced in comparison to the arrangement of FIG. 59A.

Figure 59D:
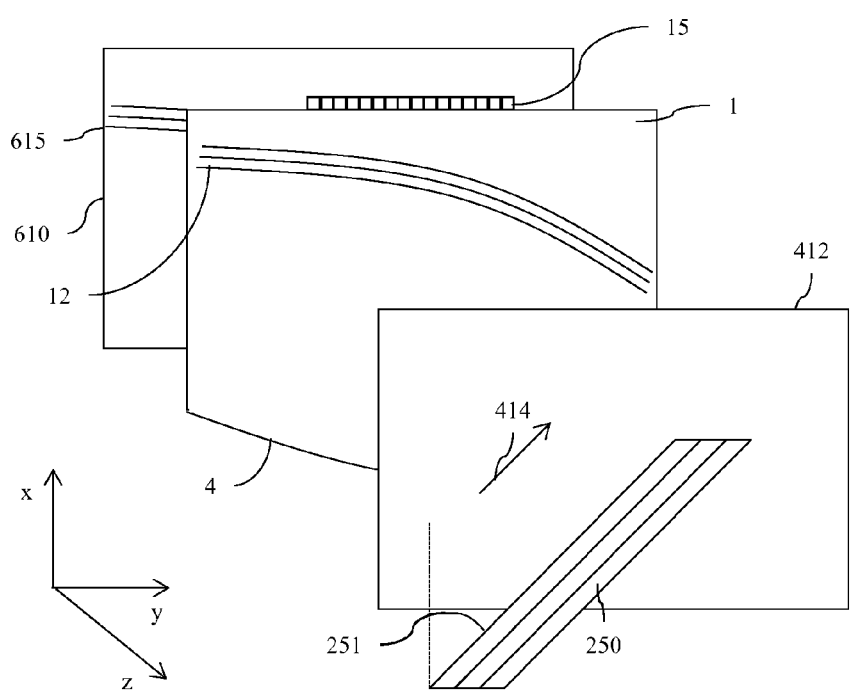
FIG. 59D is a schematic diagram illustrating a front view of a directional display apparatus comprising a stepped imaging directional backlight and a collimating mirror array arranged to achieve high brightness operation with inclined viewing windows, in accordance with the present disclosure.

FIG. 59D is a schematic diagram illustrating a front view of a directional display apparatus comprising a stepped imaging directional backlight and a collimating mirror array arranged to achieve high brightness operation with inclined viewing windows. The lens 62 is removed and curved extraction features 12 arranged with an axial tilt to achieve inclined viewing windows 250. Mirror elements 615 may be further be curved and inclined. Advantageously the device may have lower thickness than the arrangement of FIG. 59C.

Figure 60:
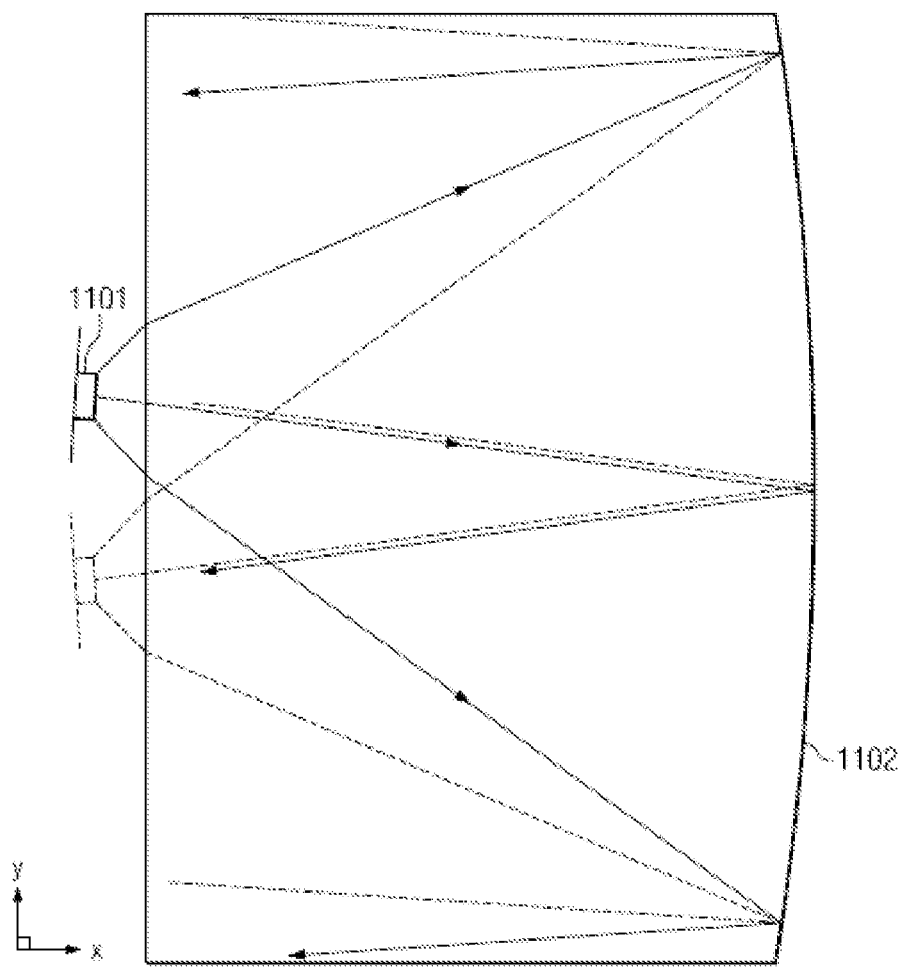
FIG. 60 is a schematic diagram illustrating a front view of an autostereoscopic display apparatus comprising a wedge directional backlight, in accordance with the present disclosure.
Figure 61:
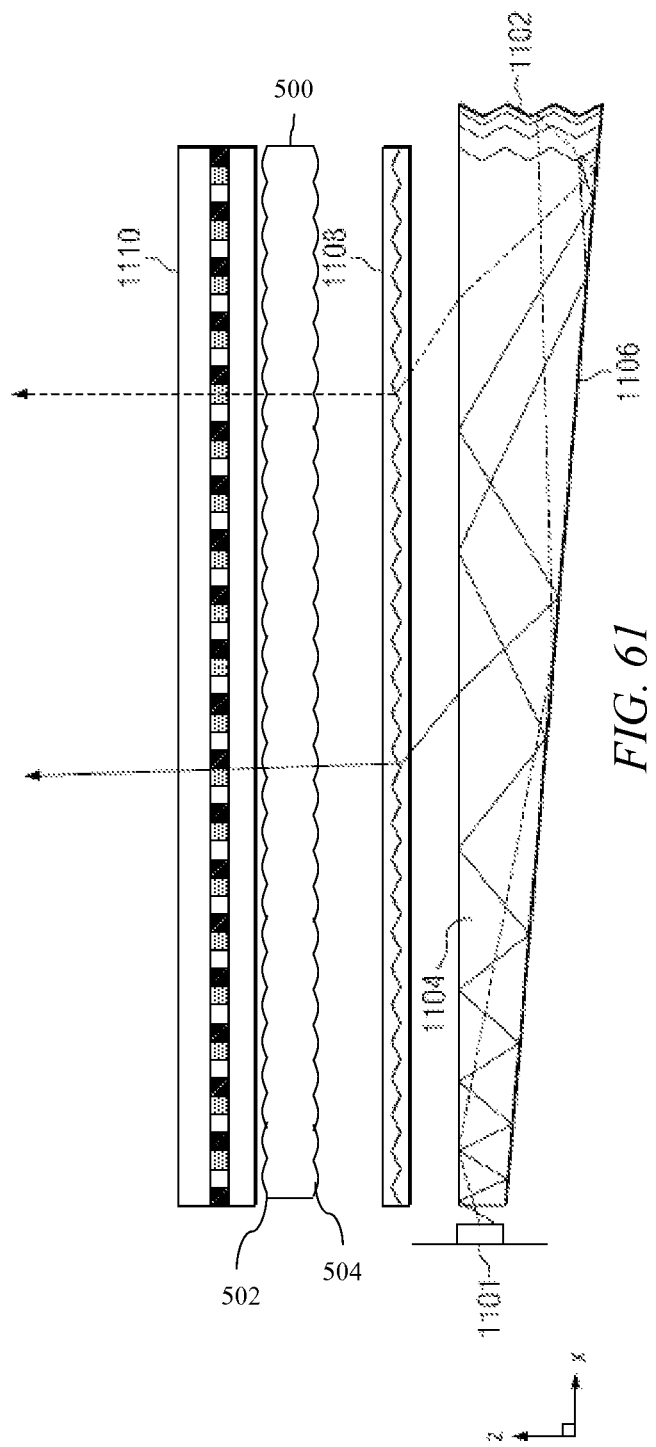
FIG. 61 is a schematic diagram illustrating a side view of an autostereoscopic display apparatus comprising a wedge directional backlight arranged to achieve landscape and portrait operation, in accordance with the present disclosure.

FIG. 60 is a schematic diagram illustrating a front view of an autostereoscopic display apparatus comprising a wedge directional backlight. FIG. 61 is a schematic diagram illustrating a side view of an autostereoscopic display apparatus comprising a wedge directional backlight arranged to achieve landscape and portrait operation. Wedge directional backlights are described in U.S. Pat. No. 7,660,047 incorporated herein by reference. The optical wedge 1104 is a waveguide having an input end and first and second, opposed guide surfaces 1106 for guiding light along the optical wedge 1104 that are both planar. The optical wedge 1104 is illuminated by light source array 1101 and light propagates within the medium 1104 of the wedge by total internal reflection at the guide surfaces 1106. The optical wedge 1104 has a reflective end 1102 formed by a corrugated mirror facing the input end for reflecting light from the input end back through the optical wedge 1104. The second guide surface is inclined at an angle to reflect light in directions that break the total internal reflection of the first guide surface after reflection at the reflective end 1102, so that light is output at the first guide surface by refraction of light.

By way of comparison with the stepped imaging directional backlight, light extraction features are not provided. However, the operation is similar in that the optical wedge 1104 directs input light from the light sources of the light source array 1101 at different input positions across the input end in output directions relative to the normal to the first guide surface that are dependent on those input positions. A control system as described above with reference to FIG. 11 is arranged to selectively operate the light sources to direct light into the viewing windows in positions corresponding to the left and right eyes of the observer.

The optical wedge 1104 extends across a transmissive spatial light modulator 1110 to which the output light is supplied. The spatial light modulator 1110 comprises an array of pixels that modulate light arranged in an aperture with a shape having two perpendicular axes of mirror symmetry. Since light is output from the optical wedge 1104 at high angles of refraction, a prismatic element 1108 extending across first guide surface of the optical wedge 1104 acts as a deflection element to deflect light towards the normal to the spatial light modulator 1110.

A Gabor superlens 500 is arranged between the prismatic element 1108 and the spatial light modulator 1110. The light output by the optical wedge 1104 is deflected by the prismatic element 1108 and is incident on superlens 500 and passed through spatial light modulator 1110.

The optical wedge 1104 is oriented with respect to the spatial light modulator 1110 with the optical axis of the optical wedge 1104 extending parallel or perpendicular to an axis of symmetry of the shape of the aperture, and to achieve the desired viewing window angle. The construction and operation of the Gabor superlens 500 is the same as described previously so that vertical viewing windows are rotated through an angle around the normal to the spatial light modulator 1110 to achieve tilted viewing windows that can be arranged to advantageously achieve landscape and portrait modes of operation.

The display apparatuses described above employ an SLM 48 having pixels arranged in an aperture having a rectangular shape. However, this shape is merely an example and in general the shape could be any shape having to any shape having two perpendicular axes of mirror symmetry, including without limitation rectangles with rounded corners or circles or ellipses. For example, a circular or ellipsoid shape might be used in a display for a watch. Similar considerations for viewing in different orientations apply to any such shape.

As may be used herein, the terms "substantially" and "approximately" provide an industry-accepted tolerance for its corresponding term and/or relativity between items. Such an industry-accepted tolerance ranges from zero to ten percent and corresponds to, but is not limited to, component values, angles, et cetera. Such relativity between items ranges between approximately zero percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

It should be noted that embodiments of the present disclosure may be used in a variety of optical systems and display systems. The embodiment may include or work with a variety of display systems, optical components, computer systems, handheld devices, visual and/or audiovisual systems and electrical and/or optical devices. Aspects of the present disclosure may be used with practically any apparatus related to optical and electrical devices, optical systems, presentation systems or any apparatus that may contain any type of optical display system.

It should be understood that the disclosure is not limited in its application or creation to the details of the particular arrangements shown, because the disclosure is capable of other embodiments. Moreover, aspects of the disclosure may be set forth in different combinations and arrangements to define embodiments unique in their own right. Also, the terminology used herein is for the purpose of description and not of limitation. While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. An autostereoscopic display apparatus, comprising:
a display device comprising an array of pixels arranged in an aperture with a shape having two perpendicular axes of mirror symmetry, the display device being controllable to direct an image displayed on all of the pixels into a selectable one of a plurality of viewing windows having different positions and extending at an angle in a range from 25 to 65 degrees relative to one of said axes of the shape of the aperture, wherein the display device comprises:
a waveguide extending between an input end for receiving input light and a reflective end for reflecting the input light back through the waveguide,
the waveguide having first and second, opposed guide surfaces for guiding light forwards and back along the waveguide, wherein the second guide surface has a plurality of light extraction features facing the reflective end and inclined to reflect the light guided back through the waveguide from the reflective end in directions allowing exit through the first guide surface;
an array of light sources at different positions across the input end of the waveguide, the light extraction features of the waveguide being arranged to direct input light from different input positions across the input end in directions that are dependent on said input position; and
a transmissive spatial light modulator comprising said array of pixels arranged to modulate light that has exited the waveguide, further wherein the light extraction features are inclined relative to the optical axis of the waveguide in a plane containing the optical axis and the normal to the spatial light modulator, and said optical element is an additional element to said waveguide; and
the control system being arranged to selectively operate the light sources to direct light into the viewing windows in positions corresponding to the left and right eyes of the observer, wherein
the waveguide is oriented with respect to the spatial light modulator with the optical axis of the waveguide extending parallel or perpendicular to said axis of the shape of the aperture, and
at least one optical element of the display device is arranged to rotate the viewing windows around the normal to the spatial light modulator, further wherein said optical element that is arranged to rotate the viewing windows around the normal to the spatial light modulator comprises first and second arrays of lenses being lenses that each have a positive optical power in respective first meridians and no optical power in respective second meridians perpendicular to the first meridians, the first and second arrays of lenses being arranged with coincident focal planes that extend perpendicular to the normal to the spatial light modulator, the lenses of each array and having parallel second meridians extending at a non-zero acute angle to the optical axis of the waveguide;
a sensor system arranged to detect the position of an observer in two dimensions across the display device and the orientation of the view of the observer;
a control system arranged to control the display device to display temporally multiplexed left and right images and synchronously to direct the displayed images into viewing windows in positions corresponding to the left and right eyes of the observer, in dependence on the detected position of the observer and on the detected orientation of the view.

2. An autostereoscopic display apparatus according to claim 1, wherein said range is from 30 to 60 degrees, from 35 to 55 degrees, or from 40 to 50 degrees.

3. An autostereoscopic display apparatus according to claim 1, wherein the sensor system comprises an observer tracking system arranged to detect the position of an observer in two dimensions across the display device and an orientation sensor arranged to detect the orientation of the view of the observer.

4. An autostereoscopic display apparatus according to claim 1, wherein the first guide surface is substantially planar.

5. An autostereoscopic display apparatus according to claim 1, wherein the regions of the second guide surface between the light extraction features are substantially planar.

6. An autostereoscopic display apparatus according to claim 1, wherein the waveguide is oriented with respect to the spatial light modulator with the optical axis of the waveguide extending at the same angle to said axis of the shape of the aperture as the extent of the viewing windows.

7. An autostereoscopic display apparatus according to claim 1, wherein the waveguide is oriented with respect to the spatial light modulator with the optical axis of the waveguide extending parallel to the major axis of the shape of the aperture.

8. An autostereoscopic display apparatus according to claim 1, wherein the lenses of each array have the same pitch.

9. An autostereoscopic display apparatus according to claim 1, wherein the first and second arrays of lenses are formed by a common piece of material within which the coincident focal planes are disposed.

10. An autostereoscopic display apparatus according to claim 1, wherein the focal length of the lenses of the first array of lenses arranged to receive light from the waveguide is different from the focal length of lenses of the second array.

11. An autostereoscopic display apparatus according to claim 10, wherein the focal length of the lenses of the first array is greater than the focal length of lenses of the second array.

12. An autostereoscopic display apparatus according to claim 1, wherein the control system is arranged to control the light sources so that, when light is directed from a given light source into a given viewing window, in the event that the light from the given light source is directed into a viewing window other than the given viewing window by splitting through different lenses of the second array, a further, separated light source is operated to direct compensatory light into the given viewing window.

13. An autostereoscopic display apparatus according to claim 1, wherein
the apparatus further comprises an array of focusing elements aligned with respective light extraction features, which focusing elements each have a positive optical power in respective first meridians extending across the light guiding elements and no optical power in respective second meridians perpendicular to the first meridians, the focusing elements being arranged with a focus on the respective light extraction features,
said optical element that is arranged to rotate the viewing windows around the normal to the spatial light modulator comprises an asymmetric diffuser disposed between the array of focusing elements and the spatial light modulator, the asymmetric diffuser being arranged to diffuse light along an axis extending at said angle in said range.

14. An autostereoscopic display apparatus according to claim 13, wherein the transmissive spatial light modulator extends across the first guide surface of the waveguide for modulating the light exiting therethrough and said focusing elements of said array are lenses.

15. An autostereoscopic display apparatus according to claim 13, wherein
the display device further comprises a reflective element arranged to reflect the light exiting the first guide surface back through the first guide surface to exit through the second guide surface,
the transmissive spatial light modulator extends across the second guide surface of the waveguide for modulating the light exiting therethrough, and
said reflective element is shaped to constitute said array of focusing elements.

16. An autostereoscopic display apparatus according to claim 1, wherein said shape of the aperture is rectangular.

* * * * *